(12) United States Patent
Landesmann

(10) Patent No.: US 7,844,489 B2
(45) Date of Patent: Nov. 30, 2010

(54) BUYER-DRIVEN TARGETING OF PURCHASING ENTITIES

(75) Inventor: Mark Landesmann, San Francisco, CA (US)

(73) Assignee: Buyerleverage, Palo Alto, CA (US)

( * ) Notice: Subject to any disclaimer, the term of this patent is extended or adjusted under 35 U.S.C. 154(b) by 1403 days.

(21) Appl. No.: 09/888,439

(22) Filed: Jun. 26, 2001

(65) Prior Publication Data

US 2002/0052782 A1    May 2, 2002

Related U.S. Application Data

(63) Continuation-in-part of application No. 09/758,239, filed on Jan. 12, 2001, and a continuation-in-part of application No. 09/837,377, filed on Apr. 19, 2001.

(60) Provisional application No. 60/243,960, filed on Oct. 30, 2000.

(51) Int. Cl.
  *G06Q 30/00* (2006.01)
(52) U.S. Cl. ............... 705/14.1; 705/14.25; 705/25; 705/26; 705/14.2; 705/14.13
(58) Field of Classification Search .............. 705/14
  See application file for complete search history.

(56) References Cited

U.S. PATENT DOCUMENTS

| | | | |
|---|---|---|---|
| 5,056,019 A | 10/1991 | Schultz et al. | |
| 5,327,508 A | 7/1994 | Deaton et al. | 382/7 |
| 5,515,270 A * | 5/1996 | Weinblatt | |
| 5,592,560 A * | 1/1997 | Deaton et al. | 382/100 |
| 5,642,485 A | 6/1997 | Deaton et al. | 395/214 |
| 5,644,723 A | 7/1997 | Deaton et al. | 395/214 |
| 5,649,114 A | 7/1997 | Deaton et al. | 395/214 |
| 5,724,521 A * | 3/1998 | Dedrick | |
| 5,734,720 A | 3/1998 | Salganicoff | |
| 5,822,735 A | 10/1998 | De Lapa et al. | 705/14 |
| 5,855,008 A * | 12/1998 | Goldhaber et al. | 705/14 |
| 5,884,277 A | 3/1999 | Khosla | 705/14 |
| 5,924,080 A | 7/1999 | Johnson | 705/26 |
| 5,970,469 A * | 10/1999 | Scroggie et al. | 705/14 |
| 6,012,051 A | 1/2000 | Sammon, Jr. et al. | 706/52 |

(Continued)

FOREIGN PATENT DOCUMENTS

WO  WO 00/62184  * 10/2000

OTHER PUBLICATIONS

Privacy fears raised by DoubleClick database plans by Courtney Macavinta Jan. 25, 2000, downloaded from http://news.com.com/2100-1023-236092.html?tag=rn., 8/8/20.*

(Continued)

*Primary Examiner*—Khanh H Le
(74) *Attorney, Agent, or Firm*—Foley & Lardner LLP

(57) ABSTRACT

A method for buyer-driven targeting comprising the steps of: separately receiving from each of a plurality of buyer entities a respective third party proof of purchase record; entering information contained in the received proof of purchase records into a searchable electronic database; obtaining search criteria for the database; searching the information in the database based on the search criteria to obtain a group of buyer entities; and providing an incentive to each of a plurality of the buyer entities in the group.

201 Claims, 13 Drawing Sheets

U.S. PATENT DOCUMENTS

| | | | | |
|---|---|---|---|---|
| 6,014,638 | A | | 1/2000 | Burge et al. ............... 705/27 |
| 6,049,777 | A | | 4/2000 | Sheena et al. ............... 705/10 |
| 6,055,513 | A | | 4/2000 | Katz et al. ............... 705/26 |
| 6,055,573 | A | * | 4/2000 | Gardenswartz et al. ..... 709/224 |
| 6,061,660 | A | | 5/2000 | Eggleston et al. ............... 705/14 |
| 6,094,677 | A | * | 7/2000 | Capek et al. ............... 709/219 |
| 6,134,532 | A | | 10/2000 | Lazarus et al. ............... 705/14 |
| 6,185,541 | B1 | | 2/2001 | Scroggie et al. ............... 705/14 |
| 6,236,978 | B1 | | 5/2001 | Tuzhilin ............... 705/26 |
| 6,298,330 | B1 | * | 10/2001 | Gardenswartz et al. ....... 705/14 |
| 6,317,881 | B1 | | 11/2001 | Shah-Nazaroff et al. |
| 6,327,574 | B1 | * | 12/2001 | Kramer et al. ............... 705/14 |
| 6,332,126 | B1 | * | 12/2001 | Peirce et al. ............... 705/14 |
| 6,415,262 | B1 | * | 7/2002 | Walker et al. ............... 705/14 |
| 6,424,951 | B1 | | 7/2002 | Shurling et al. |
| 6,434,534 | B1 | * | 8/2002 | Walker et al. ............... 705/14 |
| 6,484,146 | B2 | * | 11/2002 | Day et al. ............... 705/14 |
| 6,571,216 | B1 | | 5/2003 | Garg et al. |
| 6,748,365 | B1 | | 6/2004 | Quinlan et al. |
| 6,868,525 | B1 | | 3/2005 | Szabo |
| 6,925,441 | B1 | | 8/2005 | Jones et al. |
| 6,965,868 | B1 | | 11/2005 | Bednarek |
| 7,069,234 | B1 | | 6/2006 | Cornelius et al. |
| 7,085,774 | B2 | | 8/2006 | Shah et al. |
| 7,143,089 | B2 | | 11/2006 | Petras et al. |
| 7,150,030 | B1 | | 12/2006 | Eldering et al. |
| 7,167,842 | B1 | | 1/2007 | Josephson et al. |
| 2001/0049620 | A1 | | 12/2001 | Blasko |
| 2002/0052825 | A1 | | 5/2002 | Bensemana |
| 2002/0077964 | A1 | | 6/2002 | Brody et al. |
| 2003/0149580 | A1 | | 8/2003 | Moores et al. |

OTHER PUBLICATIONS

Privacy Activists File DoubleClick Complaint, by Keith Perine, The Industry Standard, Feb 10, 2000.*

Data Mining : Staking a Claim on Your Privacy, Jan. 1998, downloaded from http://www.ipc.on.ca/english/pubpres/papers/datamine.htm, Aug. 2002.*

Information technology and the privacy of the Individual, The Role of Privacy in Modern Society, by Dave Redell, Sep. 23, 1992 downloaded from http://home.pacbell.net/webright/personal/acm.text.*

Permission Marketing by Seth Godin, Simon and Schuster, copyright 1999, chapter 10.*

Permission Marketing : The Way to make advertising work again (Interactive Marketing) (excerpt from "Permission marketing: Turning Strangers into Friends and Friends into Customers") Dialog # 01777383, File # 570, by Hoke Communications Inc., May 199.*

Fleet financial banks on data warehouse, Target Marketing, Philadelphia, Nov. 1998.*

Bayesian Model Averaging: A Tutorial (with discussion) ( 306k bytes ) Corrected version of the Statistical Science 14:4, 382-417 article. Jennifer A. Hoeting, David Madigan, Adrian E. Raftery and Chris T. Volinsky, Nov. 1999, downloaded Jul. 22, 2002.*

First Office Action on U.S. Appl. No. 10/727,535, filed Dec. 5, 2003 and mailing date of office action Dec. 14, 2004.

Final Office Action on U.S. Appl. No. 09/758,239, filed Jan. 12, 2001 and mailing date of office action Nov. 3, 2004.

Office Action on U.S. Appl. No. 09/837,377, with filed Apr. 19, 2001 and mailing date of Office Action Oct. 4, 2006.

Office Action on U.S. Appl. No. 10/727,496, filed Dec. 5, 2003 and mailing date of Office Action Dec. 1, 2006.

Office Action on U.S. Appl. No. 10/727,497, filed Dec. 5, 2003 and mailing date of Office Action Dec. 1, 2006.

Office Action on U.S. Appl. No. 10/729,678, filed Dec. 4, 2003 and mailing date of Office Action Nov. 30, 2006.

Office Action on U.S. Appl. No. 10/729,342, filed Dec. 4, 2003 and mailing date of Office Action Dec. 18, 2006.

Final Office Action on U.S. Appl. No. 10/727,535, filed Dec. 5, 2003 and mailing date of office action Sep. 14, 2005.

Office Action on U.S. Appl. No. 10/727,482, filed Dec. 5, 2003 and mailing date of Office Action May 18, 2007.

Office Action on U.S. Appl. No. 10/729,700, filed Dec. 4, 2003 and mailing date of Office Action Apr. 17, 2008.

Magill, Ken, "Firm to Offer Cash for Consumer Profiles," iMarketing News, vol. 2, No. 10, Mar. 13, 2000, pp. 1-3.

Non-Final Office Action issued on Jan. 30, 2009 for U.S. Appl. No. 10/729,692, filed Dec. 4, 2003, 46 pages.

Non-Final Office Action issued on Jan. 30, 2009 for U.S. Appl. No. 11/041,887, filed Jan. 24, 2005, 40 pages.

* cited by examiner

BUYER-DRIVEN TARGETING OF PURCHASING ENTITIES

CROSS-REFERENCE TO RELATED APPLICATION(S)

This application claims the benefit of priority under 35 U.S.C. §119(e) of provisional application Ser. No. 60/243,960 entitled "Buyer-Driven Targeting of Purchasing Entities," filed on Oct. 30, 2000, the disclosure of which is incorporated herein in its entirety. This application is a continuation-in-part of application Ser. No. 09/758,239 filed Jan. 12, 2001 now abandoned and application Ser. No. 09/837,377 filed on Apr. 19, 2001 now abandoned.

FIELD OF THE INVENTION

The present invention relates generally to the field of marketing, and more particularly to the field of buyer-driven targeting of purchasing entities.

BACKGROUND OF THE INVENTION

In the U.S. alone, marketers spend more than $230 billion per year on advertisements to acquire new customers. Yet, there is no good way to target these advertisements and promotions at those buyer entities—such as individuals and businesses—who are most likely to become valuable customers.

In fact, the customers who take advantage of promotions are often those that are least likely to be valuable repeat customers in the future. For many product categories, the best buyer entities are those that are too busy to hunt for a promotional offer that is available to everyone. An offer of a free sample or a $20 rebate on the first purchase is generally most attractive to those whose opportunity cost of time is the lowest.

Marketers suffer from improper targeting of their promotions and so do buyer entities. If marketers would have a better way of identifying those buyer entities with a high purchase propensity for their products and direct promotions only at them, these promotions would be significantly more lucrative. Marketers would fight for these good customers with better introductory prices and other promotions, as well as with better products and better service. They would be willing to pay or otherwise reward these customers for the right to advertise to them. A marketer who can direct her customer acquisition efforts at those buyer entities who are—on the basis of their past purchase histories—most likely to become valuable customers can afford to divert resources from less efficient and less targeted advertising channels.

Yet, marketers generally cannot not access information on the purchases of a buyer entity who has not yet been acquired and on the purchases that an existing or potential customer makes with other companies. It is the object of this invention to solve this problem, and to do so at a minimal loss of privacy to participating buyer entities.

Because information on a buyer entity's purchases is so valuable, some of the companies that have offered only the slightest, very imprecise and restricted glimpse at a buyer entity's past purchase history with other companies have been able to reap great rewards in the marketplace. The current efforts by businesses to capture or infer information about a buyer entity's purchases with other companies can be categorized into two broad categories:

1. Asking buyer entities questions about their purchase interests and/or past purchases with other companies.

2. Establishing a network of non-competing vendors who share information with each other about a customer's past purchases, and who sell this information to other non-competing businesses.

Both of these methods have significant drawbacks.

The first method is practiced by several direct marketers, such as Fingerhut Companies, Inc, YesMail, MyPoints and Netcentives. These companies ask their m embers questions relating to their purchase interests and habits for the purpose of sending them targeted advertising messages. The main drawback of this method is that information given by customers about their past purchases cannot be properly verified. In fact, because these companies cannot verify information about purchases obtained in this manner, they cannot pay higher rewards to members who claim to have stronger and more relevant purchase histories without encouraging false or misleading answers. In fact, to date, none of these companies is known to have implemented a system of differential rewards.

Also, buyer entities generally give highly unreliable answers to questions asked by web sites and direct marketing companies, even when their answers do not affect the benefits that they get when using the service. Additionally, answering questions takes time which the buyer entity may not be willing to give and which also ties up the network.

The second method is practiced most prominently by Abacus Direct, which is now a division of Doublecklick, Inc., and which uses purchase records obtained from catalog sellers for marketing research and other marketing purposes.

The main drawback of this method is that Abacus Direct and other companies that compile transaction data from certain marketers cannot—and do not—allow other marketers to use this information for the purpose of directly competing with those who provide the information in the first place.

For instance, a national jeweler might be able to use Abacus Direct to review a list of those who have bought expensive clothing. But Abacus Direct cannot allow him to review a list of consumers who have bought jewelry itself. Abacus would have obtained that list from another jewelry retailer, and is therefore obligated to the provider of that list that it not be used by his competition.

Furthermore, because these companies obtain records from a limited number of marketers, they obtain only very fragmented information on individual customers or business entities. Abacus Direct, for instance, maintains records that cover many million households, but with very limited information about the average household in its database.

Moreover, for these companies, the process of obtaining permission to send Emails to a customer is separate from the process of obtaining information about the customer's purchases. Email is by far the most powerful direct marketing technology available today. But an established reputable company cannot send Emails to customers without first having obtained the customer's permission to do so. Therefore, only a small fraction of the purchase records obtained by Abacus Direct are used for the purpose of direct online marketing.

Besides the above described efforts by businesses to capture information about a buyer entity's past purchase history with other companies, credit card companies or banks working with electronic bill payment and presentment companies can also use the purchase information that they have on many buyer entities for the purpose of targeting advertisements and promotions. However, these players face the same problem than the one described above for networks of non-competing merchants: they cannot allow marketers to use the information that is provided by participating companies for the purpose of competing with the very same companies that provide the information.

A credit card company for instance, like American Express, cannot reasonably hope to retain it's merchants as clients if it was to potentially use the information obtained from these clients to grant the competition access to its' clients proprietary customer lists. The same is true for so-called "Electronic Bill Payment and Presentment Companies" ("EBPP's") such as the Checkfree Corporation, and banks working with EBPP's to present bills to their customers online. These companies present bills to buyer entities and allow buyer entities to pay these bills electronically. The bills are, generally, directly obtained from billers, the companies that issue those bills. If these EBPP's or the banks working with these EBPP's allow other companies to use the bill payment and presentment process for the purpose of promoting products that directly compete with those that are being paid, billers will no longer transmit their bills to these EBPP's.

SUMMARY OF THE INVENTION

Briefly, in one embodiment the present invention comprises a method for buyer-driven targeting comprising the steps of: separately receiving for each of a plurality of buyer entities a respective third party proof of purchase record; entering information from the received proof of purchase records into a searchable electronic database; obtaining search criteria for the database; searching the information in the database using the search criteria to obtain a group of buyer entities; and providing an incentive to each of a plurality of the buyer entities in said group.

In a further aspect of the invention, the providing an incentive step comprises setting the incentive for each buyer entity in the group based on its purchases of a particular product or service. In a further aspect of the invention, the plurality of buyer entities are individual persons.

In a yet further aspect of the invention, the plurality of the buyer entities are corporate or other legal entities.

In a further aspect, the invention comprises the steps of: receiving buyer entity preferences for categories of third parties; wherein the obtaining search criteria step includes receiving a merchant category designation for the third party; and wherein the searching step comprises forming the group of buyer entities who have indicated in their respective buyer preferences that they would receive a marketing incentive from third parties in the merchant category designation.

In a further aspect, the present invention comprises the steps of: receiving a threshold value from the buyer entity that an incentive must meet before the buyer entity will receive the incentive; receiving a value for the incentive to be provided; and wherein the searching step includes the step of comparing the value of the incentive to the threshold value set by the buyer entity and the step of not including that buyer entity in the group if the buyer entity has set a threshold value for the incentive which is not equaled or exceeded.

In a further aspect, the present invention comprises the steps of obtaining information on whether one of the buyer entities accepted the incentive; and inputting this information to the database.

In a further aspect, the present invention comprises the step of obtaining information on whether the buyer entity made a follow-up purchase or a co-purchase contemporaneous with or after accepting the incentive and inputting this information to the purchase record of the buyer entity in the database.

In a further aspect of the present invention the entering step further comprises the categorization of purchases listed from a plurality of independent third parties in the proof of purchase records based on a set of categories.

In a further aspect, the present invention comprises the step of calculating a score for a buyer entity based on the amount purchased in one or more selected categories.

In a further aspect, the present invention comprises the steps of calculating a separate score for a buyer entity in each of a plurality of categories based on the amount purchased by the buyer entity in the respective category; calculating a composite score for a particular buyer entity in accordance with a function of the separate scores for a plurality of selected categories for the particular buyer entity; and creating a group of buyer entities based on the composite scores.

In a further aspect, the present invention comprises the steps of: weighting questions based on scores of the buyer entity; selecting questions, based, at least in part, on the weight given the question; sending questionnaires electronically to a plurality of the buyer entities; and receiving responses to the questionnaire from a plurality of the buyer entities; weighting the responses from at least one of the buyer entities; and recalculating at least one score for the at least one buyer entity based on the weighted responses.

In a further aspect of the present invention, at least one category is an individual company, and wherein the score for that category is calculated based on the amount of purchases indicated by the proof of purchase records for the individual company.

In a further aspect, the present invention comprises the step of sending at least one score of a particular one of the buyer entities to a third party after receipt of an authorization from the particular buyer entity. In a further aspect, the present invention comprises storing electronically at least one score for a buyer entity at a computer of the buyer entity.

In a further aspect of the present invention the storing step comprises storing the at least one score on a cookie.

In another aspect, the present invention further comprises the step of the buyer entity sending the score to a third party.

In another aspect, the present invention further comprises the steps of: recalculating the scores for each of a plurality of buyer entities based on new proof of purchase records entered in the electronic database; comparing the recalculated scores to a threshold; and generating an indication if one of the recalculated scores exceeds the threshold but the score before recalculation did not exceed the threshold.

In a further aspect of the present invention, the indication comprises providing an incentive to a buyer entity with a recalculated score that exceeds the threshold but the score of the buyer entity before recalculation did not exceed the threshold.

In another aspect, the present invention further comprises the step of calculating a fee based on the scores of the buyer entities provided the incentive.

In another aspect, the present invention further comprises the step of obtaining information on whether the buyer entity made a follow-up purchase or a co-purchase contemporaneous with or after accepting an incentive and providing added points over and above the points normally attributed for accepting such an incentive when calculating the score for the buyer entity.

In another aspect, the present invention further comprises the steps of obtaining information on whether one of the buyer entities accepted the incentive; and providing points for accepting the incentive recalculating at least one of the scores for the buyer entity.

In a further aspect of the present invention, the providing an incentive step comprises determining an incentive wherein a type and/or amount of the incentive is selected for the buyer entity by applying the score of the buyer entity to an incentive function.

In a further aspect of the present invention, the providing an incentive step comprises determining an incentive within an incentive structure wherein a type or amount of incentive is provided to the buyer entity based on an electronic input from the buyer entity.

In a further aspect of the present invention, the providing an incentive step comprises determining an incentive from within an incentive structure wherein a type or amount of incentive is provided to the buyer entity based on the buyer entity meeting predetermined search criteria.

In a further aspect of the present invention, the providing an incentive step comprises selecting the incentive based on a first criteria of purchasing of a particular good or service, and a second criteria of a minimum number of different instances when the particular good or service was purchased in a predetermined time period.

In a further aspect of the present invention, the providing an incentive step comprises setting the incentive based on a first criteria of purchasing of a particular good or service, and a second criteria of a minimum monetary value purchased of the particular good or service purchased in a predetermined time period.

In another aspect, the present invention further comprises the step of linking to a third party database and inputting information therefrom on whether the buyer entity made a follow-up purchase or a co-purchase contemporaneous with or after accepting the incentive and inputting this information to the database.

In a further aspect of the present invention, the providing an incentive step comprises including a cookie with the incentive, with the cookie designed to monitor predetermined activity relating to the incentive.

In another aspect, the present invention further comprises the step of submitting a request to one of the buyer entities to provide a rating of a product or service only if the purchase record of the buyer entity shows a purchase of the product or service to be rated.

In a further aspect, the present invention comprises the steps of: weighting each entity submitted rating for a product or service according to the money spent on the particular product or service by the entity; and creating an average rating for the product or service based on the weighted entity submitted ratings.

In a further aspect, the present invention comprises the step of calculating a charge for providing the incentive based on the size of the group of buyer entities resulting from the search.

In a further aspect, the present invention comprises the step of calculating a charge for providing incentives based on a number of elements in the search criteria.

In a further aspect, the present invention comprises the step of calculating a charge for providing the incentive based on both the size of the group of buyer entities resulting from the search and the scores of the buyer entities.

In a further aspect, the present invention comprises the step of comparing a source of the third party proof of purchase records with a source database of third parties and entering only those proof of purchase records from third party sources that are in the source database.

In a further aspect, the present invention comprises the step of categorizing purchases relative to a database of categories and entering only purchases within selected categories.

In a further aspect of the present invention, the entering step further comprises the categorization of purchases listed from a plurality of independent third parties in the proof of purchase records based on a set of categories; calculating a separate score for a buyer entity in each of a plurality of categories based on the amount purchased by the buyer entity in the respective category; and recording at least one of the scores in a cookie on a buyer entity computer that may be accessed from a communications network by at least one merchant.

In a further aspect, the present invention comprises the steps of: the merchant accessing the cookie and obtaining the at least one score; the merchant correlating the accessed score to at least one item of content; and serving to the buyer entity the at least one item of content.

In a further aspect, the present invention comprises the step of updating the score on the cookie.

In a further aspect, the present invention comprises the steps of: adding the purchase amounts for the buyer entity over a first period of time made from a first merchant to obtain a first merchant purchase amount; determining if the first merchant purchase amount exceed a threshold value; and rewarding the buyer entity for having exceeded the threshold value of purchases.

In a further aspect, the present invention comprises the step of updating the searchable database on a continuous basis; and recalculating the scores on a continuous basis.

In yet a further aspect, the present invention may comprise recalculating at least one score for a buyer entity for one of the categories based on one or more of the entry of new purchase records, responses by the buyer entity to questions, the receipt of third party data base information, information that particular incentives have been accepted, information on follow-up purchases, information on web site visits, information on the television viewing habits or the viewing of a particular television program by that buyer entity.

In yet a further aspect of the present invention, the step is performed of determining if the recalculated score qualifies the one of the buyer entities for an on-going incentive.

In yet a further aspect of the present invention, the step is performed of recalculating the incentive determined in the incentive providing step by applying the recalculated score of the one of the buyer entities to an incentive function.

In yet a further aspect of the present invention, the step is performed of providing a plurality of the incentives from different advertisers to one of the buyer entities, including the steps of determining the sequence or the relative prominence of each of the plurality of the incentive awards based on the recalculated score.

In yet a further aspect of the present invention, the step is performed of monitoring the receiver of an interactive television to determine if an ad has been zapped; and providing an incentive to the buyer entity if the ad has not been zapped.

In yet a further aspect of the present invention, the step is performed of monitoring the receiver of an interactive television to determine if an ad has been zapped; and providing an incentive based to the buyer entity if the ad has not been zapped with the incentive determined in accordance with at least on of the scores of the buyer entity.

In yet a further aspect of the present invention, the step is performed of selecting ads from a storage based on a particular television program being received by a receiver of that buyer entity and displaying those ads in a predetermined sequence.

In yet a further aspect of the present invention, the step is performed of selecting a sequence of ads to be displayed based on a particular television program being received by a receiver of the buyer entity and on the scores of that buyer entity.

In yet a further aspect of the present invention, a step is performed of determining an incentive for viewing a television advertisement based on a particular television program being received by a receiver of the buyer entity.

In yet a further aspect of the present invention, a step is performed of determining an incentive for viewing a television advertisement based on password entered from a receiver of the buyer entity.

In yet a further aspect of the present invention, a step is performed of determining an incentive for viewing a television advertisement based on a predetermined response received from the receiver of the buyer entity and at least one score of the buyer entity.

In a further embodiment of the present invention, a method is provided for buyer-driven targeting comprising the steps of: sending to a buyer entity an offer to provide an incentive in return for address information of the buyer entity; receiving from the buyer entity a response containing the address information; correlating the address information with at least one attribute from a database of attributes of buyer entities in an area indicated by the address information; selecting from a plurality of incentives based on the correlated attribute; and presenting the selected incentive to the buyer entity.

In yet a further embodiment of the present invention, a method is provided for buyer-driven targeting comprising the steps of: sending to a buyer entity an electronic offer for participating in an incentive program in return for access to a purchase information pertaining to the buyer entity from at least three merchants; receiving from the buyer entity an electronic response with a digital identity verification granting a right of access to the purchase information of the merchants; downloading the purchase information from the merchants; electronically searching the purchase information to obtain at least one attribute from the purchase information about the buyer entity; correlating that attribute to an incentive from a plurality of incentives based on the correlated attribute; and presenting the selected incentive to the buyer entity.

In yet a further embodiment of the present invention, a method is provided for buyer-driven targeting comprising the steps of: sending to a buyer entity an offer for participating in an incentive program in return for unverified purchase information pertaining to the buyer entity and access to verification information held by merchants; receiving from the buyer entity an electronic response with the unverified purchase information and a digital identity verification granting a right of access to the buyer entity verification information held by the merchants from whom the purchases were made; making a comparison of the unverified purchase information for the buyer entity and the buyer entity verification information from the merchants to verify that the unverified information is accurate purchase information; electronically searching the accurate purchase information to obtain at least one attribute about the buyer entity; correlating that attribute to an incentive from a plurality of incentives based on the correlated attribute; and presenting the selected incentive to the buyer entity.

In a further aspect, the present invention comprises the steps of: adding the purchase amounts for the buyer entity over a first period of time made from a first merchant to obtain a first merchant purchase amount; determining if the first merchant purchase amount exceed a threshold value; and sending an incentive to the buyer entity for having exceeded the threshold value of purchases.

In yet a further embodiment of the present invention, a system is provided for buyer-driven targeting comprising: a first component to separately receive from each of a plurality of buyer entities a respective third party proof of purchase record; a searchable electronic database to enter the received proof of purchase records; a second component for obtaining search criteria for the database; a search component for searching the proof of purchase records in the database based on the search criteria to obtain a group of buyer entities; and a third component for providing an incentive to each of a plurality of the buyer entities in the group.

In a further aspect of the invention, all of the foregoing method embodiments can be implemented in system embodiments using software components, hardware components, or a combination thereof.

In a further embodiment of the present invention, a method is provided for buyer-driven targeting comprising the steps of: accessing at least one score for a buyer entity based on purchases in one or more selected categories; and selecting and/or sequencing advertisements to be provided to a receiver of a video channel based on at least one score of said buyer entity.

In a further aspect of the invention, the steps are included of receiving third party proof of purchase records for a buyer entity; entering information contained in the received proof of purchase records into a searchable electronic database; categorizing purchases listed from a plurality of independent third parties in the proof of purchase record based on a set of categories; and calculating at least one score for a buyer entity based on purchases in one or more selected categories.

In a further aspect of the invention, the steps are provided of calculating a separate score for a buyer entity in each of a plurality of categories based on the amount purchased by the buyer entity in the respective category; calculating a composite score for a particular buyer entity in accordance with a function of the separate scores for a plurality of selected categories for the particular buyer entity; and wherein said selecting and/or sequencing step comprises selecting and/or sequencing advertisements based in part on the composite score.

In a further aspect of the invention, the step is provided of providing an incentive to the buyer entity for watching a selected advertisement on the video channel based on at least one score of the buyer entity.

In a further aspect of the invention, the step is provided of recalculating at least one score for a buyer entity for one of the categories based on information on the video channel viewing habits or the viewing of a particular television program by that buyer entity.

In a further aspect of the invention, the step is provided of determining if the recalculated score qualifies said one of the buyer entities for an on-going incentive.

In a further aspect of the invention, the step is provided of recalculating an incentive by applying said recalculated score of said buyer entity to an incentive function.

In a further aspect of the invention, the step is included of providing a plurality of said incentive offers from different advertisers to the buyer entity, including the steps of determining the sequence or the relative prominence of each of the plurality of the incentive offers based on said recalculated score.

In a further aspect of the invention, the step is provided of monitoring the receiver of a video channel to determine if an ad is shown by the receiver and has not been zapped by the buyer entity; and providing an incentive reward to the buyer entity if the ad has not been zapped.

In a further aspect of the invention, the incentive reward is a reduction in a pay per view charge for a program being viewed at the same time as the ad.

In a further aspect of the invention, the steps are provided of monitoring the receiver of an interactive video channel to determine if an ad has been zapped; and providing an incentive to the buyer entity if the ad has not been zapped with the incentive determined in accordance with at least one of the scores of the buyer entity.

In a another aspect of the invention, the selecting and/or sequencing step further comprises selecting and/or sequencing ads from a storage based, in part, on a particular video channel program being received by the receiver of that buyer entity.

In a further aspect of the invention, the step is provided of creating a group of buyer entities based at least in part on one or more of said scores; and wherein the selecting and/or sequencing step comprises selecting and/or sequencing advertisements to be provided to the group of buyer entities.

In a further aspect of the invention, the step is provided of determining an incentive for viewing a television advertisement based on a particular video channel program being received by a receiver of the buyer entity.

In a further aspect of the invention, the step is provided of determining an incentive for viewing an advertisement based on a password entered from a receiver of the buyer entity.

In a further aspect of the invention, the step is provided of determining an incentive for viewing a video channel advertisement based on a predetermined response received from the receiver of the buyer entity and at least one score of the buyer entity.

In yet a further embodiment of the present invention, a system and program product is provided for buyer-driven targeting comprising: a component and/or code for accessing at least one score for a buyer entity based on purchases in one or more selected categories; and a component and/or code for selecting and/or sequencing advertisements to be provided to a receiver of a video channel based on at least one score of said buyer entity.

In a further embodiment of the present invention, a method is provided for buyer-driven targeting, comprising the steps of: recording information into at least one buyer entity profile, such information having been generated as the result of at least one action or activity taken by the at least one buyer entity; calculating for the at least one buyer entity at least one measure which indicates the amount of benefits available to the buyer entity pursuant to the information contained in the at least one profile; and displaying or otherwise providing the at least one measure to the buyer entity.

In a further aspect of the present invention, the displaying or otherwise providing the at least one measure step includes displaying or otherwise providing the measure to the buyer entity either at regular intervals or before and/or after the buyer entity takes certain actions which generate the information which is stored in the profile.

In a further aspect of the present invention, the displaying or otherwise providing step comprises displaying or otherwise providing to the buyer entity the degree or amount that the measure changed during the most recent interval and/or as the result of the most recent action or actions by the buyer entity In a further aspect of the present invention, the displaying or otherwise providing the change in the measure step comprises quantifying a total or partial value of benefits to which the buyer entity has become entitled as the result of the measure change, and displaying or otherwise providing the buyer entity an estimate of the value of these benefits.

In a further aspect of the present invention, the action is a purchase of a product or service.

In a further aspect of the present invention, the action is responding to an email or clicking a web site ad.

In a further aspect of the present invention, the activity is the buyer entity responding to an advertisement, and wherein the buyer entity profile includes a number indicative of the buyer entity's purchase history, and wherein the calculating at least one measure step includes the step of determining if the number is at or above a predetermined threshold.

In a yet further embodiment of the present invention, a method is provided for buyer-driven targeting comprising the steps of: obtaining access to a third party proof of purchase record or information contained in these proof of purchase records or information otherwise derived from the purchase records for each of a plurality of buyer entities, and with the help or authorization of each of the buying entities; maintaining a searchable electronic database of information pertaining to buying entities; obtaining search criteria; searching the third party proof of purchase records or the information derived from the purchase records based on the search criteria to obtain a group of buyer entities; and providing an exclusive incentive to each of a plurality of the buyer entities in the group without making the same incentive otherwise available or accessible to most other buying entities.

In a further aspect of the present invention, the step is provided of associating records of purchases of buyer entities to activity of those buyer entities with respect to advertisements based on a criteria; and recording this association in the searchable database.

In a yet further aspect of the present invention, the criteria is that the purchase is made within a predetermined period of time before or after the activity.

DETAILED DESCRIPTION OF THE PREFERRED EMBODIMENTS

Buyer-driven Targeting

Figure 1:
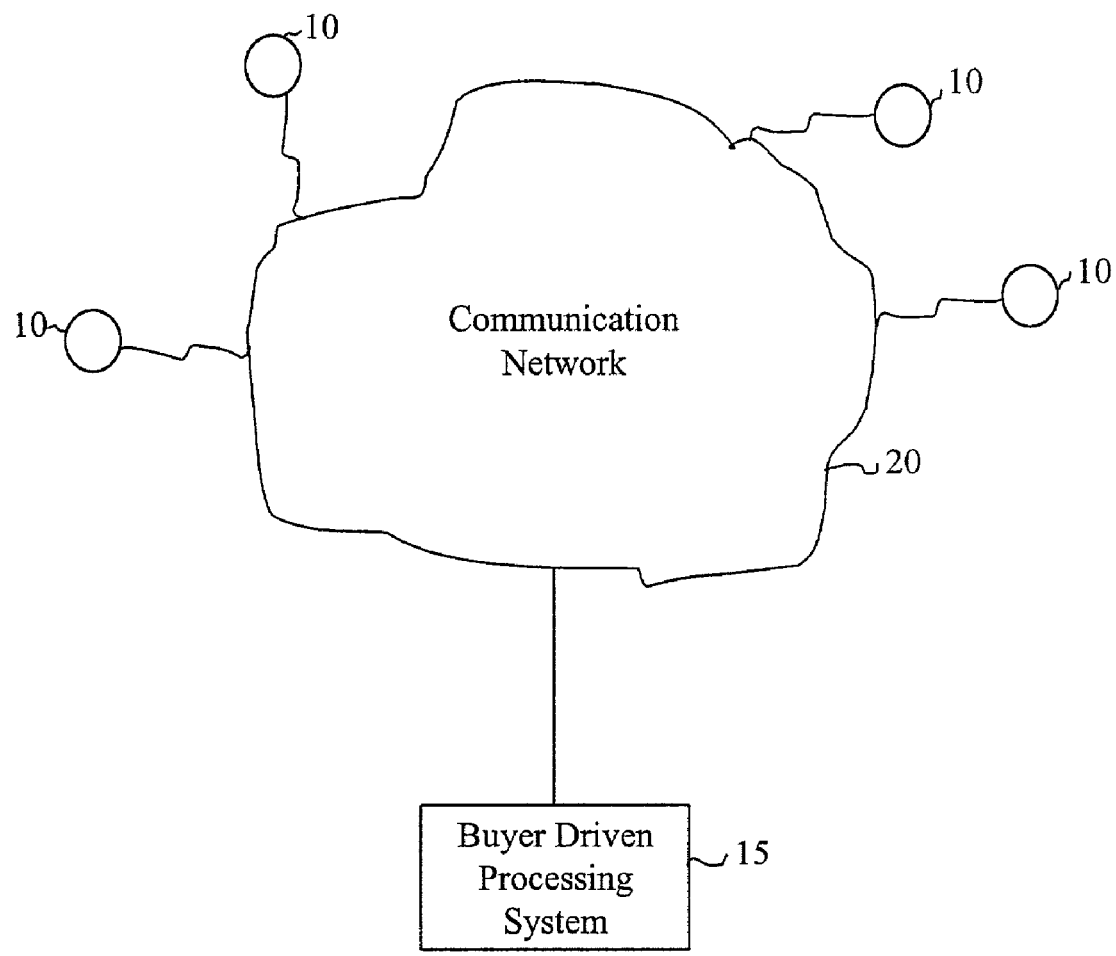
FIG. 1 is a schematic block diagram of a preferred embodiment of the present invention.

In the inventor's opinion, and a premise for the present invention, past purchase behavior is by far the best predictor of future purchase behavior for many products and services. It is further the inventor's opinion, and the premise for the present invention that the best way to predict a buyer entity's propensity to become a valuable repeat customer of these products in the future is to look at his past purchase history.

The inventor's opinion and the premise for the present invention is that without verifying the reliability of a buyer entities' expressions of intent through the use of past purchase histories, any information from the potential buyer becomes less reliable and preferably should not be used to provide some buyer entities with significantly higher rewards and incentives than other potential buyers.

The present invention provides, in a general aspect, a computer implemented method of facilitating buyer-driver target marketing involving buyer entities and various merchants. It is one of the purposes of the present invention to provide a mechanism for buyer entities to make significant parts of their past histories available to marketers, but with minimal invasion of privacy for the buyer entity. Note that a buyer entity is defined to encompass both individuals and businesses.

The basic function performed by the system and method of the present invention is to allow buyer entities to submit their credit card statements and other records that detail past purchases to an entity that is preferably not affiliated with any particular merchant. Third party marketers/advertisers would then provide search criteria, or have search criteria selected for them, to search the database of past histories and offer highly attractive promotions to the group resulting from that search criteria. The past purchase history records could be supplemented by asking buyer entities questions about their past purchases, with the questions themselves chosen from a database of questions, with the selection of question being based on the purchase record earlier submitted by that buyer entity.

In one implementation, buyer entities would submit information on their credit card statements and other verifiable information on their past purchases ("purchase summaries") to the company. Note that such information could include frequent flyer purchase summaries or statements, telephone bills, etc. This information is then entered into an electronically searchable database. A unique membership ID could then be associated with each different buyer entity. The name, address, Email address and other personally identifiable information could be given a unique tag that would prevent it from being accessed during advertiser searches. Alternatively, the personally identifiable information could be stored in a separate database, to prevent access by advertisers.

Buyer entities are tracked by the system via their membership ID. Advertisers and merchants may then select, via the designation of search criteria by or for them, groups of buyer entities who have the potential to become valuable customers on the basis of their purchase histories. The system of the present invention would then associate the selected group of buyer entities with their personally identifiable information and would send out offers, etc., from the advertiser, without the identities of the buyer entities being disclosed to the advertiser that set forth the search criteria. In essence, in order to acquire these particularly desirable buyer entities as customers, the advertiser has this independent system to communicate with this group of buyer entities on its behalf. Through the system, the advertisers may:

1. Reward these buyer entities for reading and responding to advertisements online and offline;

2. Offer exclusive promotional discounts or rewards;

3. Provide superior pre-sale service to them;

4. Send communications tailored to the specific purchase preferences of the customer; and 5. Provide other appropriate incentives.

Rewards for reading and responding to advertisements may be varied by the advertiser depending on the attractiveness of a buyer entity to an advertiser. Additionally, the leverage that a buyer entity obtains on the basis of its purchasing history allows the buyer entity to set a threshold incentive value for which promotions it will consider. For example, the buyer entity could set a threshold comparison step so that only promotions that provide a reward which is at least equivalent to about $1.00 per minute. To facilitate this selection of incentives by the buyer entities, some form of value may be ascribed to the incentive by the system disclosed herein, or by the advertiser, or by some other third party entity. This incentive value would then be compared to a threshold incentive value set by the buyer entity for incentives that it is willing to consider.

Alternatively, the buyer entity may set a threshold of which types of merchants it wishes to receive promotions from. On the basis of their prior purchase histories, many buyer entities will obtain significantly better promotional offers through this mechanism than they otherwise would. In turn, marketers will be able to afford these better promotional offers because they will be able to concentrate their promotional monies on buyer entities that have a high purchase propensity for their products.

Referring now to the figures, FIG. 1 is a block diagram showing the high level components of a preferred embodiment of the present invention. A plurality of buyer entity computer systems 10 are connected through a communication network 20. Each, of a plurality of these buyer entity computer systems 10 could include portions of the processing software to be disclosed below. Alternatively, each of a plurality of the buyer entity computer systems 10 could be connected through the communication network 20 to one or more buyer-driven processing systems 15 that contain the processing software to be described below. It should be understood that the buyer entity computer system 10 could also be a communications device, such as a WAP enabled device, that communicates directly with processing software at one or more processing systems 15 or at an intermediate computer server that communicates with the processing system 15.

In the preferred embodiment, the communication network 20 is the internet. However, the communication network 20 can also include a wide area network (WAN), internetwork, a public tariff telephone network or a private Value Added Network (VAN). Alternatively, the communication network can be implemented using any combination of these different kinds of communication networks. It should be appreciated that many other similar configurations are within the abilities of one skilled in the art and all of these configurations could be used with the method of the present invention. Furthermore, it should be recognized that the computer system and network disclosed herein can be programmed and configured in a variety of different manners, by one skilled in the art, to implement the method steps discussed further herein.

Figure 2:
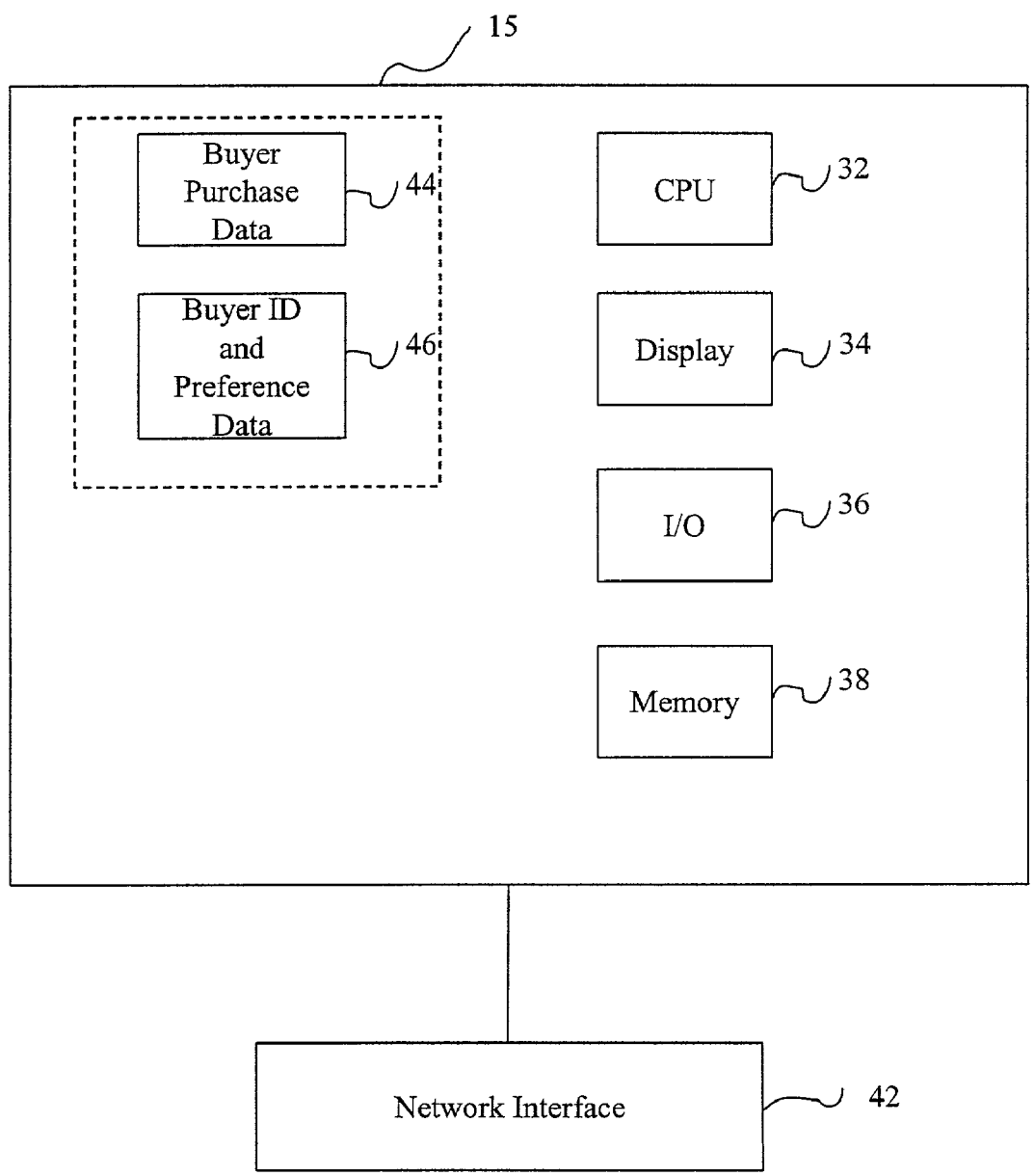
FIG. 2 is a schematic block diagram of a central controller that may be used to implement the present invention.

FIG. 2 is block diagram showing one embodiment of the components of the buyer-driven processing system 15 for implementing the present invention. The processing system is implemented as a computer system which includes all the customary components of a computer system including a CPU 32, a display 34, a keyboard and/or other I/O device 36, a network or communications interface 42, RAM or ROM or other memory 38, as well as storage devices 44 and 46, which for example may be implemented by disk and CD-ROM drives or arrays for storing one or more searchable electronic data bases that include buyer personally identifiable data, buyer preference data and buyer purchase data. Note that a single data base may be used, with the personally identifiable data and the buyer purchase data being maintained separate, but linked, for example, via tags in a data structure. In another example, data fields containing buyer personal data are hidden or protected by access control levels from being directly accessed by advertisers or merchants. Alternatively, the data may be placed in physically separate data bases. By way of example but not by way of limitation, one method of storage would be to provide a variety of dispersed databases. As one example, the databases could be dispersed regionally. In another example, the databases could be dispersed based on system type. In yet a further example, the data could be maintained on one or more third party data bases. The third party data bases could comprise, for example, one or a plurality of third party credit card data bases or retailer data bases. In yet a further embodiment of the data storage, the data bases could comprise the computers or other machines of the individual buyer entities, themselves. Access could be obtained via a cookie or other functionality. With the use of buyer entity machines as the data storage, access could be obtained on an ad hoc basis or by a periodic polling, or after one or a predetermined number of actions are taken by the buyer entity.

It should also be noted that a single CPU based computer system is shown for clarity in the figure. One skilled in the art would recognize that the processing system 15 could also be implemented using a multi-processor computer system. Alternatively, a distributed computer system could be implemented in which the functionality of the processing system could be provided by several computer systems that are connected over a computer network. It is also possible to distribute the functionality of the processing system over a multitude of sites which are suitably connected together using conventional networking or inter-networking techniques.

Figure 3A:
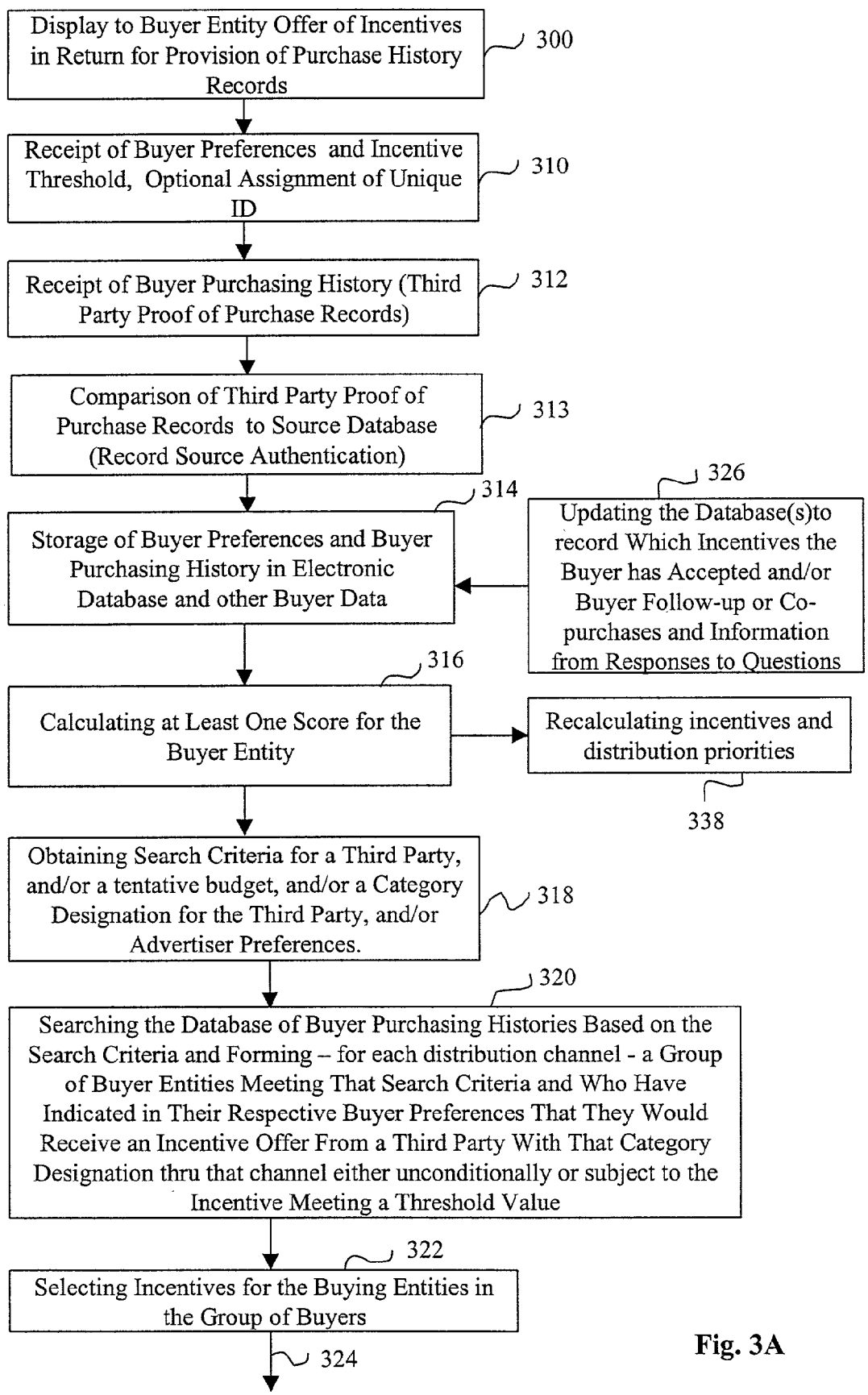
FIGS. 3A and 3B comprise a flow chart diagram of a preferred embodiment of the present invention.
Figure 3B:
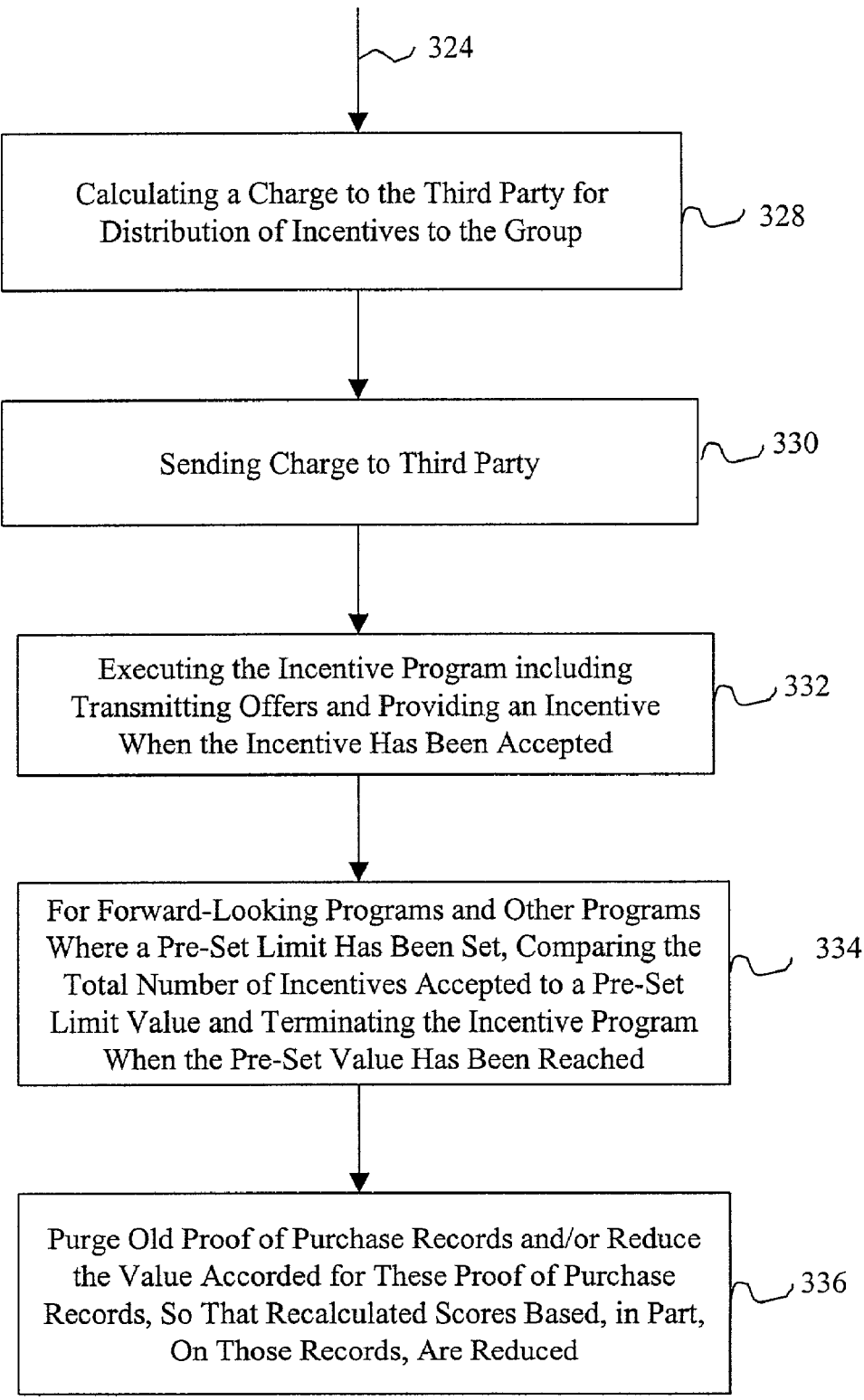

Referring to FIGS. 3A and 3B, there is shown a preferred flowchart execution for implementing the present invention on processing system 15. The first step 300, is to display to a buyer entity an explanation of system of the present inventive system, including the opportunity to receive promotions in one or more categories in return for the provision of the purchase history records for the buyer entity. The buyer entity could then respond electronically to provide permission to send him promotions in certain preference areas, and set forth those preference areas. This is represented in the process by block 310, by the receipt from a buyer entity, who has chosen to respond to this query, of identification information and preference information. The preference information could specify the category of advertisements or merchants from which it wishes to receive information and promotions, i.e., only promotions for real estate in Virginia, or only promotions on jewelry, or only promotions on soccer equipment. The preference information could also include one or more threshold incentive values, i.e., the buyer entity is only willing to receive incentives, generally, or incentives for jewelry, which equal or exceed $1.00 in value. The process then moves to step 312, comprising receiving the purchasing history of the buyer entity. This step 312 could be performed at the same time as the receipt of the buyer entity ID information and preference information. Some of the variety of options for receiving this information in step 312 and storing this information in step 314 are as follows:

Hard Copies

1. Purchase Record maintaining company (credit card company, frequent flyer company etc. . . . ) sends copy to buyer entity.
2. Buyer entity mails or faxes hard copy or original to the system and indicates whether the statement is a copy or the original.
3. If statement is the original, the system may make a copy and send original back to the buyer entity.
4. The system entry operator prepares the statement for entry into the database and enters the data. Note that the entry of the information into the database could be partly or almost entirely automated thru the use of Optical Character Recognition Software and the development and programming of routines that are applicable to different types of statements. ("Automated Entry") This step could include the system entry operator or the scanning system categorizing each purchase by comparison to a database of categories, and then only entering into the system database those purchases falling within selected categories, or alternatively, not entering those purchases falling within certain selected categories, i.e., adult movie purchases. The categorization function and the types of categories will be discussed below.
5. The proof of purchase record could also be sent back to the Buyer entity to give it the option of editing the proof of purchase record and deleting records, if any.
6. Entries are recorded into the database.

Online Entry of Summary Statements

1. Buyer entity retrieves statement online (or scans hard copy).
2. Buyer entity saves and downloads statement in file.
3. Buyer entity transfers statement by Email or through Web application to the system.
4. The system entry operator prepares statement for entry into the database and enters data making partial or full use of Automated Entry with categorization as described above.
5. Buyer entity has option of editing statement and deleting records, if any.
6. Entries are recorded into the database.

Transfer and Entry of Online Transactions at Time of Transaction

1. Whenever buyer entity enters credit card or purchases an item on its computer, a window opens asking if it would like to store the purchase record for download to the present system.
2. If the buyer entity answers yes, the system then automatically enters the purchase record into the database using the above described Automated Entry and categorization. Alternatively, the transaction record may be stored in a separate file on the hard disk of the buyer entity's computer; and the transaction record sent by Email to the buyer purchase record database in the system 15. Note that the buyer entity's computer could send the data in batch mode.

If an ID number is assigned to the buyer entity, then it will be included in the transmission. This transmission may be performed automatically. Alternatively, the buyer entity may be asked each time or periodically for permission to forward the purchase history to the system 15, and this transmission is performed, if the buyer entity responds in the affirmative.

Automated "Robot" Online Scanning of Purchase Histories

1. Buyer entity enters username and password for various third party accounts that contain purchase records.
2. The processing system 15 automatically logs on to these various accounts, retrieves and stores purchase histories using the Automated Entry and categorization.

3. Optionally, the buyer entity may be given the right to edit these statements prior to entry in the database.

4. Statement is stored in the database.

Technology for such online retrieval and scanning of data from various accounts already exists. Two companies, Yodlee and Avaya, have sold the use of this technology to various consumer web sites, such as Yahoo. In this instance, the consumer gives its access password to the site so that the site can access and download account information. Thus, these consumer web sites use it to allow consumers to view their personal account information, which is compiled from various online accounts, in one "place" on the web, consolidated on a single online page or online statement. This helps consumers have more immediate access to the information that resides in various disparate accounts without having to go to multiple web sites and to type in their password and username multiple times. Note that this technology aggregates account information, possibly including information from credit card accounts, but does not require any additional active cooperation or explicit permission of the company that makes this information accessible to its consumers online. This is important for the present invention, for the reasons mentioned previously: the buyer entity has physical access to their purchase records online and can—thru the use of buyer-driven targeting—use this information to its advantage in its dealings with competing businesses: it can do so, without the consent of the companies which sold the products, or the financial institution which depends on the business of the companies. Whatever technology is used to provide the purchase statements, the common denominator of the various ways for receipt of a buyer's purchase history is that this process is done on the initiative and with the consent of the buyer entity and in exchange for an incentive or the expectation of an incentive or a benefit.

Yet another way that a buyer entity can submit a proof of purchase is by using a credit card that has been issued by the company that is using the present invention. The buyer entity could also use a smart card which stores information on the purchases of the buyer entity in a microchip of the card itself, and later make the information available by means of a card reader that transmits the information contained in the card to the processing system.

Yet another way of receiving this information would be to retain the information on the buyer entity computer or other machine or on one or more third party vendor machines with some form of access being provided to the present inventive system. By way of example but not by way of limitation, the records could be maintained or accessed via a cookie or other access program or functionality on the buyer entity machine. Note that in such a configuration, the system of the present invention would maintain a listing of the buyer entities in one or more databases in order to facilitate searching and access, but the actual purchase records would be maintained on the buyer entity machine or another third party machine. The system data base would maintain selected information that would facilitate searching of the buyer entities. By way of example but not by way of limitation, the system data base could include with its listing of the buyer entity one or more items of demographic information, or a buyer entity score in one or more categories, or any other convenient information that might facilitate accessing selected buyer entities based on their purchase records.

During the process of receipt of buyer entity identity information and purchase history information, or thereafter, the buyer entity identity information could be verified, as represented by block 313, by comparison of the received identity information with the information in one or more databases containing identity information. Alternatively or in addition, buyer entity digital signatures or digital certificates or other method of electronic verification or telephone verification could be used. Additionally, the third party proof of purchase records received from the buyer entity that constitute the buyer entity purchasing history, could be compared to a database of third party merchants to verify that the proof of purchase record is valid. This verification could also be accomplished by electronically or manually contacting the third party merchant to obtain verification of the proof of purchase record.

In a preferred embodiment, a buyer entity may be assigned scores based on its purchasing in selected categories of merchandise or services or merchants. The one or more scores could, by way of example but not by way of limitation, be calculated (i) based on a number representing or derived from the exact or approximate amount of a purchase verified by a proof of purchase record; (ii) based on a number which is the sum of or is derived from the sum of the exact or approximate amounts of two or more purchase records; and/or (iii) any other amount derived from information contained in proof of purchase records, including quantity numbers. The step is represented by block 316 in FIG. 3. In order to facilitate such scoring, the purchases listed from a plurality of independent third parties in the proof of purchase records are categorized, as noted above, with a category for each of a plurality of the companies with whom the buyer entity made a purchase according to the purchase records within certain time periods. A buyer entity's purchases are also categorized based on a set of categories which may be based on purchases from a set of merchants, or an aggregation of purchases of merchandise of a certain type, or of a certain value, or for example, that meet a certain threshold amount for a category. By way of example, there could be a category of Neiman Marcus purchasers, or more generally of department store purchasers, discount shopper purchasers, jewelry purchasers, Borders Bookstore purchasers, luxury item purchasers, brand name purchasers, risk adverse purchasers, etc. In one embodiment of the present invention, these one or more category designations per purchase record may be added to the individual purchase records in the database. Alternatively, the category information may be stored separately.

A score could be calculated for one or more of such categories based on the level of purchases of goods or services in that category over some predetermined time period. As noted above, each buyer entity could have a separate score for each company from which it purchased products in a given time period, and which summarizes the total purchases made from that company. By way of example, a buyer entity, which submits purchase records for the year 2001 at the beginning of the year 2002, could have a score of 320 from Macy's for the year 2001, indicating that it purchased products in the value of $320 from Macy's during the year 2001 on the basis of its submitted purchase records, and a score of 155 from Walgreen's, indicating that it has proof of purchase records indicating it to have purchased products worth total of $155 from Walgreen's during the year 2001, or a score of 1450 in the discount purchase category, indicating that the buyer entity has shown to have purchased $1450 from various discount stores in 2001. It should be noted that the system has the option of selecting and entering only purchases within selected categories and discarding or separating the purchase information in other categories.

As another example of a method of scoring, a separate composite score could be calculated for a buyer entity based on the amount purchased by the buyer entity in a plurality of categories. A composite score could be calculated for a particular buyer entity in accordance with a function of the separate scores for a plurality of selected categories for the particular buyer entity. By way of example, this function could simply be an addition function, wherein the scores for a plurality of categories are added to obtain a composite score. It is then possible for the search criteria in block 318 to request only buyer entities with a composite score above a predetermined threshold. For example, a composite score could be calculated comprising the addition of the scores in the categories of foreign luxury cars, jewelry, and foreign travel. Alternatively but not by way of limitation, the composite score function could be a rule based algorithm wherein the various category scores are weighted in accordance with predetermined rules, as is well known by one of skill in the art.

As mentioned above, the present invention comprises in further aspects the transfer of these scores either directly to a third party at the request and/or with the permission of the buyer entity, or the transfer of a score to the computer of the buyer entity for later transfer to a third party. Increasingly, companies are implementing systems which allows them to distinguish between different customers on the basis of their purchase histories for the purpose of providing them different levels of service. Many Airlines, banks and hotels increasingly use systems which inform customer service agents of the relative value of the customer that they are servicing based on the purchase history from that particular company. These companies as well others in other industries, including retailing, have installed procedures and given instructions to their employees with the object of giving preferential service and treatment to those customers who are deemed to be more valuable at the expense of those whose purchase history from that company indicates that they are less likely to contribute to company earnings. These companies only look at the purchase history of customers at their own company. However, a company would stand to benefit from a system which allows it's customer service agents and salespeople to identify those buyer entities who have not yet made significant purchases with the company, but have the potential of doing so on the basis of their purchases with competitors or with high scores in categories that indicate a strong potential to purchase from the company in the future. Clearly, these companies would stand to benefit from wooing those "high-value" customers and clients with high levels of post-sale service. Conversely, buyer entities would stand to benefit from identifying themselves on the basis of their higher than average scores to these companies.

However, there will be instances when a buyer entity consistently shows by its scores that it has high levels of purchase activity with respect to a particular product or service, but is not responsive to a company who has been granted access to these scores, except on an occasional basis. This failure may occur, in spite of high levels of service and preferential treatment on these infrequent occasions when the buyer entity does avail itself of the company's services. It is then conceivable, that a buyer entities' scores would work against it, because the company would come to the conclusion that providing high levels of service is to no avail with respect to winning the business of this particular buyer entity. The company could conclude that the buyer entity is less likely to become a good customer compared even to other customers with similarly low levels of purchases with the company. This is because the other customers, who are on average less frequent buyers of the particular product or service offered by the company, could conceivably increase their purchases in that category and by extension with the company, whereas a similar increase of the customer that is already purchasing the products in that category at a high level of volume and frequency is both less likely and less likely to benefit the company itself. However, the company implementing the invention can contractually agree with any companies that receive these scores that they not be used to downgrade or reduce services to buyer entities, thereby preserving the usefulness of that aspect of the invention to the buyer entities that avail themselves of its benefits.

Referring again to FIG. 3A, it should be noted that the information stored in the database(s) 44 and 46 for each buyer entity may be enhanced subsequently or contemporaneously through the use of interactive questioning of the buyer entity to be discussed below and the inclusion of information from publicly available data sources about the buyer entity. This operation is represented by block 326 in FIG. 3. Block 326 also includes updating the searchable electronic database with information on which incentives the buyer entity has accepted and any follow-up purchases or co-purchases. This incentive acceptance and purchase update aspect will be discussed in more detail later.

For an interactive Questioning implementation for block 326, the administrator of the system could enter the following at set-up:

Questions.

Rules for determining the relative importance of these questions based on weights given to the scores of a buyer entity.

1. In this process, the first step is for the processor 15 to calculate scores, as discussed previously, based on the proof of purchase information for an individual buyer entity according to several pre-defined categories.

2. A finite set of questions (for example, assume about 400 questions) are entered into relevant database of system 15.

3. The system 15 examines the scores, then assigns points to one or several of the 400 questions based on their relevance/correlation to these scores.

4. The system 15 then ranks questions based on the points assigned to the questions during the prior step.

5. A finite number of top questions (questions with high point assignments) are asked of the member (for example, about 10).

6. The system assigns points to each of the remaining questions based on the answers to the first questions asked.

7. Additional Questions are asked.

8. Steps 7 and 8 can be repeated optionally.

9. The responses may be weighted and then inputted into the purchase history for the buyer entity and/or used to adjust one or more scores of the buyer entity.

For further enhancement of the data on each buyer entity in the searchable electronic database of the present invention, 1. The system requests information from companies that provide such data on buyer entities ("Infomediary").

2. The buyer entity then may be presented with such information obtained from the Infomediary and given the option of correcting the information.

3. The buyer entity is given the option of attaching this additional information to its purchase history data stored in the system for the purpose of receiving better promotional offers.

4. The buyer entity is instructed about privacy measures; and referred to a partner company should he chose to opt out of similar enhancement services with other companies.

A further option available is for the buyer entity to enhance its data through it web behavior in order to obtain further enhancements. This option would entail the recording in the database of the present invention of the buyer entity activity on the web. The buyer entity can choose to restrict this to certain categories of sites, such as shopping and product research sites only.

The next step in the inventive process as noted above, represented by block 318, is to receive search criteria from a third party, as well as a category designation for the third party. Typically, the third party will be an advertiser or merchant or service provider that is interested in directing advertisements and promotions to a limited group of buyer entities that have higher then normal inclination to purchase the product that the third party is offering. At this point, the advertiser would also input, or the system or a systems operator would interact with the advertiser to determine the tentative budget for the advertiser's program, i.e. the total amount of money that the advertiser is intending to spend on the advertising program that is directed to the buyer entities who have previously registered and submitted their purchasing histories. This budget figure could then be used as one factor to prioritize advertisements within a sequence of advertisements and to select one or a plurality of distribution channels. The initial budget of the advertiser might be based on a fixed fee that is paid in exchange for a certain number of advertisements that are sent out in various ways to the buyer entities (this is commonly referred to as "CPM" (cost per mile, which is the cost per one thousand advertising message sent out). Additionally or alternatively, it might be based on variable fee that depends on the number of responses from those who receive the advertisements (this is commonly referred to as "CPA", cost of action.) Note that the responses from those receiving the advertisement might be defined in several different ways and could include any or all of the following: clicks on banner ads or Emails sent, redeemed coupons, number of registrations at the site of the advertiser, number or $ amount of trial purchases, and number or $ amount of additional purchases over a certain time period. Furthermore, the advertiser would input certain preferences with respect to the advertisement. For instance he might want to limit the advertising program to certain "distribution channels" to the exclusion of others. Advertising messages can be delivered or made accessible to buyer entities thru any distribution channel including the following channels or a combination thereof: by Email, Direct Postal Mail (for single promotional mailings as well as catalogues containing multiple incentive offers), messages sent to wireless devices such as cell phones, pagers and PDA's (personal digital assistants), on a central web site, thru banner ads that are served at multiple web sites, thru the use of interactive television, thru interactive kiosk's, by telephone and thru other channels.

The search criteria for buyer entities could comprise scores relating to the purchase history characteristics (for example, those buyer entities that scored more than XXX for purchasing more than $XXX.00 at a department store over the last year), demographic criteria (for example, only in the zip codes in an around New York City and Washington, D.C., or for example, females between the ages of 15-35), and any other item of data that is retrievable on the basis of scores and other buyer entity information in the data base. Other examples of search criteria are: all buyer entities that have scored more than 100 for spending more than $100 on health and beauty items during the preceding six month period, or all buyer entities that have scored more than 400 for having spent more than $400 on books in a given time period, or all buyer entities that have bought from a specific merchant in the last six months, or anyone who has spent more than $500 on Sheraton Hotel stays within the last twelve months. Yet other examples include all buyer entities that are shown by their relevant scores to have purchased more than $300 at discount stores, or any buyer entities who are shown by their purchase records to be the early adopters of certain new technology products.

Note that the search criteria that are used may vary with each of the distribution channels which are used to convey promotional incentive offers to participating buyer entities. The step of including search criteria might ask for specific criteria such as those outlined above that set specific thresholds for inclusion or exclusion of a buyer entity among the recipients of an advertising message thru a specific channel. Alternatively, the search criteria might be more vague, and the advertiser would select a list of companies represented in the purchase records whose customers might be of particular interest and/or attribute a level of importance to a list of other search criteria and scores without initially setting or agreeing to specific threshold levels. The system or the system operator would then recommend the more specific threshold levels when or after the process moves to blocks 320 and 322.

Also, the process of selecting audiences on the basis of scores could be done "manually" or thru an interactive interface. If the process is done manually, the advertiser works with a systems operator who searches the database and attempts to optimize the selection of audiences and reward levels across different distribution channels. If the process is done thru an interactive user interface, the advertiser logs on and interacts with the system to select audiences as well as incentives on the basis of the scores of different buyer entities within certain pre-set parameters. Essentially, the system would query the advertiser on his desired search criteria and objectives and recommend audiences as well as a range of incentives for the selected audience and a rule for assigning a particular incentive or set of incentives to each of the buyer entities in the audience.

Furthermore, it is important to distinguish between one-time campaigns or programs, which involve a single mailing by Email and or direct mail to various buyer entities, and forward-looking campaigns or programs that extend over longer periods of time. Most of the time, an advertising program will consist partly of one-time elements, such as an Email campaign, and partly of continuous and forward looking elements. For a one-time campaign, the advertiser selects an audience and incentives for that audience on the basis of buyer entity scores that are in the database at the time that the advertiser designs the promotional campaign.

If the campaign is "forward-looking," it would pre-determine certain threshold scores for one or more categories for selecting the group of buyer entities as well as certain rules for calculating the proper reward levels for each of the buyer entities, and have the system apply these rules going forward for real time or ad hoc or periodic recalculation of the scores. Most distribution channels lend themselves to forward-looking programs, because the reward levels of promotional offers can be changed during the duration of the program. For instance, an offer that is displayed to a particular buyer entity on a personalized website can be changed after the advertising program has started and the offer is first displayed on the site.

By way of this latter "forward-looking" process, a change in at least one score of a buyer entity may result in several adjustment to the incentive offers that it obtains and to the way it obtains these incentive offers. This step in the inventive process is shown by block 338 in FIG. 3A. Buyer entities who are not yet included in the database or who are included in the database but do not yet meet the requisite thresholds to qualify for the promotion of the advertiser, could qualify for a promotion as soon as they submit additional purchase statements which elevate their scores to the requisite threshold.

The system would recalculate a buyer entity' scores upon receipt of new proof of purchase records or any other information which affects the scores of the buyer entity, or on a real time or ad hoc or a periodic basis, and then perform a compare operation to determine if the recalculated amounts equals or exceeds the threshold. If the recalculated amount did equal or exceed the threshold, then an incentive of some type would be provided to that buyer entity. A new or adjusted score of a buyer entity may change more than whether that buyer entity qualifies for a particular incentive offer. For those buyer entities that are already included in one or several incentive programs, the system will recalculate incentive levels for all forward-looking programs, when the score of these buyer entities change and/or on a periodic basis. This recalculation, could by way of example but not by way of limitation, simply involve adding the new purchases to the values of the scores currently held for the various categories. The recalculation may also encompass deleting or subtracting purchases that are older than a predetermined period of time, as might be determined, by way of example, by subtracting the purchase date from the current date.

A change in at least one score may also change the priority by which incentive offers are shown or "distributed" to the buyer entity. Some distribution channels, such as interactive television, require that various incentive offers (and advertisements containing these incentive offers) be prioritized to determine which incentive offers are shown first and which are shown later, and/or which are shown more prominently and which are shown less prominently, or which are shown more often.

In this context, the scores of a buyer entity and other information in the stored record for that buyer entity, as well as the date and time, advertiser budget, location, and previous responses by that buyer entity to previous ads in the sequence or earlier sequences, may be used as factors to determine the priority that a particular advertisement gets within a particular distribution channel. Advertisements may be prioritized in a manner as to maximize the likelihood that a buyer entity will act on that advertisement, i.e., those advertisements that are most likely to be accepted will tend to be shown first and most prominently. With respect to some distribution channels the scores of a buyer entity might be the sole determinant of the relative importance given to each of several advertisements in the channel. With respect to other channels, the scores might be used in combination with other "channel-specific" data to determine when and how a particular incentive offer is displayed to a buyer entity: for instance, with respect to PDA's that are equipped with a device that pinpoints a consumer's location, the consumer might receive incentive offers depending on his scores, but also depending on whether he requests such offers at a particular point in time and which stores offering promoted merchandise are in his immediate vicinity when he requests these offers.

The search criteria, advertiser preferences and budget obtained in bloc 318 would then be run through the data base(s) to obtain a group with specific characteristics that the third party believes makes them likely to purchase its product or service. The system would also execute comparison steps and delete from the group of buyer entities, or alternatively ensure that only buyer entities were selected to the group, who had provided an indication that they would receive incentives from that advertiser or type of advertiser, or had not indicated a disinclination to receive incentives from that advertiser or type of advertiser. Likewise, if the buyer entity had set a threshold incentive value, then the system would perform a comparison step of the value of the incentive to the threshold incentive value set by the buyer entity, and would delete or not include (depending on when the incentive selection step was executed in relation to the search step) those buyer entities in the group whose threshold incentive value requirement had not been equaled or exceeded.

Accordingly, after completion of block 318, the process then moves to block 320, and the database of buyer purchasing histories (proof of purchase records) is searched using the search criteria determined in block 318, but adding the merchant category designation for the advertiser requesting the search, in order to obtain a group of buyer entities meeting the search criteria and who have indicated in their respective buyer preferences that they would (or exclude those who wouldn't) receive a marketing incentive from a third party with that category designation. Additionally, as noted previously, the block 320 process could include a comparison step that compares a predetermined value of the incentive to be offered by the advertiser to a threshold value set by the buyer entity. The incentive would only be offered to buyer entities whose threshold (if any) for incentives has been equaled or exceeded. Note that this latter comparison step may be performed at a later time, depending on when the advertiser selects the incentive to be provided to the buyer entities.

The next step, represented by block 322, is the selection of an incentive to be offered to the group of buyer entities. This step could comprise determining different incentive levels for different buyer entities in the group and could be performed automatically or manually. Individual incentive levels and specific incentives within levels would be determined and automatically calculated on the basis of a buyer entity's estimated probability of becoming a valuable customer for the advertiser. This probability is inferred from various scores that are calculated for the purpose of summarizing the information of that buyer entity in the database. Thus, an incentive may be determined in block 322 by selecting a type and/or amount of the incentive for the buyer entity by applying the score of the buyer entity to an incentive function. Any suitable function may be used. By way of example but not by way of limitation, the promotions manager at a hotel chain might want to offer a special rebate to buyer entities that spend significant monies at hotels. She believes that all hotel customers are good targets for it's promotions, but buyer entities that are particularly likely to become valuable new customers are those that spend money at first class hotels. Therefore, the hotel chain is offering a rebate ranging between $25 and $100 on a three night stay, with the exact amount of the rebate to be determined according to the following formulas:

$$\{X=10\%(score1) plus 5\%(score2)$$

$$\{maximum\ reward\ \$100$$

$$\{minimum\ reward\ \$25$$

where X is the reward with a maximum of $100 and a minimum of $25; score 2 is the total amount of money that the buyer entity spent in 2000 at first class hotels (the names of these first class hotels would presumably have been supplied by the advertiser); and score 1 is the total amount of money spent by the buyer entity during the year 2000 at all other hotels. Therefore, buyer entity A who is shown by it's purchasing records to have spent $700 on first class hotels and $500 on other hotels during the year 2000, will be offered a rebate of (10%*700) plus (5%*500), which is $95 for a three night hotel stay while buyer entity B who is shown by it's purchasing records to have spent $300 on first class hotels and $600 on other hotels during the year 2000 will be offered a rebate of $60 (10% of 300 plus 5% of 600).

In a further aspect of the invention, a type or amount of incentive may be provided to the buyer entity simply based on the buyer entity meeting predetermined search criteria. In a yet further aspect of the invention, the incentive may be set in block 322 based on a first criteria of the purchasing of a particular good or service, and a second criteria of a minimum number of different instances when the particular good or service was purchased in a predetermined time period. Note that the incentive that is selected for each buyer entity may comprise one or several rewards that are promised to the buyer entity in return for taking certain actions. For instance, a buyer entity might get a reward equivalent to $1 for viewing and/or interacting with an advertisement, $2 for registering with a site and a rebate of $5 for making an initial purchase of at least $20. An incentive might comprise a rate at which the buyer entity is compensated for viewing and/or interacting with advertisements. Additionally, or alternatively, it might comprise rewards that are promised to the buyer entity for responding in certain ways to these advertisements.

In a yet further aspect of the present invention, the incentive selection step could be performed just based on the buyer entity's own purchase records. More specifically, the incentive could be determined without searching the overall database. The incentives could be chosen merely based on whether the buyer entity profile and purchase records meet one or more predetermined criteria.

The next step in the process, represented by block 328 in FIG. 3, comprises calculating a charge to the third party advertiser for the search and/or distribution of the incentive to the group of buyer entities. The charge may be calculated based on the number of buyer entities in the group obtained from the search of the database. Additionally, the charge may be calculated on the basis of the various scores of each of the buyer entities in the groups which measure how valuable a buyer entity is to advertisers. This value could relate to the overall value of that buyer entity to all advertisers. Alternatively or additionally, it could relate to the value of that buyer entity to advertisers in a particular product category. The scores and charges for each buyer entity can be a function of the recency/timing and volume of its past purchases, with different weights given to different categories of products, types of products and different sellers from whom the buyer entity purchased its products, as well as a function of the responsiveness of that buyer entity to previous promotions and the degree to which a buyer entity limits the number of advertisements and promotions it wishes to receive in a particular time period. In addition, the charge may be calculated based on the number of search criteria specified, or on the inclusion of specific predetermined elements in the search criteria, such as high value consumer goods buyer entities, i.e., purchasers of luxury cars or high value jewelry. Alternatively or in addition, the charge may be calculated based on the number of times the advertiser has requested a search of the database within a predetermined time period. The process would then move to block 330, wherein the calculated charge is send out to the advertiser. In a preferred embodiment, the charge is sent to the advertiser electronically through the communications network 20. The process set forth in blocks 318, 320, 322, 328 and 330, which involves the selection of audiences and incentives across multiple distribution channels and the determination of the price to the advertiser, will often times be a reiterative process: results obtained in one of the blocks might prompt the advertiser and/or the systems operator to go back and redo the process of a prior block. For instance, if the results of the process in block 320 show that the group of buyer entities selected to receive the advertisement is smaller than the one desired by the advertiser, and therefore, that the search criteria were defined too narrowly in bloc 318, one might want to go back to block 318 to define newer and less restrictive search criteria.

After completion of block 330, the incentive program would then be executed in block 332. This execution comprises the steps of transmitting the offer of an incentive to buyer entities in the group and the step of providing the incentive reward to those buyer entities that have accepted the incentive offer.

The processes set forth in execution blocks 318, 320, 322, 332 and 334 could be implemented using a variety of alternatives mentioned above. Some examples for more specific steps which might be involved in the execution of some of these programs are described below:

"Manual" Program Development Alternative for an Email Program:

1. The system operator queries database multiple times, and discusses objectives of campaign with third party advertiser.

2. The system operator selects a group of buyer entities likely to be valuable customers to the advertiser on the basis of their purchase histories.

3. The third party advertiser determines one or more incentives, for example, a different incentive for different sub-segments of a buyer entity group or for different buyer entity groups.

4. The system operator finalizes the program in conjunction with third party advertiser and deletes from the group any buyer entities whose threshold incentive values are not equaled or exceeded by the chosen incentive.

5. The system operator executes the search.

6. The system generates a group based on the search criteria.

7. The system distributes advertising messages through one or multiple distribution channels.

Interactive Advertiser Interface Alternative where Advertiser Searches the Database of Blind Data for an One-Time Email Program Set-up by company administrator: set limit on queries without order.

1. Advertiser logs on.

2. Advertiser queries database up to the limit set for that advertiser.

3. Advertiser selects the group of buyer entities.

4. Advertiser selects incentive or an incentive function, that sets the incentive as a function of certain prior purchases for each consumer and deletes from the group any buyer entities whose threshold incentive values are not equaled or exceeded by the chosen incentive.

5. System controller returns expected dates for program execution.

6. Advertiser verifies that dates are acceptable.

7. Advertiser enters a corporate credit card information or selects other payment option for paying for the incentive.

8. System controller verifies availability of credit depending on selected payment option, in order to provide the selected incentive to each or to a plurality of the buyer entities in the group.

9. If credit is confirmed, the incentive program is queued for execution.

"Forward-Looking" Program Alternative

1. Advertiser selects criteria.

2. System controller searches records of consumers.

3. System controller estimates number of consumers affected over desired time period of program.

4. Advertiser selects incentive or an incentive function, that sets the incentive as a function of certain prior purchases for each consumer. Buyer entities whose threshold incentive values are not equaled or exceeded are deleted from the group.

5. System controller returns expected dates for incentive program execution and tentative cost estimate.

6. Advertiser verifies that dates and cost estimate are acceptable.

7. Advertiser enters corporate credit card information or selects other payment option for down payment.

8. Controller verifies availability of credit depending on selected payment option for paying for the incentive. A preset credit limit may be chosen so that when a predetermined number of incentives have been offered or accepted, then no new offers to buyer entities would be made.

9. If credit is confirmed, the incentive program is queued for execution.

Consumers who match advertiser criteria may be continuously selected, and distribution is scheduled to these consumers as per advertiser specifications until the advertiser reaches the pre-set credit limit. This credit limit comparison step is represented in FIG. 3 by block 334, wherein the number of incentive offered or accepted times the value of the incentive is compared on a continuous basis to the preset credit limit. Note that this preset limit comparison may also be executed for non-forward looking incentive programs where appropriate.

It should be noted that the present invention contemplates, in a preferred embodiment, updating the searchable database on an ad hoc or a periodic and/or a continuous basis; and recalculating the scores on an ad hoc or a periodic and/or continuous basis.

Note that the charge to the advertiser calculated in block 328 could be calculated, based in whole or in part, on the scores or the composite scores of the buyer entities obtained in the search.

As noted above, information about whether a buyer entity is responding to incentive offers, and which incentive offers it is responding to, can be obtained and inputted into the database. This step is represented by block 326 in FIG. 3A. This information can be obtained electronically by programming the electronic incentive offer to send a message to the system 15 when the incentive is accepted by the buyer entity. Alternatively, a cookie may be added to the buyer entity computer when the incentive is offered, with the cookie used to monitor and send a message to the system 15 when the buyer entity has accepted the incentive. Alternatively, this incentive acceptance information can be obtained from the advertiser or other merchant involved. Information on the buyer entity acceptance of the incentive offer may then be added to the purchase history record for the buyer entity. In one embodiment, this information on incentive acceptance by the buyer entity may be used for adjusting the score for one or more of the categories, i.e., points may be added to the score in one of more of the categories based on this information.

In a preferred embodiment, the invention also includes in block 326 the updating of the database with information on whether the buyer entity made a follow-up purchase or a co-purchase contemporaneous with or after accepting an incentive and providing added points over and above the points normally attributed for such follow-up or co-purchase when calculating the score for the buyer entity in one or more categories. By way of example but not by way of limitation, this information could be obtained via a cookie by linking to a third party database and inputting information therefrom on whether the buyer entity made a follow-up purchase or a co-purchase contemporaneous with or after accepting the incentive and inputting this information to the database.

In a further aspect of the invention represented by block 336 in FIG. 3, older proof of purchase records for a buyer entity may be purged from the database. Alternatively, or in addition, proof of purchase records that are older than a predetermined period of time, such as a predetermined number of days, which is calculated by subtracting the current date from the date of purchase set forth in the purchase record, may have their proof of purchase value for that record reduced by a predetermined amount, or progressively reduced, so that any scores calculated or recalculated based, in part, on these records, will have a lower value due to this reduction.

An example of the operation of the system of the present invention illustrating the flexibility and some of the many variables that come into play is discussed below. Assume a member, Frederick Miller, with the membership No. 123,456, who resides in San Francisco uploads his annual credit card statements for the year 2002 in March of 2003. These statements show that he has spent a comparatively large amount of money at expensive Italian restaurants during the year 2002 in and around San Francisco. Assume further that his level of spending at expensive Italian restaurants is significant enough to place him among the top spenders in this category within the membership and that his spending at expensive Italian restaurants is more significant than his spending in many other spending categories, giving him a high score for the category of Italian restaurants.

Suppose advertiser number 678, identified as the restaurant Bella Italia, is a newly opened Italian restaurant in downtown San Francisco. The restaurant's owner and manager has set-up and made the requisite down-payments for a comprehensive advertising program which is aimed at participating members who live in San Francisco or its surroundings, and which is designed to get consumers to eat at his restaurant for the first time. He would like to make a very attractive offer to those consumers likely to return to his restaurant, and is willing to give between 50 and 80 percent off to potential future regular customers. He knows that if he makes this promotion available to everyone, many people who will want take advantage of the promotion are unlikely to return again to eat at his restaurant at regular prices. However, offering 80 percent off to the best consumers is well worth it: Although he barely covers the cost of food ingredients at this discount, if these best consumers enjoy their experience they are likely to come back many times, having previously demonstrated a willingness to pay high prices for top quality Italian food.

Because of Frederick Miller's extensive purchases at Italian Restaurants during the previous year, the system distributes Bella Italia's promotional offer to Frederick Miller after he uploads the information in his credit card statements, and after the system processes this information. Frederick has agreed to receive promotional offers through the following "distribution channels." In regard to Email, he has signed up to receive a bi-weekly Email summarizing the 3 best promotional offers that are most likely to fit his interests. When he accesses the central web site of the company, the first page he sees is a personalized page, which lists and summarizes the top 5 promotional offers that the system has selected for him. He has also agreed to receive banner ads when visiting other sites based on summary information and scores that have been stored in cookies on his computer. He has signed up for direct postal mail and receives an annual catalogue of promotional offers as well as monthly flyers that describe and outline several promotions. He has indicated in his preferences that he would like to receive certain promotional offers on his hand-held PDA at certain times when he indicates his willingness to receive such offers in this manner by turning on a relevant feature on his PDA. He also allows for the use of his purchase history, and scores derived from that purchase history, for his interactive television viewing.

Continuing with this hypothetical example, when Frederick uploads his purchase records in March of 2003, a fully-automated system could do the following: (1) For each of all currently active forward-looking advertising programs, determine whether or not Frederick qualifies for receipt of a promotion. In our example, Frederick would qualify to receive the promotional offer from Bella Italia because of his significant total expenditures at Italian restaurants, which total has been compared to a threshold and been found to exceed that threshold; (2) Calculate the proper reward levels for Frederick for these promotions.

Again this is determined by comparing his expenditures to a set of thresholds. Since Frederick's Italian restaurant expenditures in this example exceed the highest threshold in the set of thresholds used to determine which promotion should be offered to Frederick, Frederick receives the top promotional incentive reward of 80 percent off on his first visit with respect to the restaurant's promotional offer; and (3) Determine the priority which various promotional offers have across various distribution channels, such as for example, email, other site banners ads, an annual mailed catalogue, mailed flyers, PDA ads, and interactive television. The priority assigned to these promotional channels could be determined as set out below, by way of example.

For the purpose of our example, we assume that the owner of the restaurant wants to distribute his promotional offers thru any channel thru which participating members have agreed to receive offers, and has agreed to pay for it at previously established rates. With respect to Email, Bella Italia's offer could therefore be listed as the first of 3 offers in the bi-weekly Email that Frederick receives in the second half of April. Furthermore, due to the overall strength of his purchase record, the company could be willing to pay Frederick 50 cents just for clicking on one of the embedded links in any of the Emails that he receives. This payment rate is an increase from the 25 cents which Frederick had previously received on the basis of his earlier submission of fewer or less substantial purchase records. This rate of payment was determined by comparing Frederick's expenditure levels in one or more categories to a set of thresholds.

With respect to the web site, the offer could also be featured on Frederick's personalized page as one of Frederick's top 5 offers. Furthermore, assume Worldtravel.com is one of the partner sites willing to display promotional offers in exchange for a share of advertising revenue. When Frederick visits Worldtravel.com to book a trip to Miami, the site could display a banner ad containing a promotional offer for a top Italian restaurant in Miami, which is also a participating advertiser. This would be determined, by way of example, by using Frederick's scores in various categories to select a banner ad of a company in a high score category that is located at the traveler's destination.

Additionally, Bella Italia's offer features prominently in an annual catalogue that includes promotional offers specially printed for Frederick based on his category scores, and is listed in a "top offer" section in the front of the catalogue. The promotional offer for the restaurant could be advertised in the monthly flyer printed for and sent to Frederick's mailing address. When Frederick is at or in the vicinity of downtown San Francisco as determined by his signal, and indicates through his PDA device that he is willing to receive promotional offers in his immediate vicinity, a message with the promotional offer for the restaurant is among those that are sent to him that pertain to businesses near his physical location. Finally, when watching Interactive Television, Frederick is compensated with $1 per minute instead of the previous $0.30 per minute for watching interactive ads on the basis of his purchase records, and an advertisement for Bella Italia could be among the first shown to him when he watches such advertisements in April of 2003.

The system would make several reiterative calculations for Frederick with respect to each incentive offer for which Frederick qualifies and for each distribution channel. To avoid excessive repetition, to give Frederick broad exposure to different incentive offers and to give many qualified advertisers the opportunity to offer promotions to Frederick, the display of an advertisement in one distribution channel might, by way of example, lower the ranking and place in a sequence of advertisements of that same advertisement in another distribution channel. The system will calculate the sequence and/or relative prominence of different advertisements in each distribution channel, which could be based on Frederick's purchase history, the scores derived from that purchase history which Frederick might have enhanced by providing additional information about himself, the degree to which a particular distribution channel lends itself to the effective display of a promotional advertisement for a particular product or service and other factors. For example, the Bella Italia restaurant could be given the first position in a sequence of ads to be provided by email, based on Frederick's score in the category of Italian restaurants. The Bella Italia was given the first position in the sequence in the email distribution channel because Frederick has previously responded to promotions for newly opened restaurants, and because the owner of the restaurant was willing to pay an extra premium and provide a particularly attractive reward in exchange for utilizing a distribution channel which is more likely to elicit a quick response to the promotion than other channels. Because the Bella Italia incentive offer was given the first position in the email distribution channel sequence, it might be given only the tenth position in the sequence of ads in a different distribution channel.

Note that an algorithm could be used to determine the selection of advertisements based on many factors including at least one or more of the following:
  a) Frederick's scores in various categories;
  b) The particular distribution channel;
  c) Frederick's stated preferences for particular advertisements or distribution channels and any thresholds for incentive values set by Frederick;
  d) Frederick's location;
  e) The time and date of access;
  f) How many times that Frederick has been shown the advertisement without clicking on otherwise responding to the advertisement;
  g) The advertising budget and requirements set by the advertiser.

An algorithm using the foregoing factors could be implemented by way of example but not by way of limitation, by using a plurality of lookup tables or an X-dimensional lookup table, wherein inputting one or more of the foregoing factors to one or more lookup tables will yield a set of predetermined weighted factor values. The lookup tables would be indexed by one or more of the data fields used to search (membership ID, category scores, and the other factors listed above). The factor values for each of these factors or a selected set of factors (e.g., relative importance, score in each factor) may then be used to derive, by a simple addition or by a more complex algorithm, a priority value for each advertisement and/or distribution channel and only those advertisements/ distribution channels having an optimal priority value relative to a threshold are selected for presentment to the buyer (Frederick). Note that the factor values themselves need not be stored in a table (or other similar data structure). They may instead be derived or calculated from values stored in the tables by using predefined rules. Other rule based calculations and more complex algorithms are within the skill of the art to implement based on these or other factors.

One aspect that is also part of the present invention is the use of the video channel. The term "video channel" is intended to encompass all means of receiving video, including a television, computer screen, handheld device, or other video receiver. Accordingly, the video channel encompasses among other services, interactive television, streaming video, streaming media, cybercasting, video on demand, data conferencing, Internet TV, or other internet based delivery system for providing video over a network. In this respect, one of the most important ways in which buyer entities may benefit from the submission of their blind purchase records is thru the use of the video channel. The video channel will enable an increasing part of the US population to view advertisements that are specifically selected for them.

In one example of the video channel, Interactive Television companies have the technology to download and store a plurality of commercials on the personal video recorder (or other similar device) of a viewer or at the server from which the video is streaming or from another site such as a dedicated ad server, and then select which of these commercials to show based on the viewer's preferences. Current business methods for determining the selection of these interactive television advertisements rely on a process of recording and storing information on the viewing habits of these viewers. Information about viewing habits might be supplemented and enhanced on the basis of a viewer's responses to questions that ask him to reveal demographic and other information.

For the reasons outlined above, the selection of advertisements for particular viewing households would be significantly more effective, if the information comprising the viewing habits of the viewers and their answers to some questions could be supplemented with information generated from the purchase records of these viewers. As previously discussed, such information is verifiable, more comprehensive, and (in the opinion of the inventor) more indicative of the purchase propensity of individuals with respect to many products and services than viewing or web surfing habits are alone.

As noted above, besides interactive television, other examples of the video channel include streaming video, streaming media, cybercasting, video on demand, data conferencing and Internet TV. Some discussion of these examples is set forth below.

Streaming video is a sequence of moving images that are typically sent in compressed form over a data network such as the Internet and displayed by the viewer as they arrive. In some examples of this transmission, the client and server software cooperate for uninterrupted motion. This may be accomplished by the client side buffering a few seconds of video data before the client starts sending the video data to the screen, which compensates for momentary delays in packet delivery.

Streaming media is streaming video with sound. With streaming video or streaming media, a Web user does not have to wait to download a large file before seeing the video or hearing the sound. Instead, the media is sent in a continuous stream and is substantially played as it arrives. The user needs a player, which is a special program that uncompresses and sends video data to the display and audio data to speakers. A player can be either an integral part of a browser or downloaded from the software maker's Web site. Major current-day streaming video and streaming media technologies include RealSystem G2 from RealNetwork, Microsoft Windows Media Technologies (including its NetShow Services and Theater Server), and VDO. Microsoft's approach uses the standard MPEG compression algorithm for video. The other approaches use proprietary algorithms. Streaming video is usually sent from prerecorded video files, but can be distributed as part of a live broadcast "feed." In a live broadcast, the video signal is converted into a compressed digital signal and transmitted from a Web server that is able to do multicast, sending the same file to multiple users at the same time.

CyberCasting is web casting on the Internet. Current day packet types in the Internet Protocol Version 6 for web casting include anycast, unicast, and multicast. Although most Internet traffic is unicast (one user requesting files from one source at another Internet address), the Internet's IP protocol supports multicasting, the transmission of data packets intended for multiple addresses. Frequently, MBone is used for cybercasting. The MBone, now sometimes called the Multicast Internet, is an arranged use of a portion of the Internet for Internet Protocol (IP) multicasting (sending files—usually audio and video streams—to multiple users at the same time somewhat as radio and TV programs are broadcast over airwaves).

Video on Demand is the ability to start delivering a movie or other video program to an individual Web browser or TV set whenever the user requests it.

Data Conferencing is the ability of a plurality of users at separate computers to view and interact with the same data or application. Whiteboarding offers the most basic of these capabilities.

Internet TV is an internet service for home or business TV use. A set top box is used to connect a TV to a modem and telephone line. The user interface is typically set up for viewing on an interlaced TV screen rather than a computer monitor.

Note that in many examples of the video channel, such as Interactive television and cybercasting and streaming video, it is much easier for viewers to "zap" through commercials that they do not wish to see. (Zapping means fast forwarding through or otherwise avoiding commercials.) According to preliminary statistics, more than 80 percent of all advertisements that are displayed on interactive television and other examples of the video channel where there is the ability to "zap" an advertisement are "zapped," i.e., the viewer avails himself/herself of the opportunity and "zaps" the advertisement. As of the date of this application, neither of the two main companies offering interactive television, Tivo and Replay, are compensating viewers with an incentive for watching advertisements. Furthermore, and similarly to the internet, interactive television technology allows the user to interact with advertisements and to buy products or request more information with the use of the remote control.

Rewarding users for viewing advertisements and for providing information about themselves will greatly increase the number of advertisements that are viewed, facilitate better selection and targeting of these advertisements, and allow video channel viewers to subsidize and pay for the video channel programs that they are watching and the interactive video service they are using.

A buyer entity which participates in the proposed system of buyer-driven targeting, could enhance the benefit it receives from submitting it's purchase records, and enhance the scores stemming from these purchase records in the various ways previously described, by allowing for use of it's buyer history and scores for the purposes of one or more of the following:

1. selecting video channel advertisements;
2. setting a first incentive, which will be the rate at which the viewers are compensated for watching video channel advertisements (presumably, a significantly higher rate than the one they could obtain otherwise); and/or
3. setting the incentives that are offered within the video channel advertisements themselves.

Similarly to the remaining distribution channels, the scores would be updated on the basis of the responses of the viewer to the advertisements. Additionally, the viewing habits of the user that are recorded thru interaction with the video channel could be used to enhance the scores obtained in the other ways described above.

Figure 12:
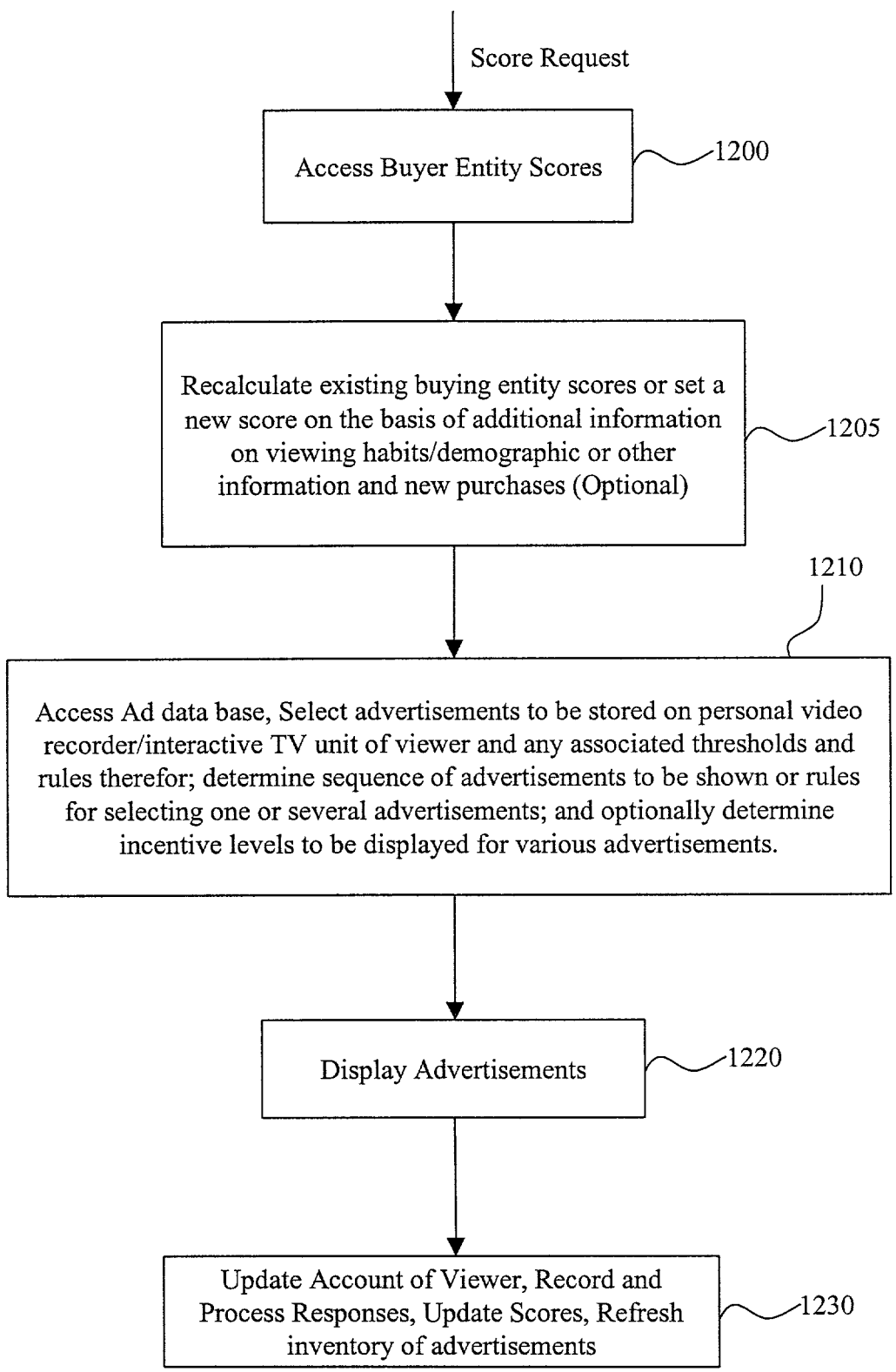
FIG. 12 is a flow chart diagram of a further embodiment of the present invention.

Referring to FIG. 12, the process is initiated with a request for the scores of a buyer entity, which results in the scores of a buyer entity being accessed in any convenient manner. This score accessing step is represented by block 1200 and may be accessed as described previously. Typically the access would be through a local data base or a data base accessed over a network, or from a cookie. In block 1205 the accessed scores may then be recalculated on the basis of additional information including, for example but not by way of limitation, information obtained from existing video channel viewing habits of the buyer entity and demographic information and new purchase information. This viewing habits/demographic/other information could also be accessed from a local data base or from a database accessed over a network or from a cookie. The recalculation could include the use of one of the algorithms described herein, wherein, for example, the viewing habits/demographic/other information is associated with weights which may then be added to the scores, or otherwise used as a factor to adjust the score for the buyer entity, or used to create a new score for the buyer entity. Note that this recalculation step is an optional step. Additionally, note that this recalculation step could be performed at any time, including on a batch mode basis when the system is in an under utilized state.

In block 1210, a data base of advertisements is accessed which advertisements are to be played, as well as any score thresholds associated with the individual advertisements or sets of advertisements and any rules associated with particular advertisements or sets of advertisements such as playing certain advertisements only with selected programs, or only at certain times of day, or only on certain days, or only for buyer entities with certain demographic characteristics. The advertisements are then selected and may also optionally be sequenced based on these rules, including rules for sequencing based on the buyer entity scores. For example, information that a buyer entity is a regular viewer of Masterpiece Theater could be used in conjunction with a relatively high score in the category of luxury items, as determined for example by comparison of the buyer entity's luxury item score to a threshold set for a particular advertisement, to thereby select an advertisement for expensive jewelry, which advertisement will then be placed first in a sequence of advertisements. The demographic information that this buyer entity is in a high income zip code could also be used in conjunction with a high buyer entity score in the category of automobiles to then place an advertisement for automobiles second in the sequence of advertisements. This selection and sequence would be determined solely or in combination with other information such as viewing habits and demographic information. The particular sequence rules would be determined as desired.

As noted above, the selection or sequencing of advertisements could be accomplished by comparing one or more of the buyer entity's scores to a set of predetermined thresholds for selected advertisements. Also as noted above, the selection and/or sequencing of advertisements may be determined or rules set to show certain advertisements based in part on the scores of the viewer, and in part on other factors such as the television program that is being watched or the time of day, or the day of the week, or the time of season.

Additionally, the incentive rate at which viewer is compensated for viewing interactive television advertisements may be set in block 1210, by way of example, using a score in an appropriate category or a number of scores as one or more factors and by comparing these buyer entity scores to predetermined thresholds. A wide variety of other factors may be used in combination with the buyer entity scores, as noted above, including, by way of example only, the demographics of the buyer entity, the time of day, the day in the week, the time of season, the program being watched. The rational for the luxury goods example, is that a merchant would find it to be advantageous to reward/pay selected buyer entities that have a past history of buyer luxury goods and services, to watch/interact with their advertisements.

As noted above, another factor that may be used is the television program being watched. The rate might differ according to the program that is being watched. This is in order to distinguish between the various members of the household, and to set different reward levels for children and adults. Another way to distinguish between different members of the household is to request entry of a password or code for adult viewers. Entry of the code might also allow the viewer to make immediate credit card purchases by remote control, which would discourage parents from giving the code to underage children or other unauthorized individuals.

An algorithm using the foregoing factors could be implemented in a variety of different ways, as is well known to one of ordinary skill in the art, including deriving, by simple addition or a more complex algorithm, a composite advertisement priority value from multiple factor values stored in a lookup table. The lookup table or tables could be set up with different factors used as indexes, so that a subset of the factor values could be easily looked up and used in the algorithm. Alternatively, a variety of different rule based algorithms could be used.

In block 1220, the advertisements are shown. In a preferred embodiment, an indication that the advertisement was displayed on the receiver of the buyer entity and was not zapped is obtained. Such an indication may be obtained in a variety of manners from a set top box or other equipment at the buyer entity's receiver. Note that some minimal level of detectable response via remote control might also be required as a condition for crediting the viewer with the reward for watching the advertisement. This is to make sure that the advertisements are indeed being watched and that the television or other video channel is not left on unattended and for the sole purpose of collecting the rewards.

In block 1230, responses are recorded for processing of the incentive offers and for the purpose of updating the scores. Then the account of the viewer is credited with the reward for viewing advertisements and/or a debit against a program charge, if the program watched had a separate pay TV or other video channel charge associated with it. Additionally, some of the viewed advertisements may be discarded and replaced with new ones, for certain of the video channels. In a preferred embodiment in the pay per view context, the incentive is provided as a reduction or elimination of a pay for view charge for the program that is being watched at the same time as the advertisement.

It should be noted that there are a variety of well known methods available to one of skill in the art to obtain information from the receiver of the buyer entity that is displaying video, for example, in the context of an interactive video channel such as interactive television. An indication of the channel being viewed may be determined, as well as any action taken (button pushed, for example) by a remote control for that receiver. Note that the response monitoring may be designed to require a buyer entity to respond only intermittently while a plurality of ads are shown for a particular program, i.e., a response would not be required for every ad in a group of ads during a time period in order to receive the incentive. With such a monitoring configuration, the system would provide an incentive credit for all of the ads in a group if a predetermined minimum number of responses is received during a pertinent time period. Alternatively, the system could be set to cancel a credit for all of the ads in a group and provide no credit or a lesser credit if less then the required number of responses is received by the system during a given time period.

As noted above, the information on ad viewing may be sent back to the system, for determining an ad sequence and/or the selection of ads, and the compensation incentives for viewing those ads. In one embodiment, the recording of this information can be performed at the receiver for the buyer entity and a selection from ads stored at that receiver or at an external server may be made and compensation determined. This compensation and the information on the viewing of the television program may then be held in a cookie at the buyer entity receiver and/or sent on an ad hoc or periodic basis to the system to update the record for that buyer entity and for other purposes.

As has been stated above, one or more of the scores in various categories may be recalculated for a buyer entity based on one or more of the entry of new purchase records, responses by the buyer entity to questions, the receipt of third party data base information, information that particular incentives have been accepted, information on follow-up purchases, information on web site visits, information on the video channel viewing habits or the viewing of a particular video channel program by that buyer entity. This recalculation would simply insert the new data for use by the algorithm or use the information as an index to a lookup table, to determine the new score.

This recalculated score would then be used to recalculate the incentive determined in the incentive providing step by applying the recalculated score of the one of the buyer entities to an incentive function. This might be accomplished simply by applying the recalculated score as an index to a lookup table for determining incentives or using a rule based algorithm.

Likewise, the step may be performed of providing a plurality of the incentives from different advertisers to one of the buyer entities, including the steps of determining the sequence or the relative prominence of each of the plurality of the incentive awards based on the recalculated score or scores.

Figure 4:
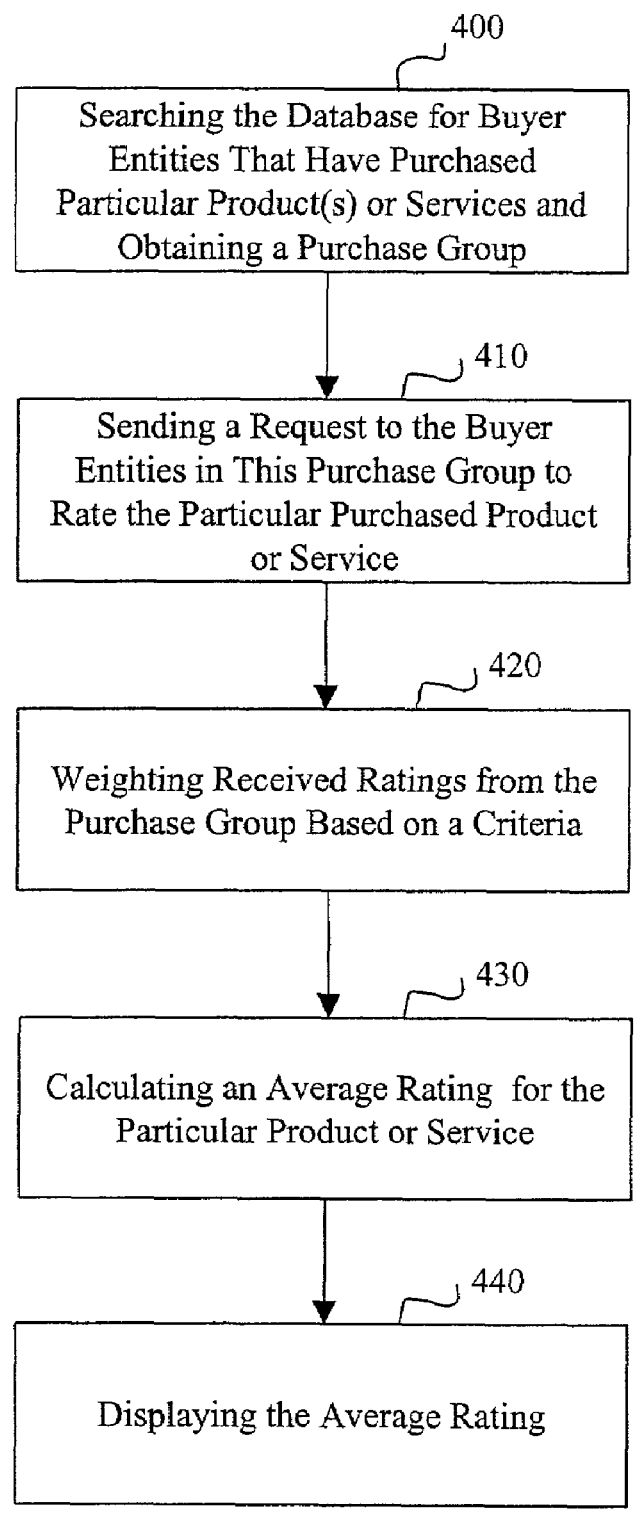
FIG. 4 is a flow chart diagram of a further embodiment of the present invention.

Referring now to FIG. 4, there is shown a further aspect of the present invention. In this embodiment, a step is included in the method of submitting a request to one of the buyer entities to provide a rating of a product or service only if the purchase record of the buyer entity shows a purchase of the product or service to be rated. The substeps for this step include the step represented by block 400, of searching the database for buyer entities that have purchased a particular product or service to obtain a purchasing group. The next substep, represented by block 410, comprises sending an electronic request to the buyer entities in the purchase group to request them to rate the particular product or service that they purchased. This substep is followed by the substep, represented by block 420, of weighting the ratings from the individual buyer entities in the purchase group based on a criteria. By way of example, this criteria might be the amount of money spent on the particular product or service or other products or services in the same category by the buyer entity, i.e., the value of the product, or the number of such products purchased within a predetermined period of time. For example, the rating of a movie by a movie buff would carry a higher weighting then the rating of a rare moviegoer. The next substep, represented by block 440, comprises creating an average rating for the product or service based on the weighted buyer entity submitted ratings. Such average ratings for products or services could then be published on a website or otherwise made available.

The foregoing embodiment generates rating of products and services that are less susceptible to rating manipulation and to statistical error than current consumer opinion websites, because the raters are selected based on their purchasing history, rather than solely on the basis of self selection. Such a rating is especially relevant to high ticket items, where the average rating is the result of a relatively small number of opinions and where groups of individuals on current opinion sites could manipulate the ratings. Furthermore, and especially for newly introduced high-ticket items, it may not be easy to find a sufficient number of consumers willing to provide feedback on their level of customer satisfaction with respect to that item. Knowing that certain consumers have purchased a particular product or service not only allows for quick identification of those who can give customer feedback. It also makes it possible to pay these customers a significant reward for providing such feedback without incurring the risk that some consumers will falsely claim to have purchased a certain product or service in order to get the reward for providing a rating.

Figure 5:
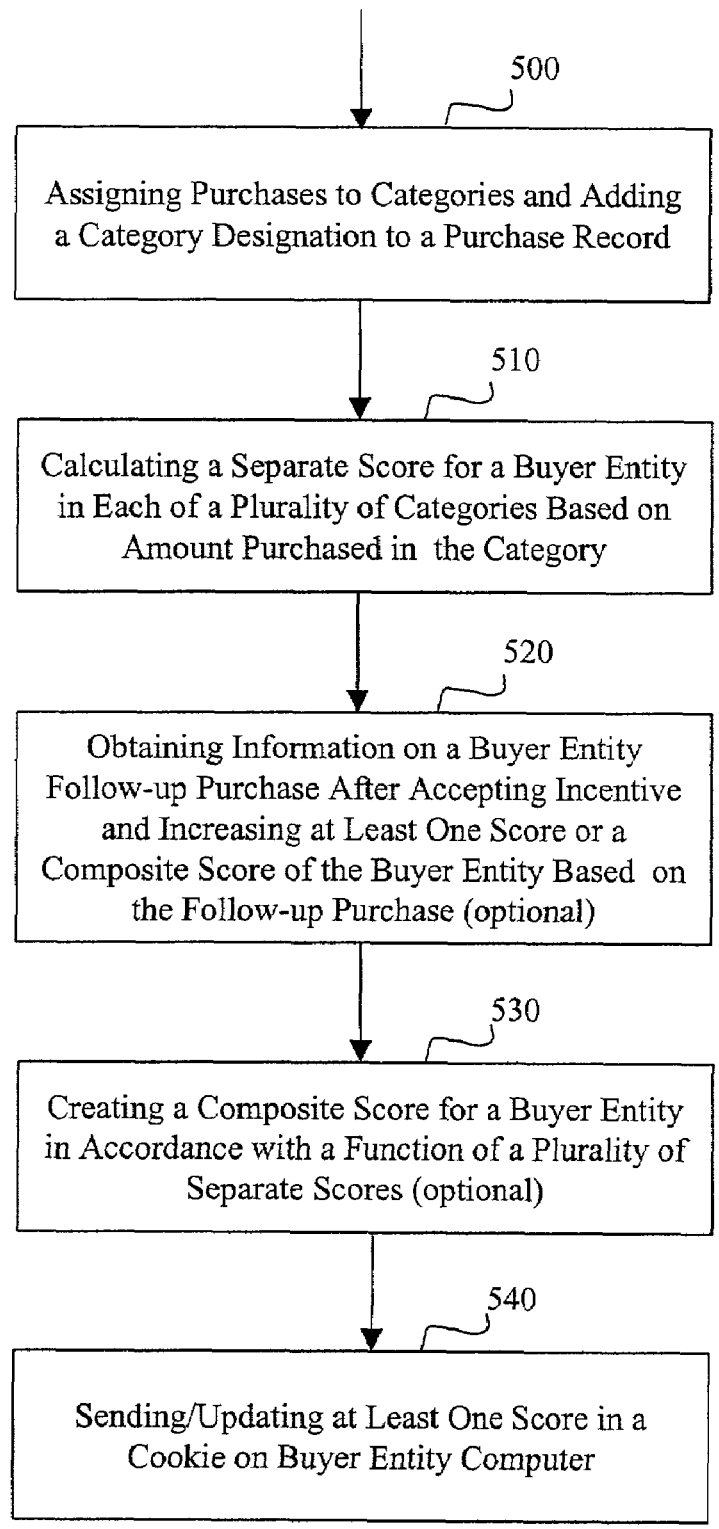
FIG. 5 is a flow chart diagram of a further embodiment of the present invention.

In a yet further aspect of the present invention shown in FIG. 5, the aforementioned score in one or more categories may be used for additional purposes, such as advertisement streaming by third parties. Referring to FIG. 5, the first step, represented by block 500 is categorization of purchases listed from a plurality of independent third parties in the proof of purchase records based on a set of categories. This step has been discussed previously. The next step in the process, represented by block 510, comprises calculating a separate score for a buyer entity in each of a plurality of categories based on the amount purchased by the buyer entity in the respective category. This step has also been discussed previously. This step is followed by the step represented by block 520, comprising obtaining information on a buyer entity follow-up purchase or co-purchase after accepting the incentive and increasing at least one score for a category or a composite score of the buyer entity based on the follow-up purchase or co-purchase. This step has been discussed previously and is optional.

The next step, as represented by block 530, is to create a composite score for a buyer entity in accordance with a function of a plurality of separate scores. This step also has been discussed before and also is optional. Finally, the scores for one or more categories or one or more composite scores for a buyer entity are sent electronically to update or add scores and/or composite scores to a cookie on the computer of the buyer entity. Note that in a preferred embodiment, the updating of the score on the cookie may be accomplished on a continuous basis, as the score is updated in the database of the present invention and subject to the buyer entity machine being powered and connected.

Figure 6:
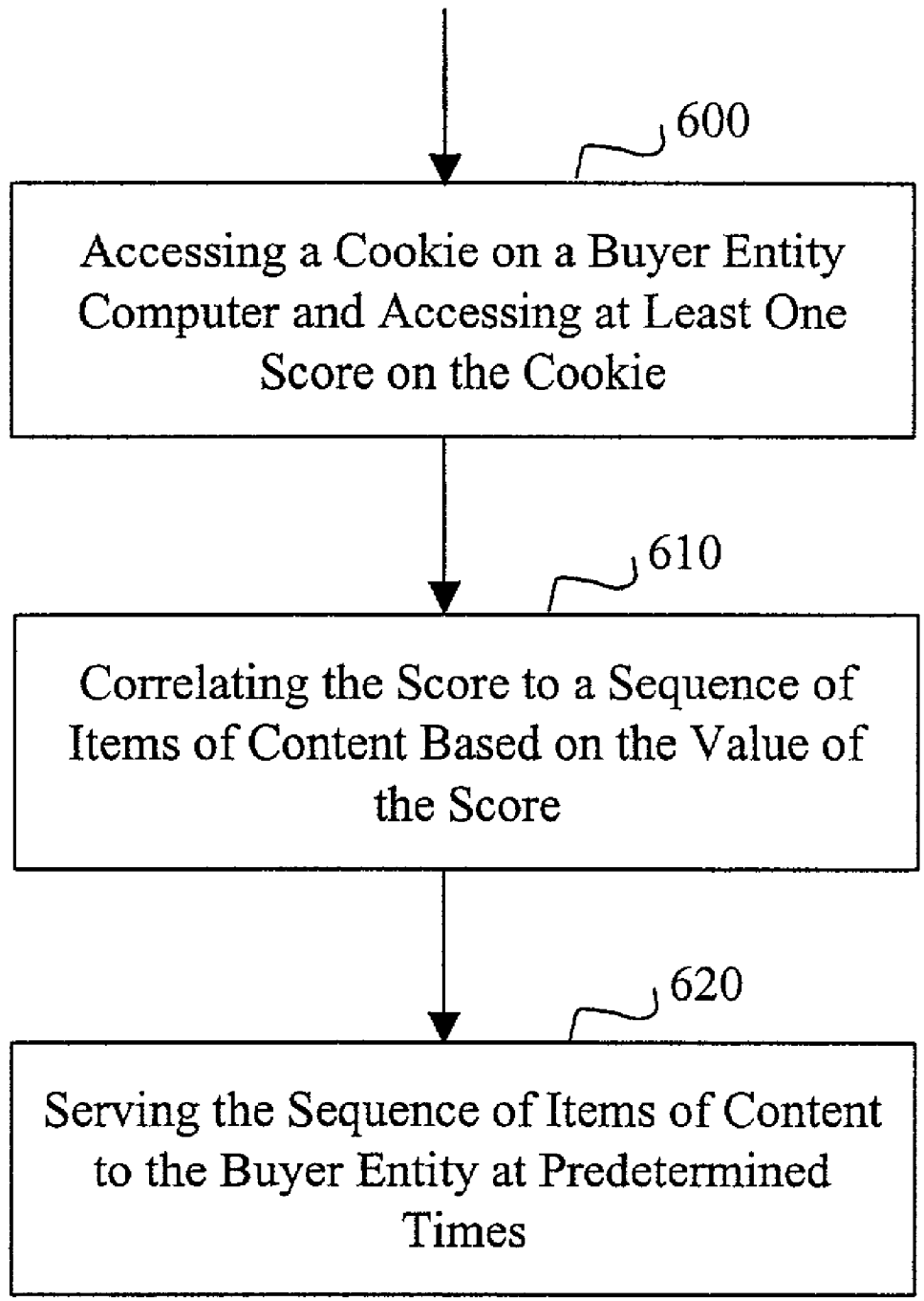
FIG. 6 is a flow chart diagram of a further embodiment of the present invention.

Referring to FIG. 6, this cookie on the buyer entity computer would be accessed from a communications network by at least one merchant. The merchant would obtain access to at least one score and/or composite score for the buyer entity. This step is represented by block 600 in FIG. 6. The merchant in the step represented by block 610, then correlates the accessed score (the term "score" is intended to encompass composite scores) to at least one item of content. A typical item of content would be a banner advertisement. This item of content is then served to the buyer entity in the step represented by block 620. Note that in a preferred embodiment, the score could be correlated to a sequence of items of content, which could then be served to the buyer entity computer in a predetermined sequence.

Figure 7:
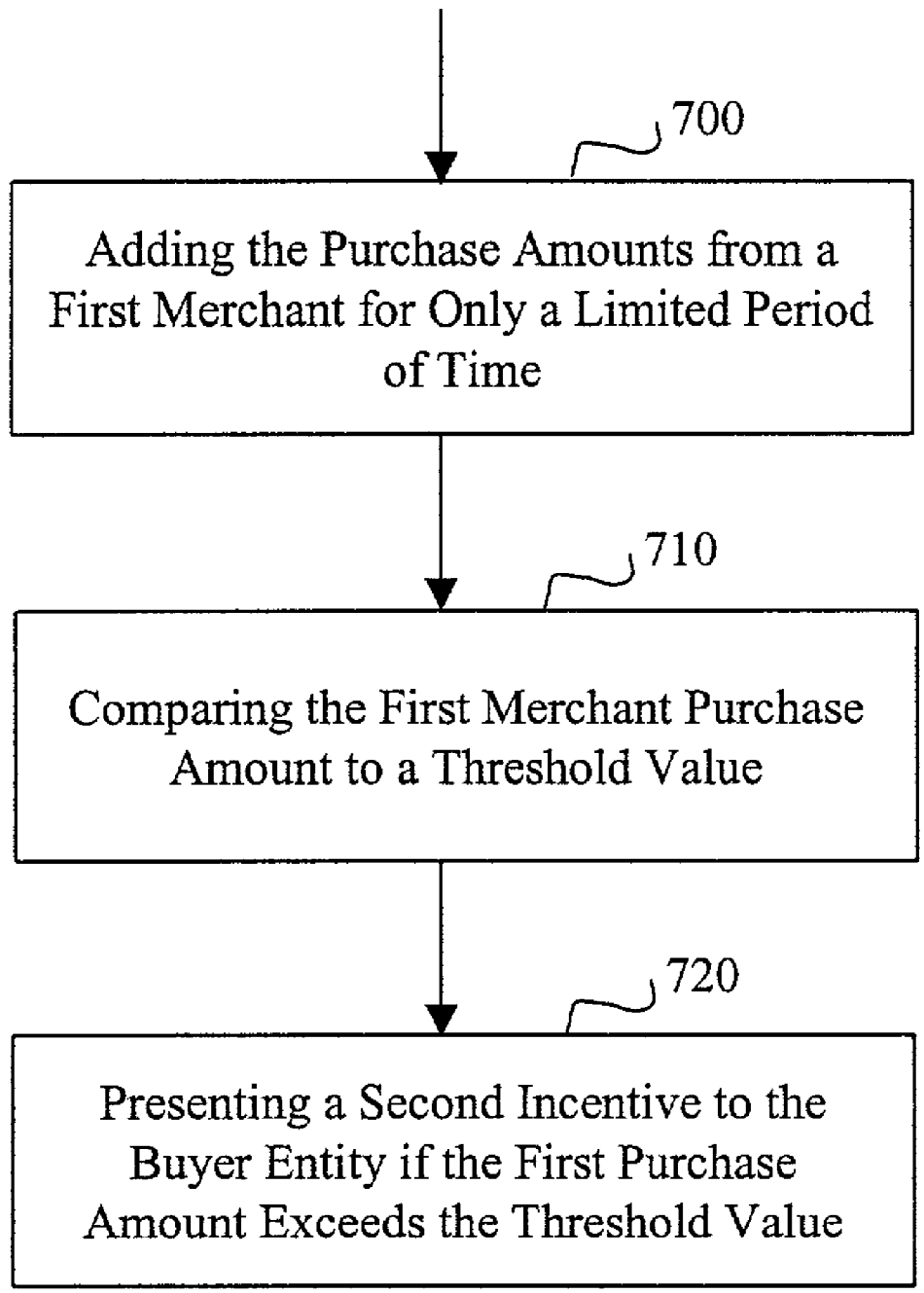
FIG. 7 is a flow chart diagram of a further embodiment of the present invention.

FIG. 7 shows a further embodiment of the present invention. This embodiment includes the step of block 700 of adding the purchase amounts in the database for the buyer entity over a first period of time made from a first merchant to obtain a first merchant purchase amount. The process further includes the step of block 710 of determining if the first merchant purchase amount exceed a threshold value; and the step of block 720 of presenting a second incentive (in addition to the first incentive discussed previously) to the buyer entity if the first merchant purchase amount exceeds the threshold value. This embodiment is designed to reward faithful customers.

Figure 8:
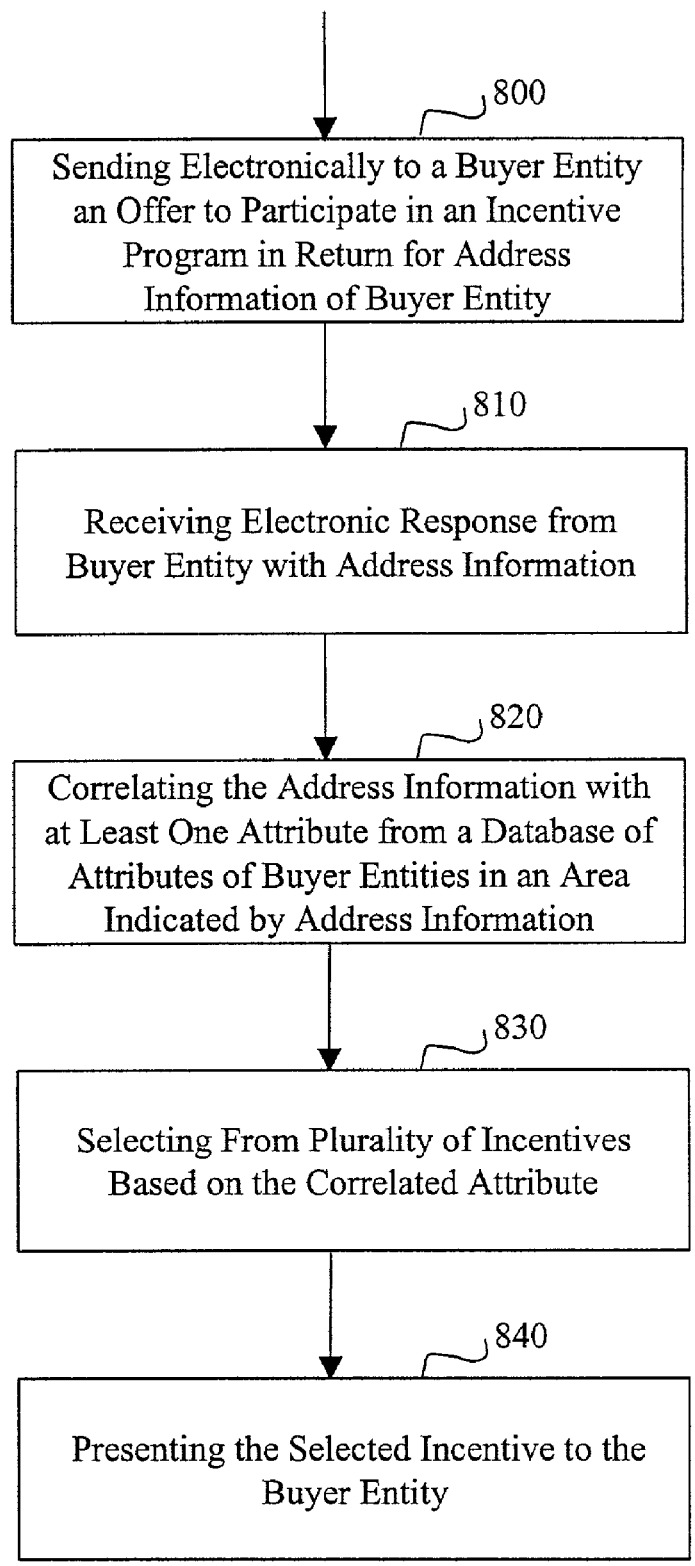
FIG. 8 is a flow chart diagram of a further embodiment of the present invention.

Referring now to FIG. 8, there is shown a further embodiment of the present invention. This embodiment for a method and a system for buyer-driven targeting comprising the steps of: in block 800 sending electronically to a buyer entity an offer to participate in an incentive program in return for address information of the buyer entity; and in block 810 receiving from the buyer entity an electronic response containing the address information; in block 820 correlating the address information with at least one attribute from a database of attributes of buyer entities in an area indicated by the address information. By way of example but not by way of limitation, an attribute that might be used is income and the database of attributes might be income values correlated with different zip codes in the country. The method further includes the step represented by block 830 of selecting from a plurality of incentives based on the correlated attribute. For example, different incentives would be provided depending on the income. The method further includes the step represented by block 840 of presenting the selected incentive to the buyer entity.

Figure 9:
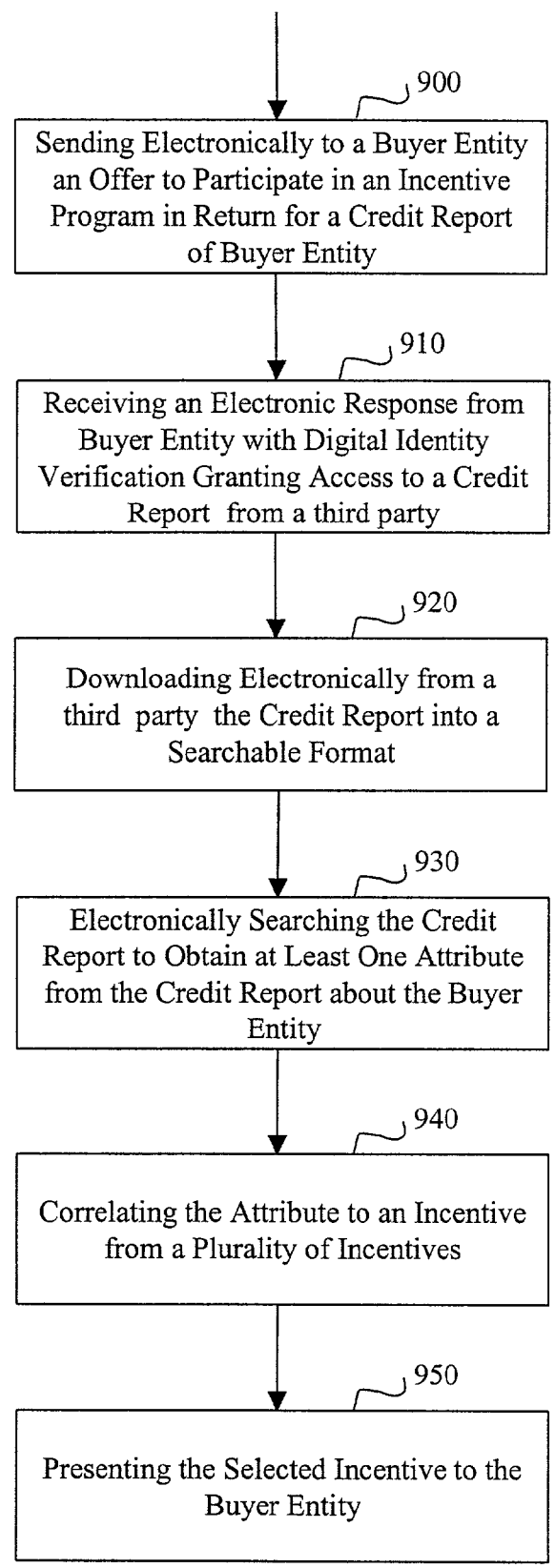
FIG. 9 is a flow chart diagram of a further embodiment of the present invention.

FIG. 9 sets forth a yet further embodiment of the present invention. This method and system for buyer-driven targeting comprises the steps of: in block 900 electronically sending to a buyer entity an offer to participate in an incentive program in return for access to a credit report for the buyer entity; and in block 910 receiving from the buyer entity an electronic response with a digital identity verification granting a right of access to the credit report. By way of example but not by way of limitation, the digital identity verification could be a digital signature or a digital certificate. The method further includes the step, represented by block 920, of downloading electronically the credit report or accessing the credit report at the credit report company. Note that this step could be deleted if the third party holding the credit report permitted the present system to electronically search the credit report at the third party facility. The method further includes the step in block 930 of searching electronically the credit report and obtaining at least one attribute about the buyer entity from the credit report. As noted above, this attribute could be related to income or a recent purchase, for example. The method further includes the step in block 940 of correlating that attribute to an incentive from a plurality of incentives based on the correlated attribute. Finally, the method includes the step in block 950 of presenting the selected incentive to the buyer entity.

Figure 10:
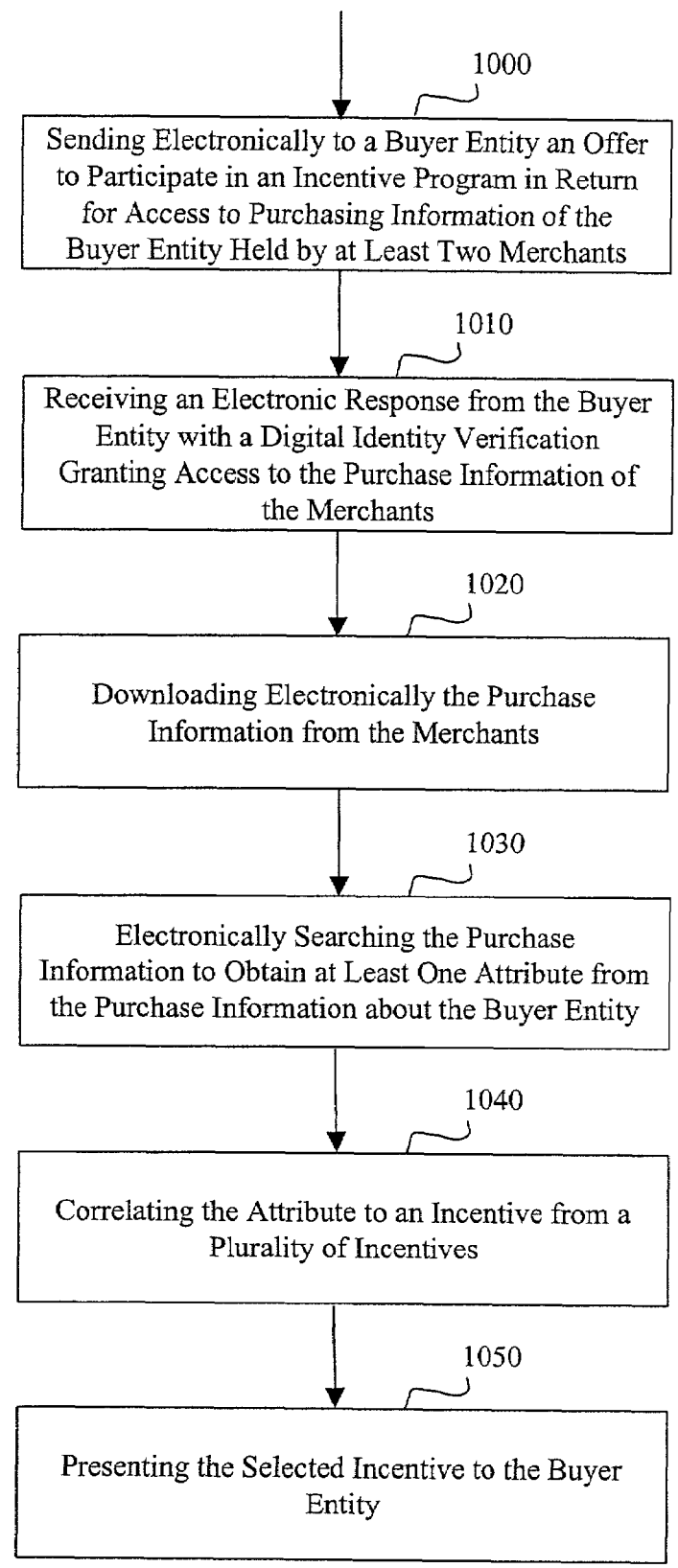
FIG. 10 is a flow chart diagram of a further embodiment of the present invention.

FIG. 10 shows a yet further embodiment of the present invention. This method for buyer-driven targeting comprises the steps of: in block 1000 sending to a buyer entity an electronic offer to participate in an incentive program in return for access to purchase information pertaining to the buyer entity from at least two merchants; and in block 1010 receiving from the buyer entity an electronic response with a digital identity verification granting a right of access to the purchase information of the merchants. The method further includes the step in block 1020 of downloading the purchase information from the merchants. The method further includes the step in block 1030 of electronically searching the purchase information to obtain at least one attribute from the purchase information about the buyer entity. The method further includes the step in block 1040 of correlating that attribute to an incentive from a plurality of incentives based on the correlated attribute. Finally, the method includes the step in block 1050 of presenting the selected incentive to the buyer entity.

Figure 11:
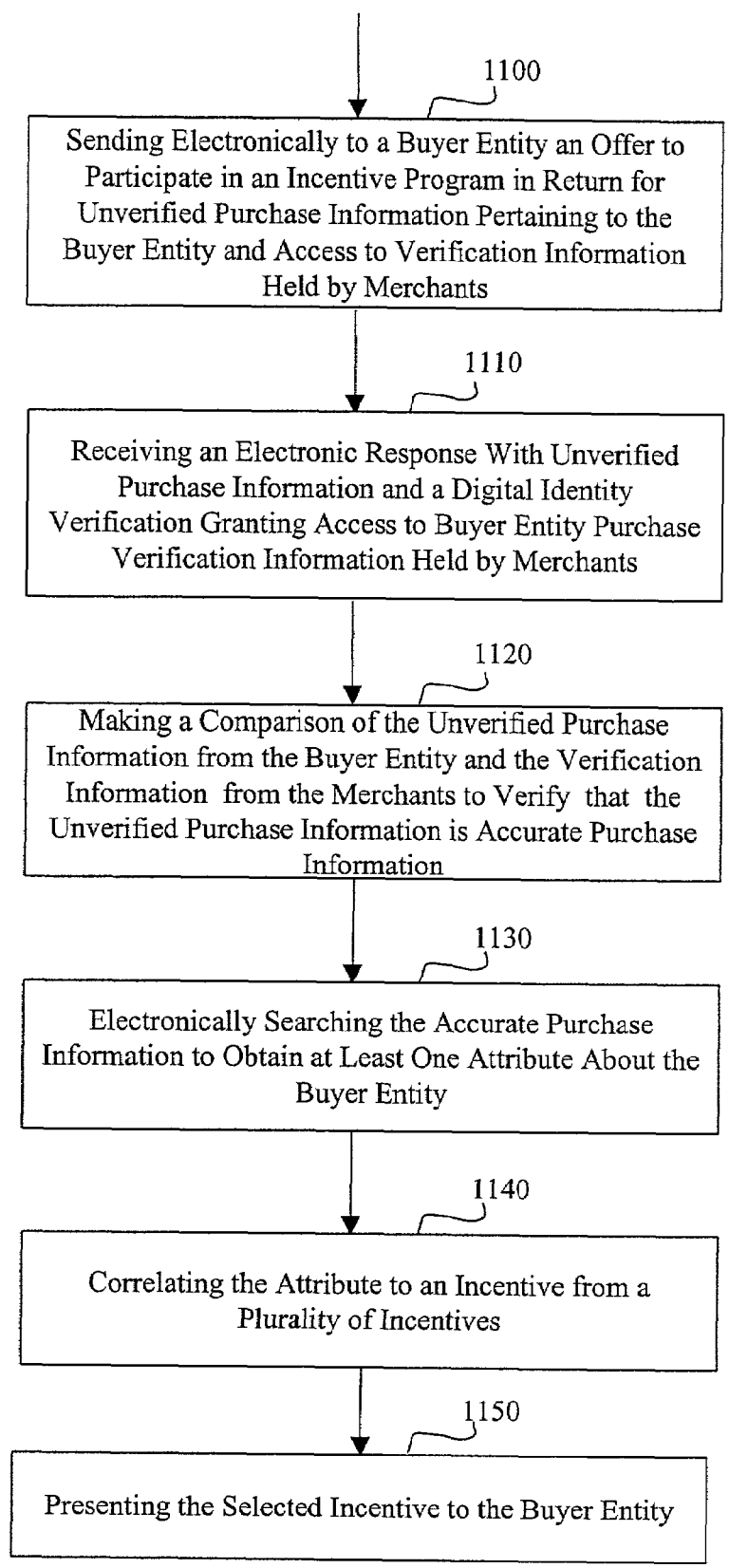
FIG. 11 is a flow chart diagram of a further embodiment of the present invention.

FIG. 11 shows yet a further embodiment of the present invention. In FIG. 11 a method and system is provided for buyer-driven targeting comprising the steps of: in block 1100 sending to a buyer entity an electronic offer to participate in an incentive program in return for unverified purchase information pertaining to the buyer entity and access to verification information held by merchants for that purchase information; and in block 1110 receiving from the buyer entity an electronic response with the unverified purchase information and a digital identity verification granting access to the buyer entity verification information held by the merchants from whom the purchases were made. The method further includes the step in block 1120 of making a comparison of the unverified purchase information for the buyer entity and the verification information from the merchants to verify that the unverified information is accurate purchase information. The method further includes the step in block 1130 of electronically searching the accurate purchase information to obtain at least one attribute about the buyer entity. The method further includes the step in block 1140 of correlating that attribute to an incentive from a plurality of incentives based on the correlated attribute. Finally, the method includes the step in block 1150 of presenting the selected incentive to the buyer entity.

In a further aspect of this embodiment, the method includes the steps of: adding the purchase amounts for the buyer entity over a first period of time made from a first merchant to obtain a first merchant purchase amount; determining if the first merchant purchase amount exceeds a threshold value; and presenting a second incentive to the buyer entity if the first merchant purchase amount exceeds the threshold value.

It should also be noted that the database of buyer purchase records and other enhancement information about the buyer entities comprise logical files. One skilled in the art would recognize that this data could be stored in a suitable database such that all the physical data records would be stored in one database file. However, the logical data records for each buyer entity would be separately retrievable. Alternatively, the logical data records could also be stored on several different database systems at one or more files.

It should be noted that in one aspect of the present invention, client advertisers will select audiences and order direct marketing services through an interactive user interface. The client advertisers will create their own lists by inputting various search criteria and buyer access to buyer entities (with identity information removed). The more narrowly a merchant defines his target list (as measured by list size and number of search criteria) the greater the price he will be charged for marketing to this list.

Another way in which the method of buyer-driven targeting could be enhanced is by way of showing to a buyer entity how its actions result in higher scores, and therefore in a greater level of benefits. By way of example but not by way of limitation, a measure that represents the total or partial benefits now available could be calculated on an ongoing basis and shown to the buyer entity. In particular, changes in this measure of benefits available now an/or in the future, or simply the scores referred to previously or changes thereto, could be shown to buyer entities at regular intervals or before and/or after the buyer entity takes certain actions to demonstrate and illustrate to the buyer entity how its behavior changes, and presumably improves, the total amount of benefits to which it can entitle itself through use of the system. For instance, and as previously explained, a buyer entity which regularly responds to Email advertisements with trial purchases of new products and services, would be able to obtain a higher reward level for reading and responding to Emails, because selling entities would be willing to pay more for sending an Email to a buyer entity which has a history of responding to such Emails frequently by making purchases than they are willing to pay for sending a promotional Email to a buyer entity which rarely or never responds to an Email.

Association of the email activity with a particular purchase may be performed in a wide variety of different ways. By way of example, if the rebate was offered in an Email, and the buyer entity avails itself of the rebate within a certain amount of time after the Email was sent, then, in one embodiment it can be presumed that the purchase was made in response to the Email and the system can electronically associate the purchase to the email activity, and which may also entail recording this association in a database listing or profile for the buyer entity or another convenient database which may or may not include the proof of purchase record. Some promotional offers will require that the buyer entity sign up for the promotional program prior or soon after the buyer entity makes the purchase. If the buyer entity does sign up before or soon after the purchase within the required time period, then the system may be set to associate the purchase activity with the email response. As noted previously, the determination as to whether the purchase was made within the required time period may be obtained simply by comparing dates and determining the elapsed time between the purchase date and the email date. Likewise, if the buyer entity clicks on a link embedded in the Email to go to a web page to make the purchase online, then the system can associate the purchase activity to the email, as discussed above. Likewise, if the buyer entity clicks on an embedded Email link to sign-up for a program that allows it to get a rebate when it makes an offline purchase of particular items, then the system can associate the purchase of the particular items to the email rebate sign-up. Some rebates will only require that the buyer entity use a credit card "registered" with the system, i.e., whose statements the system operator or a company implementing the system has access to and/or has a special relationship with, to qualify for a purchase rebate. In this case, it is more difficult to ascertain whether the purchase was made in response to an Email or to a Web Site, but again, if the purchase was made within a certain time period of relative to a given Email, then in one embodiment the system can assume that the purchase was made in response to the Email and can make the appropriate association of the purchase to the email. Also some Email will include links that the buyer entity can click on to obtain more information about a certain offer, and technology is also available that monitors whether Emails that are sent are opened or not, all of which can help ascertain the probability that a purchase was motivated by an Email promotion and cause the system to make an association between purchase activity and the email. Similarly, a buyer entity's browsing behavior on a site can be monitored for activity with respect to banner ads or web site advertisements relative to a product or service, and if a purchase of the product or service is made within a predetermined time period of this browsing activity, then in one embodiment the purchase activity can be associated within that browsing activity with respect to those ads.

The fact of this association of the purchase activity to email or web site activity could be used to increase the buyer entity's scores more than what they would have been from the purchase alone. Alternatively, and in a preferred embodiment, a separate indicator could be created for Email or web site or other advertisement responsiveness. In one embodiment, subscores for Email responsiveness across different purchase categories could be calculated. A wide variety of different algorithms could be used to calculate such an indicator. One simple example of such a calculation of an indicator is One point for each $ spent in response, i.e., associated with an Email, web site or other advertisement or within 45 days of such an advertisement. In this example, if a Buyer Entity spends $550 during a particular year, the indicator could be 550. Other arbitrary methods for calculating the indicator may be used. Knowing or estimating what type of advertisements elicit purchases from a buyer entity is a key element of a buyer entity profile.

As noted previously, it is advantageous to display or otherwise to provide to the buyer entity the total or a partial amount of benefits to which the buyer entity can newly avail itself as the result of one or several purchasing actions or other actions including email and browsing activity that it took. This measure of the total or partial benefits available could be calculated or estimated and presented to the buyer entity either by showing to the buyer entity a change in its previously mentioned score or scores, or by quantifying the total or partial benefits available now and/or in the future to the buyer entity throughout the system or in some other convenient manner. Such a measure of the total or partial benefits available to the buyer entity could simply entail adding all or a portion of benefits in the form of the value of potential rebates and other rewards to which the buyer entity can avail itself now or in the future as the result of a recently increased score or set of scores, or it could entail adding the total benefits for a limited amount of top offers, such as the top 10 offers for which a buyer entity qualifies.

Note that these benefits may be offered by a plurality of different merchants. As noted previously, these different merchants set up advertisement and other sales programs in conjunction with the system or company or companies implementing the invention. Merchants or the system set up these different programs and benefits are calculated individually depending on reward functions that are set up, as discussed previously. Alternatively, changes in the rate at which the buyer entity is compensated for reading or responding to advertisements, or changes in the average rebate to which the buyer entity is entitled at certain participating merchants could be shown to the buyer entity. By way of example but not by way of limitation, the buyer entity could now get 50 cents to click on an Email, due to the buyer entity's increase in purchase or other activity, as opposed to previously getting 25 cents to click on an Email—the difference is 25 cents or a 100% rate increase. Such rate changes may be determined simply by comparing the buyer entity scores to certain thresholds, and changing the rate to a different predetermined rate as the score reaches each threshold. Alternatively, rates could be calculated using a more complex algorithm, such as based on an estimate of the amount of revenues and profits that are generated from a buyer entity if a certain incentive is given to it. For example, if a buyer entity receives 20 Emails per year, and offering the buyer entity $1 to click on an Email will increase the number of Emails on which it clicks from 5 to 15, then the following applies: Cost: offering the buyer entity $1 as opposed to nothing increases the cost by $15; Revenues: if 1 of 5 clicks leads to a trial purchase, and advertisers are willing to pay $50 for each trial purchase, then additional revenues of $100 are generated resulting from the 2 additional trial purchases in response to 10 additional clicks due to the incentive. The Net Profit on adding the $1 incentive therefore is $85 excluding interest costs and various miscellaneous and overhead expenses associated with administering the incentive.

Note that present invention can be applied to businesses as well as to individuals. In this regard, businesses might be less reluctant to send in their credit card statements and more disciplined in their attempt to obtain good ratings.

The present invention, by creating an electronically searchable database containing purchase information in the form of copies of credit card statements and other proof of purchase records, provides a more efficient way for buyer entities to communicate information about past purchases than answering questions. A buyer entity would have to take a long time answering questions and recalling past purchases to communicate the same knowledge orally, and it would be unverified information.

By contrast, the present invention allows advertisers to have access to the purchase records of other merchant companies in the same industry and market in which they operate. Naturally, advertisers are most interested in those customers who have a record of buyer the very products and categories of products and services that they are trying to sell.

One of skill in the art would recognize that the above system describes the typical components of computer systems connected to an electronic network. It should be appreciated that many other similar configurations are within the abilities of one skilled in the art including configurations wherein one or more steps are performed manually, and all of these configurations could be used with the method of the present invention. Furthermore, it should be recognized that the computer system and network disclosed herein can be programmed and configured, by one skilled in the art, to implement the method steps discussed further herein. It would also be recognized by one of skill in the art that the various components that are used to implement the present invention may comprised of software, hardware, or a combination thereof and that one or more of the steps may be implemented manually.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen in generally on designer choice. It is understood that all such variations are within the scope of the invention. Likewise, software and web implementation of the present invention could be accomplished with standard programming techniques with rule based logic, and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs and permitting manual implementation.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method for buyer-driven targeting by a system comprising:

receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;

electronically storing, by computer, information associated with said data;

for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, electronically making, by computer, with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive; and facilitating the offering, by computer, of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom;

wherein said making or helping to make at least one decision step further comprises the categorization of purchases listed from a plurality of independent third party merchants in the purchase records or information verifiably derived therefrom based on a set of categories; and further comprising:
calculating or facilitating the calculation of a separate score for one of the buyer entities in at least one of the categories based on purchase data associated with purchases by the buyer entity in each of the respective categories; and calculating a charge for providing the incentive based on both the size of a group of buyer entities resulting from a search of the stored information and the scores of the buyer entities.

2. The method as defined in claim 1, further comprising:
obtaining acceptance information on whether one of the buyer entities accepted the incentive; and
storing the acceptance information to a database.

3. The method as defined in claim 2, further comprising: obtaining additional information on whether the buyer entity made a follow-up purchase or a co-purchase contemporaneous with or after accepting the incentive and inputting the additional information to be stored.

4. The method as defined in claim 1, further comprising:
receiving additional information on whether one of the buyer entities accepted the incentive; and
recalculating at least one of the scores for one of the buyer entities based on the additional information.

5. The method as defined in claim 4, further comprising:
determining if the recalculated score qualifies said one of the buyer entities for an on-going incentive.

6. The method as defined in claim 4, further comprising:
recalculating the incentive by applying said recalculated score of said one of the buyer entities to an incentive function or algorithm.

7. The method as defined in claim 1, wherein the plurality of incentives are provided across a plurality of distribution channels.

8. The method as defined in claim 1, comprising:
receiving additional information that one of the buyer entities visited a predetermined web site; and recalculating one of the scores of said one of the buyer entities to increase the score based on additional information.

9. The method as recited in claim 1, further comprising:
receiving permission from said at least one buyer entity to send a threshold-contingent incentive by email, said permission being contingent on said threshold-contingent incentive meeting a threshold value;
and wherein said making includes:
determining a value of a particular incentive, and
making a decision in favor of sending said particular incentive to said buyer entity if and only if said incentive meets said threshold.

10. A system for buyer-driven targeting comprising:

an electronic storage; and a set of processors that use the electronic storage and include among them the following logic elements a first component for receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;

a second electronic component for storing information associated with said data;

for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, a third electronic component for making with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive; and a fourth component for offering of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom, wherein said second component for making or helping make a decision step further comprises a component for categorizing purchases listed from a plurality of independent third party merchants in the proof of purchase records based on a set of categories, and further comprising:
- a component for calculating at least one score for a buyer entity based on the amount purchased in one or more selected categories; and
- a component for calculating a charge for providing the incentive based on both the size of a group of buyer entities resulting from a search of the stored information and the scores of the buyer entities.

11. The system as defined in claim 10, further comprising a component for obtaining acceptance information on whether one of the buyer entities accepted the incentive; and
a component for storing the acceptance information to a database.

12. The system as defined in claim 11, further comprising a component for obtaining additional information on whether the buyer entity made a follow-up purchase or a co-purchase contemporaneous with or after accepting the incentive and inputting the additional information to be stored.

13. The system as defined in claim 10, further comprising:
- a component for receiving information on whether one of the buyer entities accepted the incentive; and
- a component for recalculating at least one of the scores for one of the buyer entities based on the buyer entity accepting the incentive.

14. The system as defined in claim 13, further comprising: a component for determining if the recalculated score qualifies said one of the buyer entities for an on-going incentive.

15. The system as defined in claim 13, further comprising: a component for recalculating the incentive determined in said offering or facilitating the offering component by applying said recalculated score of said one of the buyer entities to an incentive function.

16. The system as defined in claim 10, wherein the system provides the plurality of incentives across a plurality of distribution channels.

17. The system as defined in claim 10, comprising: a component for receiving information that one of the buyer entities visited a predetermined web site; and recalculating one of the scores of said one of the buyer entities to increase the score based on this visit.

18. A method for buyer-driven targeting by a system comprising:
receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;
electronically storing, by computer, information associated with said data;
for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, electronically making, by computer, with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive; and
facilitating the offering, by computer, of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom;
wherein said making or helping to make at least one decision step further comprises the categorization of purchases listed from a plurality of independent third party merchants in the purchase records or information verifiably derived therefrom based on a set of categories;
further comprising:
calculating or facilitating the calculation of a separate score for one of the buyer entities in at least one of the categories based on purchase data associated with purchases by the buyer entity in each of the respective categories; and
submitting a request to one of said buyer entities to provide a rating of a product or service item only if the purchase record or the information verifiably derived therefrom indicates that a purchase of the product or service item to be rated has been or might have been made.

19. The method as defined in claim 18, further comprising:
obtaining acceptance information on whether one of the buyer entities accepted the incentive; and
storing the acceptance information to a database.

20. The method as defined in claim 19, further comprising: obtaining additional information on whether the buyer entity made a follow-up purchase or a co-purchase contemporaneous with or after accepting the incentive and inputting the additional information to be stored.

21. A system for buyer-driven targeting comprising:
an electronic storage; and
a set of processors that use the electronic storage and include among them the following logic elements
a first component for receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;

a second electronic component for storing information associated with said data;

for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, a third electronic component for making with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive;

a fourth component for offering of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom; and a component for submitting a request to one of said buyer entities to provide a rating of a product or service only if the purchase record of the buyer entity shows a purchase of the product or service to be rated.

22. The system as defined in claim 21, further comprising
a component for obtaining acceptance information on whether one of the buyer entities accepted the incentive; and
a component for storing the acceptance information to a database.

23. The system as defined in claim 22, further comprising:
a component for obtaining additional information on whether the buyer entity made a follow-up purchase or a co-purchase contemporaneous with or after accepting the incentive and inputting the additional information to be stored.

24. A method for buyer-driven targeting by a system comprising:
receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;
electronically storing, by computer, information associated with said data;
for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, electronically making, by computer, with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive; and
facilitating the offering, by computer, of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom;
wherein said making or helping to make at least one decision step further comprises the categorization of purchases listed from a plurality of independent third party merchants in the purchase records or information verifiably derived therefrom based on a set of categories;
further comprising:
calculating or facilitating the calculation of a separate score for one of the buyer entities in at least one of the categories based on purchase data associated with purchases by the buyer entity in each of the respective categories;
submitting a request to one of said buyer entities to provide a rating of a product or service item only if the purchase record or the information verifiably derived therefrom indicates that a purchase of the product or service item to be rated has been or might have been made;

weighting each entity submitted rating for a product or service item according to the money spent on the particular product or service item by the entity; and creating an average rating for the product or service item based on the weighted entity submitted ratings.

25. The method as defined in claim 24, further comprising:

obtaining acceptance information on whether one of the buyer entities accepted the incentive; and storing the acceptance information to a database.

26. The method as defined in claim 25, further comprising:

obtaining additional information on whether the buyer entity made a follow-up purchase or a co-purchase contemporaneous with or after accepting the incentive and inputting the additional information to be stored.

27. A system for buyer-driven targeting comprising:

an electronic storage; and a set of processors that use the electronic storage and include among them the following logic elements a first component for receiving from each of a plurality of buyer entities at least one respective third party purchase record or information derived therefrom, said purchase record or information derived therefrom comprising data associated with the purchase of products or services for which the payment was not carried out by the system, wherein the receipt of the third party purchase record or information derived therefrom occurs on the initiative and with the consent of the buyer entity associated with that purchase record;

a second electronic component for storing information associated with said data;

for a plurality of product or service items offered for sale, wherein each different item in said plurality of items is either manufactured or marketed or distributed or provided by a different third party advertiser in a plurality of third party advertisers, and wherein said manufacture, marketing, distribution, point of sale payment or provision of the product or service is not carried out by the system in the ordinary course of business, a third electronic component for making with respect to at least one of said buyer entities, based at least in part on said information, at least one decision associated with the offering of at least one from among a plurality of different preferential incentives, with each incentive associated with at least one of said product or service items and associated with at least one of the third party advertisers, wherein there is at least one different preferential incentive from each of a plurality of the different third party advertisers, each of said incentives offering at least one benefit in exchange for at least one action associated with a purchase of at least one of said items, said benefit not normally and publicly accessible to said buyer entity or other buyer entities in the same geographic region on terms which are at least objectively equivalent, and which do not include material conditions that are different from said at least one action, said decision regarding the at least one incentive that is to be offered to the buyer entity being based at least in part on stored information associated with the data relating to a purchase made by said buyer entity with a merchant other than the third party advertiser that is associated with the incentive;

a fourth component for offering of at least one of said preferential incentives to said buyer entity, without having transferred to said third party advertiser any full name associated with said buyer entity at the time that the incentive is offered but has not yet been responded to by said buyer entity, with a condition precedent for this step that the system has received from that buyer entity the at least one respective third party purchase record or information verifiably derived therefrom;

a component for submitting a request to one of said buyer entities to provide a rating of a product or service only if the purchase record of the buyer entity shows a purchase of the product or service to be rated;

a component for weighting each entity submitted rating for a product or service according to the money spent on the particular product or service by the entity; and a component for creating an average rating for the product or service based on the weighted entity submitted ratings.

28. The system as defined in claim 27, further comprising a component for obtaining acceptance information on whether one of the buyer entities accepted the incentive; and a component for storing the acceptance information to a database.

29. The system as defined in claim 28, further comprising:

a component for obtaining additional information on whether the buyer entity made a follow-up purchase or a co-purchase contemporaneous with or after accepting the incentive and inputting the additional information to be stored.

30. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:
obtaining multiplier-effect-information on said buyer entity, said information being associated with at least one follow-up purchase or at least one contemporaneous co-purchase which the buyer entity made with or after accepting the incentive;
storing the acceptance information; and
making a decision to offer a further incentive to the buyer entities based at least in part on said multiplier-effect-information, said decision being in the economic interest of the buyer entity.

31. The method as recited in claim 30, wherein the making further includes executing a forward-looking process, the forward-looking process including:
determining a function and budget-related limit associated with at least one of the incentives based in part on information received from a forward-participating-advertiser,
receiving newly-submitted purchase records of the buyer entities with the condition precedent that the function and budget-related limit has been determined;
automatically and electronically making a new decision associated with the offering, said new decision being based at least in part on the function, the budget limit, and the newly-submitted purchase records;
distributing the incentive at least in part on the new decision; and
halting the distributing when the budget-related limit is met.

32. The method as recited in claim 30, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

33. The method as recited in claim 30, wherein said receiving includes:
receiving the permission of at least one of the buyer entities to access at least some of web-based online accounts thereof
automatically accessing the web-based online accounts;
retrieving at least some of said information relating to said purchases made by said at least one of the buyer entities; and
repeating said accessing and retrieving steps unless a cancellation of said permission is received.

34. The method as recited in claim 30, comprising:
obtaining acceptance information on whether at least one of the buyer entities accepted the incentive;
storing the acceptance information; and
making a decision to offer a further incentive to said at least one of the buyer entities based at least in part on said acceptance information, said decision being in the economic interest of said at least one of the buyer entities.

35. The method as recited in claim 30, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information; and
wherein the making further includes executing a forward-looking process, the forward-looking process including:
determining a function and budget-related limit associated with at least one of the incentives based in part on information received from a forward-participating-advertiser;
receiving newly-submitted purchase records of the buyer entities with the condition precedent that the function and budget-related limit has been determined;
automatically and electronically making a new decision associated with the making of an incentive offer, said decision being based at least in part on the function, budget limit, and the newly-submitted purchase records;
distributing the incentive based at least in part on the revised making; and
halting the distributing when the budget-related limit is met.

36. The method as recited in claim 30, wherein said receiving includes:
receiving the permission of at least one of the buyer entities to access at least some of web-based online accounts thereof;
automatically accessing the web-based online accounts;
retrieving at least some of said information relating to said purchases made by said at least one of the buyer entities; and
repeating said accessing and retrieving steps unless a cancellation of said permission is received;
wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

37. The method as recited in claim 30, wherein said receiving includes:
receiving the permission of at least one of the buyer entities to access at least some of web-based online accounts thereof;
automatically accessing the web-based online accounts;
retrieving at least some of said information relating to said purchases made by said at least one of the buyer entities; and
repeating said accessing and retrieving steps unless a cancellation of said permission is received;
wherein the making further includes executing a forward-looking process, the forward-looking process including:

determining a function and budget-related limit associated with at least one of the incentives based in part on information received from a forward-participating-advertiser, receiving newly-submitted purchase records of the buyer entities with the condition precedent that the function and budget-related limit has been determined;

automatically and electronically making a new decision associated with the making of an incentive offer, said decision being based at least in part on the function, budget limit, and the newly-submitted purchase records;

distributing the incentive based at least in part on the revised making; and halting the distributing when the budget-related limit is met.

38. The method as recited in claim 30, wherein said receiving includes:

receiving the permission of at least one of the buyer entities to access at least some of web-based online accounts thereof;

automatically accessing the web-based online accounts;

retrieving at least some of said information relating to said purchases made by said at least one of the buyer entities; and repeating said accessing and retrieving steps unless a cancellation of said permission is received;

wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information;

wherein the making further includes executing a forward-looking process, the forward-looking process including:

determining a function and budget-related limit associated with at least one of the incentives based in part on information received from a forward-participating-advertiser, receiving newly-submitted purchase records of the buyer entities with the condition precedent that the function and budget-related limit has been determined;

automatically and electronically making a new decision associated with the making of an incentive offer, said new decision being based at least in part on the function, budget limit, and the newly-submitted purchase records;

distributing the incentive based at least in part on the revised making; and halting the distributing when the budget-related limit is met.

39. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity;

wherein the receipt of the third party purchase record or information derived therefrom occurs on an initiative and with consent of the buyer entity associated with that purchase record.

40. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity;

wherein the purchase record or information derived therefrom comprises data associated with the purchase of products or services for which payment was not carried out by the system.

41. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity;

wherein the receipt of the third party purchase record or information derived therefrom occurs on an initiative and with consent of the buyer entity associated with that purchase record, wherein the purchase record or information derived therefrom comprises data associated with the purchase of products or services for which payment was not carried out by the system.

42. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the manufacture, marketing, distribution, and providing are not carried out by the system in the ordinary course of business.

43. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the receipt of the third party purchase record or information derived therefrom occurs on an initiative and with consent of the buyer entity associated with that purchase record, wherein the manufacture, marketing, distribution, and providing are not carried out by the system in the ordinary course of business.

44. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the purchase record or information derived therefrom comprises data associated with the purchase of products or services for which payment was not carried out by the system, wherein the manufacture, marketing, distribution, and providing are not carried out by the system in the ordinary course of business.

45. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the at least one benefit is not normally and publicly accessible to the buyer entity or other buyer entities in the same geographic region on terms which are at least objectively equivalent, and which do not include material conditions that are different from the at least one action.

46. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the receipt of the third party purchase record or information derived therefrom occurs on an initiative and with consent of the buyer entity associated with that purchase record, wherein the at least one benefit is not normally and publicly accessible to the buyer entity or other buyer entities in the same geographic region on terms which are at least objectively equivalent, and which do not include material conditions that are different from the at least one action.

47. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the purchase record or information derived therefrom comprises data associated with the purchase of products or services for which payment was not carried out by the system, wherein the at least one benefit is not normally and publicly accessible to the buyer entity or other buyer entities in the same geographic region on terms which are at least objectively equivalent, and which do not include material conditions that are different from the at least one action.

48. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the manufacture, marketing, distribution, and providing are not carried out by the system in the ordinary course of business, wherein the at least one benefit is not normally and publicly accessible to the buyer entity or other buyer entities in the same geographic region on terms which are at least objectively equivalent, and which do not include material conditions that are different from the at least one action.

49. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the decision regarding the at least one incentive that is to be offered to the buyer entity is based at least in part on stored information relating to at least one purchase made by the buyer entity with merchants other than the third party advertiser that is associated with the incentive.

50. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored information relating to at least one purchase made by the buyer entity with merchants other than the third party advertiser that is associated with the incentive.

51. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the purchase record or information derived therefrom comprises data associated with the purchase of products or services for which payment was not carried out by the system, wherein the decision regarding the at least one incentive that is to be offered to the buyer entity is based at least in part on stored information relating to at least one purchase made by the buyer entity with merchants other than the third party advertiser that is associated with the incentive.

52. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the manufacture, marketing, distribution, and providing are not carried out by the system in the ordinary course of business, wherein the decision regarding the at least one incentive that is to be offered to the buyer entity is based at least in part on stored information relating to at least one purchase made by the buyer entity with merchants other than the third party advertiser that is associated with the incentive.

53. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the at least one benefit is not normally and publicly accessible to the buyer entity or other buyer entities in the same geographic region on terms which are at least objectively equivalent, and which do not include material conditions that are different from the at least one action, wherein the decision regarding the at least one incentive that is to be offered to the buyer entity is based at least in part on stored information relating to purchases made by the buyer entity with merchants other than the third party advertiser that is associated with the incentive.

54. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the offering is facilitated without having transferred to the third party advertiser any full name associated with the buyer entity at the time that the incentive is offered but has not yet been responded to by the buyer entity.

55. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity.

56. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity.

57. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the manufacture, marketing, distribution, and providing are not carried out by the system in the ordinary course of business, wherein the offering is facilitated without having transferred to the third party advertiser any full name associated with the buyer entity at the time that the incentive is offered but has not yet been responded to by the buyer entity.

58. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the at least one benefit is not normally and publicly accessible to the buyer entity or other buyer entities in the same geographic region on terms which are at least objectively equivalent, and which do not include material conditions that are different from the at least one action, wherein the offering is facilitated without having transferred to the third party advertiser any full name associated with the buyer entity at the time that the incentive is offered but has not yet been responded to by the buyer entity.

59. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items;

facilitating the offering, by computer, of at least one of the incentives to the buyer entity, with a condition precedent for this operation that the system has received from that buyer entity the at least one respective third party purchase record or information verifiably derived therefrom;

further comprising:

obtaining multiplier-effect-information on said buyer entity, said information being associated with at least one follow-up purchase or at least one contemporaneous co-purchase which the buyer entity made with or after accepting the incentive;

storing the acceptance information; and making a decision to offer a further incentive to the buyer entities based at least in part on said multiplier-effect-information, said decision being in the economic interest of the buyer entity, wherein the decision regarding the at least one incentive that is to be offered to the buyer entity is based at least in part on stored information relating to at least one purchase made by the buyer entity with merchants other than the third party advertiser that is associated with the incentive, wherein the offering is facilitated without having transferred to the third party advertiser any full name associated with the buyer entity at the time that the incentive is offered but has not yet been responded to by the buyer entity.

60. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

61. The method as recited in claim 60, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

62. The method as recited in claim 60, further comprising:

obtaining acceptance information on whether at least one of the buyer entities accepted the incentive;

storing the acceptance information; and making a decision to offer a further incentive to said at least one of the buyer entities based at least in part on said acceptance information, said decision being in the economic interest of said at least one of the buyer entities.

63. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

64. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the receiving step comprises:
  sending to a buyer entity an offer for participating in an incentive program in return for access to purchase information pertaining to the buyer entity from at least three merchants;
  receiving from the buyer entity a response with a digital identity verification granting a right of access to said purchase information of the merchants; and
  obtaining said purchase information from the merchants;
  wherein said making a decision step comprises:
  electronically searching the purchase information to obtain at least one attribute from the purchase information about the buyer entity; and
  correlating the attribute to an incentive from a plurality of incentives.

65. A method for buyer-driven targeting by a system comprising:
  receiving data from each of a plurality of buyer entities comprising at least one respective third party purchase record or information derived therefrom;
  electronically storing, by computer, information associated with the data;
  for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the purchase record or information derived therefrom comprises data associated with the purchase of products or services for which payment was not carried out by the system, wherein the receiving step comprises:
  sending to a buyer entity an offer for participating in an incentive program in return for access to purchase information pertaining to the buyer entity from at least three merchants;
  receiving from the buyer entity a response with a digital identity verification granting a right of access to said purchase information of the merchants; and
  obtaining said purchase information from the merchants;
  wherein said making a decision step comprises:
  electronically searching the purchase information to obtain at least one attribute from the purchase information about the buyer entity; and
  correlating the attribute to an incentive from a plurality of incentives.

66. A method for buyer-driven targeting by a system comprising:
  receiving data from each of a plurality of buyer entities comprising at least one respective third party purchase record or information derived therefrom;
  electronically storing, by computer, information associated with the data;
  for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the receiving step comprises:
  sending to a buyer entity an offer for participating in an incentive program in return for access to purchase information pertaining to the buyer entity from at least three merchants;
  receiving from the buyer entity a response with a digital identity verification granting a right of access to said purchase information of the merchants; and
  obtaining said purchase information from the merchants;

wherein said making a decision step comprises:
electronically searching the purchase information to obtain at least one attribute from the purchase information about the buyer entity; and
correlating the attribute to an incentive from a plurality of incentives.

67. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the manufacture, marketing, distribution, and providing are not carried out by the system in the ordinary course of business,
wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

68. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the manufacture, marketing, distribution, and providing are not carried out by the system in the ordinary course of business,
wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

69. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;

wherein said making a decision step comprises:
electronically searching the purchase information to obtain at least one attribute from the purchase information about the buyer entity; and
correlating the attribute to an incentive from a plurality of incentives.

70. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the at least one benefit is not normally and publicly accessible to the buyer entity or other buyer entities in the same geographic region on terms which are at least objectively equivalent, and which do not include material conditions that are different from the at least one action, wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;

wherein said making a decision step comprises:
electronically searching the purchase information to obtain at least one attribute from the purchase information about the buyer entity; and
correlating the attribute to an incentive from a plurality of incentives.

71. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the at least one benefit is not normally and publicly accessible to the buyer entity or other buyer entities in the same geographic region on terms which are at least objectively equivalent, and which do not include material conditions that are different from the at least one action, wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;

wherein said making a decision step comprises:
electronically searching the purchase information to obtain at least one attribute from the purchase information about the buyer entity; and
correlating the attribute to an incentive from a plurality of incentives.

72. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the at least one benefit is not normally and publicly accessible to the buyer entity or other buyer entities in the same geographic region on terms which are at least objectively equivalent, and which do not include material conditions that are different from the at least one action,
wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

73. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the decision regarding the at least one incentive that is to be offered to the buyer entity is based at least in part on stored information relating to at least one purchase made by the buyer entity with merchants other than the third party advertiser that is associated with the incentive,
wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

74. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored information relating to at least one purchase made by the buyer entity with merchants other than the third party advertiser that is associated with the incentive, wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

75. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the decision regarding the at least one incentive that is to be offered to the buyer entity is based at least in part on stored information relating to at least one purchase made by the buyer entity with merchants other than the third party advertiser that is associated with the incentive, wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision step comprises:
electronically searching the purchase information to obtain at least one attribute from the purchase information about the buyer entity; and
correlating the attribute to an incentive from a plurality of incentives.

76. A method for buyer-driven targeting by a system comprising:
receiving data from each of a plurality of buyer entities comprising at least one respective third party purchase record or information derived therefrom;
electronically storing, by computer, information associated with the data;
for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the decision regarding the at least one incentive that is to be offered to the buyer entity is based at least in part on stored information relating to at least one purchase made by the buyer entity with merchants other than the third party advertiser that is associated with the incentive,
wherein the receiving step comprises:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

77. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the decision regarding the at least one incentive that is to be offered to the buyer entity is based at least in part on stored information relating to purchases made by the buyer entity with merchants other than the third party advertiser that is associated with the incentive, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

78. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the offering is facilitated without having transferred to the third party advertiser any full name associated with the buyer entity at the time that the incentive is offered but has not yet been responded to by the buyer entity, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

79. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity, wherein the receiving step comprises:
  sending to a buyer entity an offer for participating in an incentive program in return for access to purchase information pertaining to the buyer entity from at least three merchants;
  receiving from the buyer entity a response with a digital identity verification granting a right of access to said purchase information of the merchants; and
  obtaining said purchase information from the merchants;
  wherein said making a decision step comprises:
  electronically searching the purchase information to obtain at least one attribute from the purchase information about the buyer entity; and
  correlating the attribute to an incentive from a plurality of incentives.

80. A method for buyer-driven targeting by a system comprising:
receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity, wherein the receiving step comprises:
  sending to a buyer entity an offer for participating in an incentive program in return for access to purchase information pertaining to the buyer entity from at least three merchants;
  receiving from the buyer entity a response with a digital identity verification granting a right of access to said purchase information of the merchants; and
  obtaining said purchase information from the merchants;
  wherein said making a decision step comprises:
  electronically searching the purchase information to obtain at least one attribute from the purchase information about the buyer entity; and
  correlating the attribute to an incentive from a plurality of incentives.

81. A method for buyer-driven targeting by a system comprising:
receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the offering is facilitated without having transferred to the third party advertiser any full name associated with the buyer entity at the time that the incentive is offered but has not yet been responded to by the buyer entity, wherein the receiving step comprises:
  sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

82. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the offering is facilitated without having transferred to the third party advertiser any full name associated with the buyer entity at the time that the incentive is offered but has not yet been responded to by the buyer entity, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

83. A method for buyer-driven targeting by a system comprising:

receiving data from each of a plurality of buyer entities comprising at least one respective third party purchase record or information derived therefrom;

electronically storing, by computer, information associated with the data;

for a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the decision regarding the at least one incentive that is to be offered to the buyer entity is based at least in part on stored data relating to at least one purchase made by the buyer entity with merchants other than the third party advertiser that is associated with the incentive, wherein the offering is facilitated without having transferred to the third party advertiser any full name associated with the buyer entity at the time that the incentive is offered but has not yet been responded to by the buyer entity, wherein the receiving step comprises:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision step comprises:

electronically searching the purchase information to obtain at least one attribute from the purchase information about the buyer entity; and correlating the attribute to an incentive from a plurality of incentives.

84. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

85. The computer program product as recited in claim 84, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

86. The computer program product as recited in claim 84, wherein said receiving includes:

receiving the permission of at least one of the buyer entities to access at least some of web-based online accounts thereof;

automatically accessing the web-based online accounts;

retrieving at least some of said information relating to said purchases made by said at least one of the buyer entities; and repeating said accessing and retrieving unless a cancellation of said permission is received.

87. The computer program product as recited in claim 84, further comprising:

computer code for obtaining multiplier-effect-information on said buyer entity, said information being associated with at least one follow-up purchase or at least one contemporaneous co-purchase which the buyer entity made with or after accepting the incentive;

computer code for storing the acceptance information; and computer code for making a decision to offer a further incentive to the buyer entities based at least in part on said multiplier-effect-information, said decision being in the economic interest of the buyer entity.

88. The computer program product as recited in claim 84, further comprising:

computer code for calculating for said buyer entity at least one measure which indicates the amount of benefits available to the buyer entity based at least in part on the information stored about the buyer entity; and computer code for presenting said at least one measure to the buyer entity.

89. The computer program product as recited in claim 84, where said incentive is presented to the buyer entity on a wireless device, and where said decision is made at least in part based on location information associated with the location of the wireless device.

90. The computer program product as recited in claim 84, further comprising computer code for receiving manual input from the buyer entity, and making said decision at least in part based on the manual input.

91. The computer program product as recited in claim 84, further comprising computer code for receiving browsing-behavior information associated with the buyer entity, and making said decision at least in part based on the browsing-behavior information.

92. The computer program product as recited in claim 84, further comprising computer code for receiving demographic information associated with the buyer entity, and making said decision at least in part based on the demographic information.

93. The computer program product as recited in claim 84, further comprising computer code for calculating a price for the offering of an incentive to the buyer entity based at least in part on information stored about the buyer entity.

94. The computer program product as recited in claim 84, further comprising computer code for sending information associated with the data of at least one particular of said buyer entities to a third party after receipt of an authorization from said at least one particular buyer entity.

95. The computer program product as recited in claim 84, further comprising: computer code for obtaining enhancement permission from at least one enhanced buyer entity of said plurality of buyer entities to supplement data associated with said enhanced buyer entity with additional information to be obtained from at least one third party information broker; and computer code for receiving additional information associated with the at least one enhanced buyer entity from at least one actual third party information broker; and wherein the incentive in the facilitating the offering of the incentive is offered to the enhanced buyer entity on improved terms based at least in part on the additional information.

96. The computer program product as recited in claim 84, further comprising:

computer code for adding the purchase amounts for the buyer entity over a first period of time made from a first merchant to obtain a first merchant purchase amount;

determining if the first merchant purchase amount exceeds a threshold value; and computer code for rewarding the buyer entity for having exceeded the threshold value of purchases.

97. The computer program product as recited in claim 84, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information; and wherein the making further includes executing a forward-looking process, the forward-looking process including:

determining a function and budget-related limit associated with at least one of the incentives based in part on information received from a forward-participating-advertiser;

receiving newly-submitted purchase records of the buyer entities with the condition precedent that the function and budget-related limit has been determined;

automatically and electronically making a new decision associated with the making of an incentive offer, said decision being based at least in part on the function, budget limit, and the newly-submitted purchase records;

distributing the incentive based at least in part on the revised making; and halting the distributing when the budget-related limit is met.

98. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

99. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

100. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the purchase record or information derived therefrom comprises data associated with the purchase of products or services for which payment was not carried out by the system, further comprising:
  computer code for obtaining acceptance information on whether at least one of the buyer entities accepted the incentive;
  computer code for storing the acceptance information; and
  computer code for making a decision to offer a further incentive to said at least one of the buyer entities based at least in part on said acceptance information, said decision being in the economic interest of said at least one of the buyer entities.

101. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, further comprising:
  computer code for obtaining acceptance information on whether at least one of the buyer entities accepted the incentive;
  computer code for storing the acceptance information; and
  computer code for making a decision to offer a further incentive to said at least one of the buyer entities based at least in part on said acceptance information, said decision being in the economic interest of said at least one of the buyer entities.

102. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the manufacture, marketing, distribution, and providing are not carried out by the system in the ordinary course of business, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

103. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the manufacture, marketing, distribution, and providing are not carried out by the system in the ordinary course of business, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

104. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

105. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the at least one benefit is not normally and publicly accessible to the buyer entity or other buyer entities in the same geographic region on terms which are at least objectively equivalent, and which do not include material conditions that are different from the at least one action, further comprising:
computer code for obtaining acceptance information on whether at least one of the buyer entities accepted the incentive;
computer code for storing the acceptance information; and
computer code for making a decision to offer a further incentive to said at least one of the buyer entities based at least in part on said acceptance information, said decision being in the economic interest of said at least one of the buyer entities.

106. A computer program product for buyer-driven targeting by a system comprising:
a set of computer-readable non-transitory media having computer readable program code embodied therein to be executed by a computer, the computer readable program code comprising program code to perform the following method:
receiving, via computer-enabled automated access, data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the at least one benefit is not normally and publicly accessible to the buyer entity or other buyer entities in the same geographic region on terms which are at least objectively equivalent, and which do not include material conditions that are different from the at least one action, further comprising:
computer code for obtaining acceptance information on whether at least one of the buyer entities accepted the incentive;
computer code for storing the acceptance information; and
computer code for making a decision to offer a further incentive to said at least one of the buyer entities based at least in part on said acceptance information, said decision being in the economic interest of said at least one of the buyer entities.

107. A computer program product for buyer-driven targeting by a system comprising:
a set of computer-readable non-transitory media having computer readable program code embodied therein to be executed by a computer, the computer readable program code comprising program code to perform the following method:
receiving, via computer-enabled automated access, data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the at least one benefit is not normally and publicly accessible to the buyer entity or other buyer entities in the same geographic region on terms which are at least objectively equivalent, and which do not include material conditions that are different from the at least one action, further comprising:
   computer code for obtaining acceptance information on whether at least one of the buyer entities accepted the incentive;
   computer code for storing the acceptance information; and
   computer code for making a decision to offer a further incentive to said at least one of the buyer entities based at least in part on said acceptance information, said decision being in the economic interest of said at least one of the buyer entities.

108. A computer program product for buyer-driven targeting by a system comprising:
   a set of computer-readable non-transitory media having computer readable program code embodied therein to be executed by a computer, the computer readable program code comprising program code to perform the following method:
   receiving, via computer-enabled automated access, data from each of a plurality of buyer entities comprising at least one respective third party purchase record or information derived therefrom;
   electronically storing information associated with the data;
   with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   facilitating the offering, by computer, of at least one of the incentives to the buyer entity, with a condition precedent for this operation that the system has received from that buyer entity the at least one respective third party purchase record or information verifiably derived therefrom,
   wherein the decision regarding the at least one incentive that is to be offered to the buyer entity is based at least in part on stored information relating to at least one purchase made by the buyer entity with merchants other than the third party advertiser that is associated with the incentive,
   further comprising:
      computer code for obtaining acceptance information on whether at least one of the buyer entities accepted the incentive;
      computer code for storing the acceptance information; and
      computer code for making a decision to offer a further incentive to said at least one of the buyer entities based at least in part on said acceptance information, said decision being in the economic interest of said at least one of the buyer entities.

109. A computer program product for buyer-driven targeting by a system comprising:
   a set of computer-readable non-transitory media having computer readable program code embodied therein to be executed by a computer, the computer readable program code comprising program code to perform the following method:
   receiving, via computer-enabled automated access, data from each of a plurality of buyer entities comprising at least one respective third party purchase record or information derived therefrom;
   electronically storing information associated with the data;
   with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   facilitating the offering, by computer, of at least one of the incentives to the buyer entity, with a condition precedent for this operation that the system has received from that buyer entity the at least one respective third party purchase record or information verifiably derived therefrom,
   wherein the receipt of the third party purchase record or information derived therefrom occurs on an initiative and with consent of the buyer entity associated with that purchase record,
   wherein the decision regarding the at least one incentive that is to be offered to the buyer entity is based at least in part on stored information relating to at least one purchase made by the buyer entity with merchants other than the third party advertiser that is associated with the incentive,
   further comprising:
      computer code for obtaining acceptance information on whether at least one of the buyer entities accepted the incentive;
      computer code for storing the acceptance information; and
      computer code for making a decision to offer a further incentive to said at least one of the buyer entities based at least in part on said acceptance information, said decision being in the economic interest of said at least one of the buyer entities.

110. A computer program product for buyer-driven targeting by a system comprising:
- a set of computer-readable non-transitory media having computer readable program code embodied therein to be executed by a computer, the computer readable program code comprising program code to perform the following method:
- receiving, via computer-enabled automated access, data from each of a plurality of buyer entities comprising at least one respective third party purchase record or information derived therefrom;
- electronically storing information associated with the data;
- with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
- facilitating the offering, by computer, of at least one of the incentives to the buyer entity, with a condition precedent for this operation that the system has received from that buyer entity the at least one respective third party purchase record or information verifiably derived therefrom,
- wherein the purchase record or information derived therefrom comprises data associated with the purchase of products or services for which payment was not carried out by the system,
- wherein the decision regarding the at least one incentive that is to be offered to the buyer entity is based at least in part on stored information relating to at least one purchase made by the buyer entity with merchants other than the third party advertiser that is associated with the incentive,
- further comprising:
  - computer code for obtaining acceptance information on whether at least one of the buyer entities accepted the incentive;
  - computer code for storing the acceptance information; and
  - computer code for making a decision to offer a further incentive to said at least one of the buyer entities based at least in part on said acceptance information, said decision being in the economic interest of said at least one of the buyer entities.

111. A computer program product for buyer-driven targeting by a system comprising:
- a set of computer-readable non-transitory media having computer readable program code embodied therein to be executed by a computer, the computer readable program code comprising program code to perform the following method:
- receiving, via computer-enabled automated access, data from each of a plurality of buyer entities comprising at least one respective third party purchase record or information derived therefrom;
- electronically storing information associated with the data;
- with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
- facilitating the offering, by computer, of at least one of the incentives to the buyer entity, with a condition precedent for this operation that the system has received from that buyer entity the at least one respective third party purchase record or information verifiably derived therefrom,
- wherein the manufacture, marketing, distribution, and providing are not carried out by the system in the ordinary course of business,
- wherein the decision regarding the at least one incentive that is to be offered to the buyer entity is based at least in part on stored information relating to at least one purchase made by the buyer entity with merchants other than the third party advertiser that is associated with the incentive,
- further comprising:
  - computer code for obtaining acceptance information on whether at least one of the buyer entities accepted the incentive;
  - computer code for storing the acceptance information; and
  - computer code for making a decision to offer a further incentive to said at least one of the buyer entities based at least in part on said acceptance information, said decision being in the economic interest of said at least one of the buyer entities.

112. A computer program product for buyer-driven targeting by a system comprising:
- a set of computer-readable non-transitory media having computer readable program code embodied therein to be executed by a computer, the computer readable program code comprising program code to perform the following method:
- receiving, via computer-enabled automated access, data from each of a plurality of buyer entities comprising at least one respective third party purchase record or information derived therefrom;
- electronically storing information associated with the data;
- with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the decision regarding the at least one incentive that is to be offered to the buyer entity is based at least in part on stored information relating to purchases made by the buyer entity with merchants other than the third party advertiser that is associated with the incentive, further comprising:
  computer code for obtaining acceptance information on whether at least one of the buyer entities accepted the incentive;
  computer code for storing the acceptance information; and
  computer code for making a decision to offer a further incentive to said at least one of the buyer entities based at least in part on said acceptance information, said decision being in the economic interest of said at least one of the buyer entities.

113. A computer program product for buyer-driven targeting by a system comprising:
  a set of computer-readable non-transitory media having computer readable program code embodied therein to be executed by a computer, the computer readable program code comprising program code to perform the following method:
  receiving, via computer-enabled automated access, data from each of a plurality of buyer entities comprising at least one respective third party purchase record or information derived therefrom;
  electronically storing information associated with the data;
  with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  facilitating the offering, by computer, of at least one of the incentives to the buyer entity, with a condition precedent for this operation that the system has received from that buyer entity the at least one respective third party purchase record or information verifiably derived therefrom, wherein the offering is facilitated without having transferred to the third party advertiser any full name associated with the buyer entity at the time that the incentive is offered but has not yet been responded to by the buyer entity, further comprising:
  computer code for obtaining acceptance information on whether at least one of the buyer entities accepted the incentive;
  computer code for storing the acceptance information; and
  computer code for making a decision to offer a further incentive to said at least one of the buyer entities based at least in part on said acceptance information, said decision being in the economic interest of said at least one of the buyer entities.

114. A computer program product for buyer-driven targeting by a system comprising:
  a set of computer-readable non-transitory media having computer readable program code embodied therein to be executed by a computer, the computer readable program code comprising program code to perform the following method:
  receiving, via computer-enabled automated access, data from each of a plurality of buyer entities comprising at least one respective third party purchase record or information derived therefrom;
  electronically storing information associated with the data;
  with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity, further comprising:
  computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

115. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

116. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the offering is facilitated without having transferred to the third party advertiser any full name associated with the buyer entity at the time that the incentive is offered but has not yet been responded to by the buyer entity, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

117. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the offering is facilitated without having transferred to the third party advertiser any full name associated with the buyer entity at the time that the incentive is offered but has not yet been responded to by the buyer entity, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

118. A computer program product for buyer-driven targeting by a system comprising:

a set of computer-readable non-transitory media having computer readable program code embodied therein to be executed by a computer, the computer readable program code comprising program code to perform the following method:

receiving, via computer-enabled automated access, data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored data relating to at least one purchase made by the buyer entity with merchants other than the third party advertiser that is associated with the incentive, wherein the offering is facilitated without having transferred to the third party advertiser any full name associated with the buyer entity at the time that the incentive is offered but has not yet been responded to by the buyer entity, further comprising:

computer code for obtaining acceptance information on whether at least one of the buyer entities accepted the incentive;

computer code for storing the acceptance information; and computer code for making a decision to offer a further incentive to said at least one of the buyer entities based at least in part on said acceptance information, said decision being in the economic interest of said at least one of the buyer entities.

119. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receiving comprises program code for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

120. The program product as recited in claim 119, wherein the program code for making at least one decision further includes program code for providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

121. The program product as recited in claim 119, further comprising:

program code for obtaining acceptance information on whether at least one of the buyer entities accepted the incentive;

program code for storing the acceptance information; and program code for making a decision to offer a further incentive to said at least one of the buyer entities based at least in part on said acceptance information, said decision being in the economic interest of said at least one of the buyer entities.

122. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the receiving comprises program code for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

123. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the receiving comprises program code for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

124. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the purchase record or information derived therefrom comprises data associated with the purchase of products or services for which payment was not carried out by the system, wherein the receiving comprises program code for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

125. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the receiving comprises logic for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

126. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the manufacture, marketing, distribution, and providing are not carried out by the system in the ordinary course of business, wherein the receiving comprises program code for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;
   wherein said making a decision comprises:
   electronically searching the purchase information to obtain at least one attribute from the purchase information about the buyer entity; and
   correlating the attribute to an incentive from a plurality of incentives.

127. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the manufacture, marketing, distribution, and providing are not carried out by the system in the ordinary course of business, wherein the receiving comprises program code for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;
   wherein said making a decision comprises:
   electronically searching the purchase information to obtain at least one attribute from the purchase information about the buyer entity; and
   correlating the attribute to an incentive from a plurality of incentives.

128. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

129. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the at least one benefit is not normally and publicly accessible to the buyer entity or other buyer entities in the same geographic region on terms which are at least objectively equivalent, and which do not include material conditions that are different from the at least one action, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

130. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the at least one benefit is not normally and publicly accessible to the buyer entity or other buyer entities in the same geographic region on terms which are at least objectively equivalent, and which do not include material conditions that are different from the at least one action, wherein the receiving comprises program code for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;

wherein said making a decision comprises:
   electronically searching the purchase information to obtain at least one attribute from the purchase information about the buyer entity; and
   correlating the attribute to an incentive from a plurality of incentives.

131. A computer program product for buyer-driven targeting by a system comprising:
   a set of non-transitory computer-readable media having computer readable program code embodied therein to be executed by a computer, the computer readable program code comprising program code to perform the following method:
   receiving data from each of a plurality of buyer entities comprising at least one respective third party purchase record or information derived therefrom;
   electronically storing information associated with the data;
   with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   facilitating the offering, by computer, of at least one of the incentives to the buyer entity, with a condition precedent for this operation that the system has received from that buyer entity the at least one respective third party purchase record or information verifiably derived therefrom,
   wherein the manufacture, marketing, distribution, and providing are not carried out by the system in the ordinary course of business,
   wherein the at least one benefit is not normally and publicly accessible to the buyer entity or other buyer entities in the same geographic region on terms which are at least objectively equivalent, and which do not include material conditions that are different from the at least one action, wherein the receiving comprises program code for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;

wherein said making a decision comprises:
   electronically searching the purchase information to obtain at least one attribute from the purchase information about the buyer entity; and
   correlating the attribute to an incentive from a plurality of incentives.

132. A computer program product for buyer-driven targeting by a system comprising:
   a set of non-transitory computer-readable media having computer readable program code embodied therein to be executed by a computer, the computer readable program code comprising program code to perform the following method:
   receiving data from each of a plurality of buyer entities comprising at least one respective third party purchase record or information derived therefrom;
   electronically storing information associated with the data;
   with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   facilitating the offering, by computer, of at least one of the incentives to the buyer entity, with a condition precedent for this operation that the system has received from that buyer entity the at least one respective third party purchase record or information verifiably derived therefrom,
   wherein the decision regarding the at least one incentive that is to be offered to the buyer entity is based at least in part on stored information relating to at least one purchase made by the buyer entity with merchants other than the third party advertiser that is associated with the incentive, wherein the receiving comprises program code for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;

wherein said making a decision comprises:
electronically searching the purchase information to obtain at least one attribute from the purchase information about the buyer entity; and
correlating the attribute to an incentive from a plurality of incentives.

133. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the decision regarding the at least one incentive that is to be offered to the buyer entity is based at least in part on stored information relating to at least one purchase made by the buyer entity with merchants other than the third party advertiser that is associated with the incentive,
wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

134. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the decision regarding the at least one incentive that is to be offered to the buyer entity is based at least in part on stored information relating to at least one purchase made by the buyer entity with merchants other than the third party advertiser that is associated with the incentive,
wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

135. A computer program product for buyer-driven targeting by a system comprising:
a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the decision regarding the at least one incentive that is to be offered to the buyer entity is based at least in part on stored information relating to at least one purchase made by the buyer entity with merchants other than the third party advertiser that is associated with the incentive, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

136. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the decision regarding the at least one incentive that is to be offered to the buyer entity is based at least in part on stored information relating to purchases made by the buyer entity with merchants other than the third party advertiser that is associated with the incentive, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

137. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the offering is facilitated without having transferred to the third party advertiser any full name associated with the buyer entity at the time that the incentive is offered but has not yet been responded to by the buyer entity, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

138. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

139. A computer program product for buyer-driven targeting by a system comprising:
a set of non-transitory computer-readable media having computer readable program code embodied therein to be executed by a computer, the computer readable program code comprising program code to perform the following method:
receiving data from each of a plurality of buyer entities comprising at least one respective third party purchase record or information derived therefrom;
electronically storing information associated with the data;
with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
facilitating the offering, by computer, of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity, wherein the receiving comprises program code for:
　sending to a buyer entity an offer for participating in an incentive program in return for access to purchase information pertaining to the buyer entity from at least three merchants;
　receiving from the buyer entity a response with a digital identity verification granting a right of access to said purchase information of the merchants; and
　obtaining said purchase information from the merchants;

wherein said making a decision comprises:
　electronically searching the purchase information to obtain at least one attribute from the purchase information about the buyer entity; and
　correlating the attribute to an incentive from a plurality of incentives.

140. A computer program product for buyer-driven targeting by a system comprising:
　a set of non-transitory computer-readable media having computer readable program code embodied therein to be executed by a computer, the computer readable program code comprising program code to perform the following method:
　receiving data from each of a plurality of buyer entities comprising at least one respective third party purchase record or information derived therefrom;
　electronically storing information associated with the data;
　with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
　facilitating the offering, by computer, of at least one of the incentives to the buyer entity, with a condition precedent for this operation that the system has received from that buyer entity the at least one respective third party purchase record or information verifiably derived therefrom,
　wherein the manufacture, marketing, distribution, and providing are not carried out by the system in the ordinary course of business,
　wherein the offering is facilitated without having transferred to the third party advertiser any full name associated with the buyer entity at the time that the incentive is offered but has not yet been responded to by the buyer entity, wherein the receiving comprises program code for:
　sending to a buyer entity an offer for participating in an incentive program in return for access to purchase information pertaining to the buyer entity from at least three merchants;
　receiving from the buyer entity a response with a digital identity verification granting a right of access to said purchase information of the merchants; and
　obtaining said purchase information from the merchants;

wherein said making a decision comprises:
　electronically searching the purchase information to obtain at least one attribute from the purchase information about the buyer entity; and
　correlating the attribute to an incentive from a plurality of incentives.

141. A computer program product for buyer-driven targeting by a system comprising:
　a set of non-transitory computer-readable media having computer readable program code embodied therein to be executed by a computer, the computer readable program code comprising program code to perform the following method:
　receiving data from each of a plurality of buyer entities comprising at least one respective third party purchase record or information derived therefrom;
　electronically storing information associated with the data;
　with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
　facilitating the offering, by computer, of at least one of the incentives to the buyer entity, with a condition precedent for this operation that the system has received from that buyer entity the at least one respective third party purchase record or information verifiably derived therefrom,
　wherein the at least one benefit is not normally and publicly accessible to the buyer entity or other buyer entities in the same geographic region on terms which are at least objectively equivalent, and which do not include material conditions that are different from the at least one action,
　wherein the offering is facilitated without having transferred to the third party advertiser any full name associated with the buyer entity at the time that the incentive is offered but has not yet been responded to by the buyer entity, wherein the receiving comprises program code for:
　sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

142. A computer program product for buyer-driven targeting by a system comprising:

a set of non-transitory computer-readable media having computer readable program code embodied therein to be executed by a computer, the computer readable program code comprising program code to perform the following method:

receiving data from each of a plurality of buyer entities comprising at least one respective third party purchase record or information derived therefrom;

electronically storing information associated with the data;

with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and facilitating the offering, by computer, of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored data relating to at least one purchase made by the buyer entity with merchants other than the third party advertiser that is associated with the incentive, wherein the offering is facilitated without having transferred to the third party advertiser any full name associated with the buyer entity at the time that the incentive is offered but has not yet been responded to by the buyer entity, wherein the receiving comprises program code for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

143. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

144. The system as recited in claim 143, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

145. The system as recited in claim 143, wherein said receiving includes:
receiving the permission of at least one of the buyer entities to access at least some of web-based online accounts thereof;
automatically accessing the web-based online accounts;
retrieving at least some of said information relating to said purchases made by said at least one of the buyer entities; and
repeating said accessing and retrieving unless a cancellation of said permission is received.

146. The system as recited in claim 143, further comprising:
logic for obtaining multiplier-effect-information on said buyer entity, said information being associated with at least one follow-up purchase or at least one contemporaneous co-purchase which the buyer entity made with or after accepting the incentive;
logic for storing the acceptance information; and
logic for making a decision to offer a further incentive to the buyer entities based at least in part on said multiplier-effect-information, said decision being in the economic interest of the buyer entity.

147. The system as recited in claim 143, further comprising:
logic for calculating for said buyer entity at least one measure which indicates the amount of benefits available to the buyer entity based at least in part on the information stored about the buyer entity; and
logic for presenting said at least one measure to the buyer entity.

148. The system as recited in claim 143, where said incentive is presented to the buyer entity on a wireless device, and where said decision is made at least in part based on location information associated with the location of the wireless device.

149. The system as recited in claim 143, further comprising logic for receiving manual input from the buyer entity, and making said decision at least in part based on the manual input.

150. The system as recited in claim 143, further comprising logic for receiving browsing-behavior information associated with the buyer entity, and making said decision at least in part based on the browsing-behavior information.

151. The system as recited in claim 143, further comprising logic for receiving demographic information associated with the buyer entity, and making said decision at least in part based on the demographic information.

152. The system as recited in claim 143, further comprising logic for calculating a price for the offering of an incentive to the buyer entity based at least in part on information stored about the buyer entity.

153. The system as recited in claim 143, further comprising logic for sending information associated with the data of at least one particular of said buyer entities to a third party after receipt of an authorization from said at least one particular buyer entity.

154. The system as recited in claim 143, further comprising: logic for obtaining enhancement permission from at least one enhanced buyer entity of said plurality of buyer entities to supplement data associated with said enhanced buyer entity with additional information to be obtained from at least one third party information broker; and logic for receiving additional information associated with the at least one enhanced buyer entity from at least one actual third party information broker; and wherein the incentive in the facilitating the offering of the incentive is offered to the enhanced buyer entity on improved terms based at least in part on the additional information.

155. The system as recited in claim 143, further comprising:
logic for adding the purchase amounts for the buyer entity over a first period of time made from a first merchant to obtain a first merchant purchase amount; determining if the first merchant purchase amount exceeds a threshold value; and
logic for rewarding the buyer entity for having exceeded the threshold value of purchases.

156. The system as recited in claim 143, wherein the making at least one decision further includes providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information; and
wherein the making further includes executing a forward-looking process, the forward-looking process including:
determining a function and budget-related limit associated with at least one of the incentives based in part on information received from a forward-participating-advertiser;
receiving newly-submitted purchase records of the buyer entities with the condition precedent that the function and budget-related limit has been determined;
automatically and electronically making a new decision associated with the making of an incentive offer, said decision being based at least in part on the function, budget limit, and the newly-submitted purchase records;
distributing the incentive based at least in part on the revised making; and
halting the distributing when the budget-related limit is met.

157. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

158. A system for buyer-driven targeting by a system comprising:

an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
further comprising:
logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

159. A system for buyer-driven targeting by a system comprising:

an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the purchase record or information derived therefrom comprises data associated with the purchase of products or services for which payment was not carried out by the system,
further comprising:
logic for obtaining acceptance information on whether at least one of the buyer entities accepted the incentive;
logic for storing the acceptance information; and logic for making a decision to offer a further incentive to said at least one of the buyer entities based at least in part on said acceptance information, said decision being in the economic interest of said at least one of the buyer entities.

160. A system for buyer-driven targeting by a system comprising:

an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, further comprising:
logic for obtaining acceptance information on whether at least one of the buyer entities accepted the incentive;
logic for storing the acceptance information; and logic for making a decision to offer a further incentive to said at least one of the buyer entities based at least in part on said acceptance information, said decision being in the economic interest of said at least one of the buyer entities.

161. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the manufacture, marketing, distribution, and providing are not carried out by the system in the ordinary course of business, further comprising:
logic for obtaining acceptance information on whether at least one of the buyer entities accepted the incentive;
logic for storing the acceptance information; and logic for making a decision to offer a further incentive to said at least one of the buyer entities based at least in part on said acceptance information, said decision being in the economic interest of said at least one of the buyer entities.

162. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the manufacture, marketing, distribution, and providing are not carried out by the system in the ordinary course of business, further comprising:
logic for obtaining acceptance information on whether at least one of the buyer entities accepted the incentive;
logic for storing the acceptance information; and logic for making a decision to offer a further incentive to said at least one of the buyer entities based at least in part on said acceptance information, said decision being in the economic interest of said at least one of the buyer entities.

163. A system for buyer-driven targeting by a system comprising:
- an electronic storage; and
  - a set of processors that use the electronic storage and include among them the following logic elements:
  - logic for receiving data from each of a plurality of buyer entities comprising at least one respective third party purchase record or information derived therefrom;
  - logic for electronically storing information associated with the data;
  - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  - logic for facilitating the offering of at least one of the incentives to the buyer entity, with a condition precedent for this operation that the system has received from that buyer entity the at least one respective third party purchase record or information verifiably derived therefrom,
- wherein the at least one benefit is not normally and publicly accessible to the buyer entity or other buyer entities in the same geographic region on terms which are at least objectively equivalent, and which do not include material conditions that are different from the at least one action,
- further comprising:
  - logic for obtaining acceptance information on whether at least one of the buyer entities accepted the incentive;
  - logic for storing the acceptance information; and
- logic for making a decision to offer a further incentive to said at least one of the buyer entities based at least in part on said acceptance information, said decision being in the economic interest of said at least one of the buyer entities.

164. A system for buyer-driven targeting by a system comprising:
- an electronic storage; and
  - a set of processors that use the electronic storage and include among them the following logic elements:
  - logic for receiving data from each of a plurality of buyer entities comprising at least one respective third party purchase record or information derived therefrom;
  - logic for electronically storing information associated with the data;
  - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  - logic for facilitating the offering of at least one of the incentives to the buyer entity, with a condition precedent for this operation that the system has received from that buyer entity the at least one respective third party purchase record or information verifiably derived therefrom,
- wherein the receipt of the third party purchase record or information derived therefrom occurs on an initiative and with consent of the buyer entity associated with that purchase record,
- wherein the at least one benefit is not normally and publicly accessible to the buyer entity or other buyer entities in the same geographic region on terms which are at least objectively equivalent, and which do not include material conditions that are different from the at least one action,
- further comprising:
  - logic for obtaining acceptance information on whether at least one of the buyer entities accepted the incentive;
  - logic for storing the acceptance information; and
- logic for making a decision to offer a further incentive to said at least one of the buyer entities based at least in part on said acceptance information, said decision being in the economic interest of said at least one of the buyer entities.

165. A system for buyer-driven targeting by a system comprising:
- an electronic storage; and
  - a set of processors that use the electronic storage and include among them the following logic elements:
  - logic for receiving data from each of a plurality of buyer entities comprising at least one respective third party purchase record or information derived therefrom;
  - logic for electronically storing information associated with the data;
  - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
  - logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the at least one benefit is not normally and publicly accessible to the buyer entity or other buyer entities in the same geographic region on terms which are at least objectively equivalent, and which do not include material conditions that are different from the at least one action, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

166. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the at least one benefit is not normally and publicly accessible to the buyer entity or other buyer entities in the same geographic region on terms which are at least objectively equivalent, and which do not include material conditions that are different from the at least one action, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

167. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the decision regarding the at least one incentive that is to be offered to the buyer entity is based at least in part on stored data relating to at least one purchase made by the buyer entity with merchants other than the third party advertiser that is associated with the incentive, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

168. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored data relating to at least one purchase made by the buyer entity with merchants other than the third party advertiser that is associated with the incentive, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

169. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the decision regarding the at least one incentive that is to be offered to the buyer entity is based at least in part on stored data relating to at least one purchase made by the buyer entity with merchants other than the third party advertiser that is associated with the incentive, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

170. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the decision regarding the at least one incentive that is to be offered to the buyer entity is based at least in part on stored data relating to at least one purchase made by the buyer entity with merchants other than the third party advertiser that is associated with the incentive, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

171. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the manufacture, marketing, distribution, and providing are not carried out by the system in the ordinary course of business, wherein the decision regarding the at least one incentive that is to be offered to the buyer entity is based at least in part on stored data relating to purchases made by the buyer entity with merchants other than the third party advertiser that is associated with the incentive, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

172. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the offering is facilitated without having transferred to the third party advertiser any full name associated with the buyer entity at the time that the incentive is offered but has not yet been responded to by the buyer entity, further comprising:

logic for obtaining acceptance information on whether at least one of the buyer entities accepted the incentive;

logic for storing the acceptance information; and logic for making a decision to offer a further incentive to said at least one of the buyer entities based at least in part on said acceptance information, said decision being in the economic interest of said at least one of the buyer entities.

173. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

174. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

175. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the offering is facilitated without having transferred to the third party advertiser any full name associated with the buyer entity at the time that the incentive is offered but has not yet been responded to by the buyer entity, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

176. A system for buyer-driven targeting by a system comprising:
- an electronic storage; and
    - a set of processors that use the electronic storage and include among them the following logic elements:
    - logic for receiving data from each of a plurality of buyer entities comprising at least one respective third party purchase record or information derived therefrom;
    - logic for electronically storing information associated with the data;
    - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
    - logic for facilitating the offering of at least one of the incentives to the buyer entity, with a condition precedent for this operation that the system has received from that buyer entity the at least one respective third party purchase record or information verifiably derived therefrom,
- wherein the offering is facilitated without having transferred to the third party advertiser any full name associated with the buyer entity at the time that the incentive is offered but has not yet been responded to by the buyer entity,
- further comprising:
    - logic for obtaining acceptance information on whether at least one of the buyer entities accepted the incentive;
    - logic for storing the acceptance information; and
- logic for making a decision to offer a further incentive to said at least one of the buyer entities based at least in part on said acceptance information, said decision being in the economic interest of said at least one of the buyer entities.

177. A system for buyer-driven targeting by a system comprising:
- an electronic storage; and
    - a set of processors that use the electronic storage and include among them the following logic elements:
    - logic for receiving data from each of a plurality of buyer entities comprising at least one respective third party purchase record or information derived therefrom;
    - logic for electronically storing information associated with the data;
    - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
    - logic for facilitating the offering of at least one of the incentives to the buyer entity, with a condition precedent for this operation that the system has received from that buyer entity the at least one respective third party purchase record or information verifiably derived therefrom,
- wherein the receipt of the third party purchase record or information derived therefrom occurs on an initiative and with consent of the buyer entity associated with that purchase record,
- wherein the decision regarding the at least one incentive that is to be offered to the buyer entity is based at least in part on stored data relating to at least one purchase made by the buyer entity with merchants other than the third party advertiser that is associated with the incentive,
- wherein the offering is facilitated without having transferred to the third party advertiser any full name associated with the buyer entity at the time that the incentive is offered but has not yet been responded to by the buyer entity,
- further comprising:
    - logic for obtaining acceptance information on whether at least one of the buyer entities accepted the incentive;
    - logic for storing the acceptance information; and
- logic for making a decision to offer a further incentive to said at least one of the buyer entities based at least in part on said acceptance information, said decision being in the economic interest of said at least one of the buyer entities.

178. A system for buyer-driven targeting by a system comprising:
- an electronic storage; and
    - a set of processors that use the electronic storage and include among them the following logic elements:
    - logic for receiving data from each of a plurality of buyer entities comprising at least one respective third party purchase record or information derived therefrom;
    - logic for electronically storing information associated with the data;
    - logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receiving comprises program code for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

179. The system as recited in claim 178, wherein the logic for making at least one decision is further configured for providing access to potential-audience-information containing at least part of the data or information derived from the data to at least one of the third party advertisers via an interactive user interface, receiving audience and incentive-definition-information from the at least one of the third party advertisers, selecting output-information derived at least in part from the potential-audience-information and the audience and incentive-definition-information, presenting the output-information to the at least one of the third party advertisers, receiving parameter information from the at least one of the third party advertisers, and making the at least one decision at least in part based on the parameter information.

180. The system as recited in claim 178, further comprising:
logic for obtaining acceptance information on whether at least one of the buyer entities accepted the incentive;
logic for storing the acceptance information; and
logic for making a decision to offer a further incentive to said at least one of the buyer entities based at least in part on said acceptance information, said decision being in the economic interest of said at least one of the buyer entities.

181. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

182. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the receiving comprises logic for:
    sending to a buyer entity an offer for participating in an incentive program in return for access to purchase information pertaining to the buyer entity from at least three merchants;
    receiving from the buyer entity a response with a digital identity verification granting a right of access to said purchase information of the merchants; and
    obtaining said purchase information from the merchants;
wherein said making a decision comprises:
electronically searching the purchase information to obtain at least one attribute from the purchase information about the buyer entity; and
correlating the attribute to an incentive from a plurality of incentives.

183. A system for buyer-driven targeting by a system comprising:
an electronic storage; and
a set of processors that use the electronic storage and include among them the following logic elements:
    logic for receiving data from each of a plurality of buyer entities comprising at least one respective third party purchase record or information derived therefrom;
    logic for electronically storing information associated with the data;
    logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
    logic for facilitating the offering of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the purchase record or information derived therefrom comprises data associated with the purchase of products or services for which payment was not carried out by the system, wherein the receiving comprises logic for:
    sending to a buyer entity an offer for participating in an incentive program in return for access to purchase information pertaining to the buyer entity from at least three merchants;
    receiving from the buyer entity a response with a digital identity verification granting a right of access to said purchase information of the merchants; and
    obtaining said purchase information from the merchants;
wherein said making a decision comprises:
electronically searching the purchase information to obtain at least one attribute from the purchase information about the buyer entity; and
correlating the attribute to an incentive from a plurality of incentives.

184. A system for buyer-driven targeting by a system comprising:
an electronic storage; and
a set of processors that use the electronic storage and include among them the following logic elements:
    logic for receiving data from each of a plurality of buyer entities comprising at least one respective third party purchase record or information derived therefrom;
    logic for electronically storing information associated with the data;
    logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
    logic for facilitating the offering of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the receiving comprises logic for:
    sending to a buyer entity an offer for participating in an incentive program in return for access to purchase information pertaining to the buyer entity from at least three merchants;
    receiving from the buyer entity a response with a digital identity verification granting a right of access to said purchase information of the merchants; and
    obtaining said purchase information from the merchants;
wherein said making a decision comprises:
electronically searching the purchase information to obtain at least one attribute from the purchase information about the buyer entity; and correlating the attribute to an incentive from a plurality of incentives.

185. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the manufacture, marketing, distribution, and providing are not carried out by the system in the ordinary course of business,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

186. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the manufacture, marketing, distribution, and providing are not carried out by the system in the ordinary course of business,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

187. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the at least one benefit is not normally and publicly accessible to the buyer entity or other buyer entities in the same geographic region on terms which are at least objectively equivalent, and which do not include material conditions that are different from the at least one action, wherein the receiving comprises logic for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

188. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the at least one benefit is not normally and publicly accessible to the buyer entity or other buyer entities in the same geographic region on terms which are at least objectively equivalent, and which do not include material conditions that are different from the at least one action, wherein the receiving comprises logic for:

sending to a buyer entity an offer for participating in an incentive program in return for access to purchase information pertaining to the buyer entity from at least three merchants;

receiving from the buyer entity a response with a digital identity verification granting a right of access to said purchase information of the merchants; and obtaining said purchase information from the merchants;

wherein said making a decision comprises:

electronically searching the purchase information to obtain at least one attribute from the purchase information about the buyer entity; and correlating the attribute to an incentive from a plurality of incentives.

189. A system for buyer-driven targeting by a system comprising:

an electronic storage; and a set of processors that use the electronic storage and include among them the following logic elements:

logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the at least one benefit is not normally and publicly accessible to the buyer entity or other buyer entities in the same geographic region on terms which are at least objectively equivalent, and which do not include material conditions that are different from the at least one action, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

190. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the at least one benefit is not normally and publicly accessible to the buyer entity or other buyer entities in the same geographic region on terms which are at least objectively equivalent, and which do not include material conditions that are different from the at least one action,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

191. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the decision regarding the at least one incentive that is to be offered to the buyer entity is based at least in part on stored data relating to at least one purchase made by the buyer entity with merchants other than the third party advertiser that is associated with the incentive,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and obtaining said purchase information from the merchants;
wherein said making a decision comprises:
electronically searching the purchase information to obtain at least one attribute from the purchase information about the buyer entity; and
correlating the attribute to an incentive from a plurality of incentives.

192. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the receipt of the third party purchase record or information derived therefrom occurs on an initiative and with consent of the buyer entity associated with that purchase record,
wherein the decision regarding the at least one incentive that is to be offered to the buyer entity is based at least in part on stored data relating to at least one purchase made by the buyer entity with merchants other than the third party advertiser that is associated with the incentive,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

193. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom,
wherein the purchase record or information derived therefrom comprises data associated with the purchase of products or services for which payment was not carried out by the system,
wherein the decision regarding the at least one incentive that is to be offered to the buyer entity is based at least in part on stored data relating to at least one purchase made by the buyer entity with merchants other than the third party advertiser that is associated with the incentive,
wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

194. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;

logic for electronically storing information associated with the data;

logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the manufacture, marketing, distribution, and providing are not carried out by the system in the ordinary course of business, wherein the decision regarding the at least one incentive that is to be offered to the buyer entity is based at least in part on stored data relating to at least one purchase made by the buyer entity with merchants other than the third party advertiser that is associated with the incentive, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;

wherein said making a decision comprises:
electronically searching the purchase information to obtain at least one attribute from the purchase information about the buyer entity; and
correlating the attribute to an incentive from a plurality of incentives.

195. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the manufacture, marketing, distribution, and providing are not carried out by the system in the ordinary course of business, wherein the decision regarding the at least one incentive that is to be offered to the buyer entity is based at least in part on stored data relating to purchases made by the buyer entity with merchants other than the third party advertiser that is associated with the incentive, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;

wherein said making a decision comprises:
electronically searching the purchase information to obtain at least one attribute from the purchase information about the buyer entity; and
correlating the attribute to an incentive from a plurality of incentives.

196. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and logic for facilitating the offering of at least one of the incentives to the buyer entity, with a condition precedent for this operation that the system has received from that buyer entity the at least one respective third party purchase record or information verifiably derived therefrom, wherein the offering is facilitated without having transferred to the third party advertiser any full name associated with the buyer entity at the time that the incentive is offered but has not yet been responded to by the buyer entity, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

197. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the offering is facilitated without having transferred to the third party advertiser any full name associated with the buyer entity at the time that the incentive is offered but has not yet been responded to by the buyer entity, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

198. A system for buyer-driven targeting by a system comprising:
an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom, wherein the purchase record or information derived therefrom comprises data associated with the purchase of products or services for which payment was not carried out by the system, wherein the offering is facilitated without having transferred to the third party advertiser any full name associated with the buyer entity at the time that the incentive is offered but has not yet been responded to by the buyer entity,
wherein the receiving comprises logic for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;
wherein said making a decision comprises:
   electronically searching the purchase information to obtain at least one attribute from the purchase information about the buyer entity; and
   correlating the attribute to an incentive from a plurality of incentives.

199. A system for buyer-driven targeting by a system comprising:
an electronic storage; and
   a set of processors that use the electronic storage and include among them the following logic elements:
   logic for receiving data from each of a plurality of buyer entities comprising at least one respective third party purchase record or information derived therefrom;
   logic for electronically storing information associated with the data;
   logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   logic for facilitating the offering of at least one of the incentives to the buyer entity, with a condition precedent for this operation that the system has received from that buyer entity the at least one respective third party purchase record or information verifiably derived therefrom,
wherein the manufacture, marketing, distribution, and providing are not carried out by the system in the ordinary course of business,
wherein the offering is facilitated without having transferred to the third party advertiser any full name associated with the buyer entity at the time that the incentive is offered but has not yet been responded to by the buyer entity,
wherein the receiving comprises logic for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;
wherein said making a decision comprises:
   electronically searching the purchase information to obtain at least one attribute from the purchase information about the buyer entity; and
   correlating the attribute to an incentive from a plurality of incentives.

200. A system for buyer-driven targeting by a system comprising:
an electronic storage; and
   a set of processors that use the electronic storage and include among them the following logic elements:
   logic for receiving data from each of a plurality of buyer entities comprising at least one respective third party purchase record or information derived therefrom;
   logic for electronically storing information associated with the data;
   logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
   logic for facilitating the offering of at least one of the incentives to the buyer entity, with a condition precedent for this operation that the system has received from that buyer entity the at least one respective third party purchase record or information verifiably derived therefrom,
wherein the offering is facilitated without having transferred to the third party advertiser any full name associated with the buyer entity at the time that the incentive is offered but has not yet been responded to by the buyer entity,
wherein the receiving comprises logic for:
   sending to a buyer entity an offer for participating in an incentive program in return for access to purchase information pertaining to the buyer entity from at least three merchants;
   receiving from the buyer entity a response with a digital identity verification granting a right of access to said purchase information of the merchants; and
   obtaining said purchase information from the merchants;
wherein said making a decision comprises:
   electronically searching the purchase information to obtain at least one attribute from the purchase information about the buyer entity; and
   correlating the attribute to an incentive from a plurality of incentives.

201. A system for buyer-driven targeting by a system comprising:

an electronic storage; and
a set of processors that use the electronic storage and include among them the following logic elements:
logic for receiving data from each of a plurality of buyer entities comprising at least one respective third party purchase record or information derived therefrom;
logic for electronically storing information associated with the data;
logic for, with respect to a plurality of product or service items offered for sale, wherein each different item in the plurality of items is either manufactured or marketed or distributed or provided by a different third party advertiser in a plurality of third party advertisers, electronically making, by computer, with respect to at least one of the buyer entities, based at least in part on the information, at least one decision associated with the offering of at least one from among a plurality of different incentives, with each incentive associated with at least one of the product or service items and associated with at least one of the third party advertisers, wherein there is at least one different incentive from each of a plurality of the different third party advertisers, each of the incentives offering at least one benefit in exchange for at least one action associated with a purchase of at least one of the items; and
logic for facilitating the offering of at least one of the incentives to the buyer entity, with a condition precedent for this operation that the system has received from that buyer entity the at least one respective third party purchase record or information verifiably derived therefrom, wherein the receipt of the third party purchase record or information derived therefrom occurs on an initiative and with consent of the buyer entity associated with that purchase record, wherein the decision regarding the at least one incentive that is to be offered to the buyer entity is based at least in part on stored data relating to at least one purchase made by the buyer entity with merchants other than the third party advertiser that is associated with the incentive, wherein the offering is facilitated without having transferred to the third party advertiser any full name associated with the buyer entity at the time that the incentive is offered but has not yet been responded to by the buyer entity, wherein the receiving comprises logic for:
sending to a buyer entity an offer for participating in an incentive program in return for access to purchase information pertaining to the buyer entity from at least three merchants;
receiving from the buyer entity a response with a digital identity verification granting a right of access to said purchase information of the merchants; and
obtaining said purchase information from the merchants;
wherein said making a decision comprises:
electronically searching the purchase information to obtain at least one attribute from the purchase information about the buyer entity; and
correlating the attribute to an incentive from a plurality of incentives.

* * * * *